(12) United States Patent
Hulstein et al.

(10) Patent No.: US 11,105,390 B2
(45) Date of Patent: Aug. 31, 2021

(54) SHOCK ABSORBER WITH DRY VALVING

(71) Applicant: QA1 Precision Products, Inc., Lakeville, MN (US)

(72) Inventors: Andrew J. Hulstein, Apple Valley, MN (US); Charles C. Olson, Cannon Falls, MN (US); Marshall J. Fegers, Savage, MN (US)

(73) Assignee: QA1 Precision Products, Inc., Lakeville, MN (US)

( * ) Notice: Subject to any disclaimer, the term of this patent is extended or adjusted under 35 U.S.C. 154(b) by 258 days.

(21) Appl. No.: 16/115,378

(22) Filed: Aug. 28, 2018

(65) Prior Publication Data
US 2019/0136935 A1 May 9, 2019

Related U.S. Application Data

(60) Provisional application No. 62/551,119, filed on Aug. 28, 2017.

(51) Int. Cl.
| | |
|---|---|
| *F16F 9/32* | (2006.01) |
| *F16F 9/19* | (2006.01) |
| *F16F 9/18* | (2006.01) |
| *F16F 9/34* | (2006.01) |
| *F16F 9/36* | (2006.01) |
| *F16K 1/32* | (2006.01) |
| *F16F 9/096* | (2006.01) |
| *F16F 9/44* | (2006.01) |
| *F16F 9/06* | (2006.01) |

(52) U.S. Cl.
CPC ............ *F16F 9/3271* (2013.01); *F16F 9/096* (2013.01); *F16F 9/185* (2013.01); *F16F 9/19* (2013.01); *F16F 9/3242* (2013.01); *F16F 9/34* (2013.01); *F16F 9/369* (2013.01); *F16F 9/446* (2013.01); *F16K 1/32* (2013.01); *F16F 9/062* (2013.01); *F16F 9/065* (2013.01); *F16F 2226/04* (2013.01); *F16F 2230/0005* (2013.01); *F16F 2230/46* (2013.01)

(58) Field of Classification Search
CPC .......... F16F 9/3271; F16F 9/096; F16F 9/185; F16F 9/19; F16F 9/3242; F16F 9/34; F16F 9/369; F16F 9/062; F16F 9/065; F16F 2226/04; F16F 2230/0005; F16F 2230/46

See application file for complete search history.

(56) References Cited

U.S. PATENT DOCUMENTS

| | | | |
|---|---|---|---|
| 1,675,728 A | 7/1928 | Pierce, Jr. | |
| 1,903,377 A | 4/1933 | Moorhouse | |
| 2,237,915 A * | 4/1941 | Routson | F16F 9/062 267/34 |

(Continued)

FOREIGN PATENT DOCUMENTS

| | | |
|---|---|---|
| JP | 3821463 B2 | 9/2006 |
| WO | 2016088536 A1 | 6/2016 |

(Continued)

*Primary Examiner* — Melanie Torres Williams
(74) *Attorney, Agent, or Firm* — Merchant & Gould P.C.

(57) ABSTRACT

A replaceable valve includes a spring preload adjuster and a spring. The spring is configured to be positioned at a first side of the spring preload adjuster. The replaceable valve includes a valve cap positioned at a second, opposite side of the spring preload adjuster. The valve cap is configured to attach to a shock absorber.

21 Claims, 44 Drawing Sheets

(56) References Cited

U.S. PATENT DOCUMENTS

| | | |
|---|---|---|
| 2,624,545 A | 1/1953 | Virtue |
| 2,648,578 A | 8/1953 | Steams et al. |
| 2,672,952 A | 3/1954 | Smith |
| D175,538 S | 9/1955 | Dawson |
| 2,758,365 A | 8/1956 | Ricefield |
| 2,767,034 A | 10/1956 | McCloskey |
| D189,534 S | 1/1961 | Boldt |
| D191,191 S | 8/1961 | Kawolics |
| 3,127,664 A | 4/1964 | Zurick |
| 3,140,130 A | 7/1964 | Barr |
| 3,225,420 A | 12/1965 | Sullivan, Jr. |
| 3,499,201 A | 3/1970 | Roos |
| 3,546,762 A | 12/1970 | Martin |
| 3,586,396 A | 6/1971 | Barr |
| 3,592,519 A | 7/1971 | Martin |
| 3,623,781 A | 11/1971 | Roos |
| 3,666,331 A | 5/1972 | Curtis et al. |
| 3,709,573 A | 1/1973 | Orkin et al. |
| 3,834,772 A | 9/1974 | Bowen |
| 3,871,093 A | 3/1975 | Ladin |
| 3,884,406 A | 5/1975 | Bowen |
| 3,909,084 A | 9/1975 | Snidar et al. |
| 3,988,818 A | 11/1976 | Allison |
| 3,999,872 A | 12/1976 | Allison |
| 4,028,784 A | 6/1977 | Allison |
| 4,057,355 A | 11/1977 | Allison |
| 4,059,361 A | 11/1977 | Allison |
| 4,240,682 A | 12/1980 | Benson |
| 4,298,102 A | 11/1981 | Nishikawa et al. |
| 4,412,372 A | 11/1983 | Olschewski et al. |
| 4,541,157 A | 9/1985 | Tsushima et al. |
| 4,643,595 A | 2/1987 | Weavers |
| 4,684,267 A | 8/1987 | Fetouh |
| 4,732,244 A | 3/1988 | Verkuylen |
| 4,821,386 A | 4/1989 | Simon et al. |
| 4,860,419 A | 8/1989 | Hekman |
| 4,884,900 A | 12/1989 | Pirault et al. |
| 5,208,979 A | 5/1993 | Schmidt |
| 5,423,615 A | 6/1995 | Hara et al. |
| 5,460,355 A | 10/1995 | Danek |
| 5,536,089 A | 7/1996 | Weber et al. |
| 5,551,782 A | 9/1996 | Arnhold et al. |
| 5,711,074 A | 1/1998 | Harimoto et al. |
| 5,733,049 A | 3/1998 | Shimmell |
| 5,735,048 A | 4/1998 | Peters |
| 5,775,817 A | 7/1998 | Gottemoller et al. |
| 6,105,740 A | 8/2000 | Marzocchi et al. |
| 6,146,471 A | 11/2000 | Hartl et al. |
| 6,217,222 B1 | 4/2001 | Mattson et al. |
| 6,287,011 B1 | 9/2001 | Hartl et al. |
| 6,609,299 B2 | 8/2003 | Adachi |
| 6,659,241 B2 | 12/2003 | Sendrea |
| 6,961,997 B2 | 11/2005 | Kubota et al. |
| 7,484,603 B2 | 2/2009 | Fox |
| 7,743,896 B2 | 6/2010 | Vanhees et al. |
| 7,766,138 B2 | 8/2010 | Sintorn |
| D628,679 S | 12/2010 | Holmgren |
| 7,946,163 B2 | 5/2011 | Gartner |
| D644,085 S | 8/2011 | Jungen |
| 8,251,590 B2 | 8/2012 | Gibby et al. |
| D670,307 S | 11/2012 | Shimozaki |
| 8,403,115 B2 | 3/2013 | Gartner |
| 8,561,714 B2 | 10/2013 | Storm et al. |
| 8,695,765 B2 | 4/2014 | Danek et al. |
| 8,721,184 B2 | 5/2014 | Voisine et al. |
| 8,770,594 B2 | 7/2014 | Tominaga et al. |
| 8,807,302 B2 | 8/2014 | Nygren et al. |
| 8,819,939 B2 | 9/2014 | Pohlman et al. |
| 8,838,335 B2 | 9/2014 | Galasso et al. |
| D720,198 S | 12/2014 | Sabbag et al. |
| 8,925,933 B2 | 1/2015 | Haugen |
| 8,955,654 B2 | 2/2015 | Nygren et al. |
| 9,010,504 B2 | 4/2015 | Janes |
| 9,027,719 B2 | 5/2015 | Ito |
| 9,038,791 B2 | 5/2015 | Marking |
| 9,091,319 B2 | 7/2015 | Ishii et al. |
| 9,091,320 B1 | 7/2015 | Smith et al. |
| 9,103,401 B2 | 8/2015 | Fox |
| D747,641 S | 1/2016 | Reynolds |
| 9,228,630 B2 | 1/2016 | Coaplen |
| 9,303,712 B2 | 4/2016 | Cox |
| 9,333,829 B2 | 5/2016 | King et al. |
| 9,341,226 B2 | 5/2016 | Marking |
| D762,098 S | 7/2016 | Bertani |
| 9,447,835 B2 | 9/2016 | Kim |
| 9,528,565 B2 | 12/2016 | Marking |
| 9,695,900 B2 | 7/2017 | Roessle et al. |
| D796,293 S | 9/2017 | Alliss |
| D813,639 S | 3/2018 | Osanai |
| 2005/0145466 A1 | 7/2005 | Wang |
| 2006/0065496 A1* | 3/2006 | Fox .................. B62K 25/286 188/275 |
| 2006/0104559 A1 | 5/2006 | Wingett et al. |
| 2007/0269150 A1 | 11/2007 | Guilford |
| 2009/0277166 A1 | 11/2009 | Walz |
| 2012/0241658 A1* | 9/2012 | Clifford ................ F16K 17/085 251/321 |
| 2012/0325046 A1 | 12/2012 | Luchner et al. |
| 2013/0081273 A1* | 4/2013 | McAndrews ........... F16F 9/504 29/896.91 |
| 2013/0084035 A1 | 4/2013 | Williams et al. |
| 2013/0228404 A1 | 9/2013 | Marking |
| 2014/0190778 A1* | 7/2014 | Gartner ................. F16F 9/3488 188/266.2 |
| 2015/0290991 A1 | 10/2015 | Cox |
| 2015/0375787 A1 | 12/2015 | Adachi |
| 2016/0031285 A1 | 2/2016 | Tucker et al. |
| 2016/0075204 A1 | 3/2016 | Marking et al. |
| 2016/0265614 A1* | 9/2016 | Ripa ..................... F16F 9/512 |
| 2016/0319897 A1 | 11/2016 | Mochizuki et al. |
| 2016/0363184 A1 | 12/2016 | Noguchi et al. |
| 2017/0037923 A1* | 2/2017 | Sirven ................... B60G 17/08 |
| 2017/0167562 A1 | 6/2017 | King et al. |
| 2018/0023710 A1* | 1/2018 | Padilla ................ F16K 11/0716 251/321 |
| 2018/0119768 A1 | 5/2018 | Cox |
| 2018/0202576 A1 | 7/2018 | Mouton et al. |

FOREIGN PATENT DOCUMENTS

| | | |
|---|---|---|
| WO | 2016088629 A1 | 6/2016 |
| WO | 2016151015 A1 | 9/2016 |

* cited by examiner

SHOCK ABSORBER WITH DRY VALVING

CROSS-REFERENCE TO RELATED APPLICATION

This application claims benefit of U.S. Provisional Patent Application No. 62/551,119, filed Aug. 28, 2017, which application is hereby incorporated by reference in its entirety.

BACKGROUND

Shock absorbers are dampers used to dampen shock forces and, traditionally, shock absorbers are used in suspension systems for vehicles such as motorcycles and cars. Shock absorbers operate to absorb kinetic energy (motion) that are input to the shock at one end (wheel) and reduce the transfer of such motion to a second end (vehicle body) to improve ride quality and handling.

Shock absorbers can be fluid dampers and include an inner tube containing a piston that is movable via a rod. Contained within the inner tube can be a damping medium (e.g., fluid such as oil). As the piston moves within the inner tube, the piston displaces oil from one side of the inner tube. The resistance caused by the piston acting on the damping medium in the inner tube creates a damping effect in the movement of the attached piston rod. As oil is forced out of one side of the inner tube by the piston, it passes through a valve before entering an opposite side of the inner tube. In some shock absorber designs, this valve can be contained within the piston. In other designs, this valve can be external from a tube. In other designs still, the shock absorber includes a set of valves to control fluid to or from either side of the piston within a tube. Therefore, the valve controls flow with, and thereby the damping effect of, the shock absorber. Some shock designs include a pressurized, compressible fluid reservoir to create a positive pressure within the shock absorber resulting in a positive pressure on either side of the piston within the tube.

Commonly, shock absorbers require disassembly to change the damping effect of the shock absorber (i.e., changing a valve). Users often want to change the behavior of the shock absorber for specific situations such as street driving, race track driving, or off-road driving. However, such disassembly usually requires the user to drain all fluid from the shock absorber, disassemble the shock absorber, change a component (such as a valve), re-assemble the shock absorber, and reinsert the fluid into the shock absorber. This process can be time consuming, tedious, and complicated. Further, typically this process requires specialty tools and a controlled work environment.

Therefore, improvements in shock absorbers are needed.

SUMMARY

The present disclosure relates generally to a shock absorber. In one possible configuration, and by non-limiting example, a shock absorber system having replaceable dry valving is disclosed.

In one example of the present disclosure, a valve system for a shock absorber is disclosed. The valve system includes a body that includes a valve chamber for receiving a valve. The valve chamber has a wet portion and a dry portion, and the wet portion includes a first opening and a second opening. Fluid flow is selectively allowed to flow between the first and second openings within the wet portion via the valve. The valve includes a first assembly that has a housing positioned within the valve chamber. The first assembly includes a movable valve portion sealed within the housing and at least partially positioned within the wet portion of the valve chamber. The valve portion is movable to selectively control fluid flow between the first and second openings of the wet portion of the valve chamber. The housing includes at least one seal to seal the wet portion of the valve chamber from the dry portion. The valve includes a second assembly that is removably positioned within the dry portion of the valve chamber. The second assembly includes a spring for resisting the movement of the movable valve portion via a spring pressure.

In another example of the present disclosure, a shock absorber is disclosed. The shock absorber includes an inner tube that defines an interior volume. The shock absorber includes a piston that is movably positioned within the interior volume. The piston divides the interior volume into a first chamber and a second chamber. The shock absorber includes a body that includes a first passageway in communication with the first chamber, a second passageway in communication with the second chamber, and a third passageway selectively in communication with the first and second passageways and selectively in communication with the first and second chambers. The shock absorber includes at least one flow control valve positioned between one of the first and second passageways and the third passageway. The at least one flow control valve includes a first assembly that has a first side and second side. The first assembly includes a movable valve portion positioned and sealed within a housing. The housing includes at least one seal to seal all fluid on the first side of the first assembly and at least a portion of the valve portion is in contact with fluid at the first side of the first assembly. The valve includes a second assembly that is positionable adjacent the second side of the first assembly. The second assembly includes a spring for resisting the movement of the valve portion. The second assembly is separable from the first assembly.

In another example of the present disclosure, a replaceable valve without a seal for a shock absorber is disclosed. The replaceable valve includes a spring preload adjuster and a spring. The spring is configured to be positioned at a first side of the spring preload adjuster. The replaceable valve includes a valve cap positioned at a second, opposite side of the spring preload adjuster. The valve cap is configured to attach to a shock absorber.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
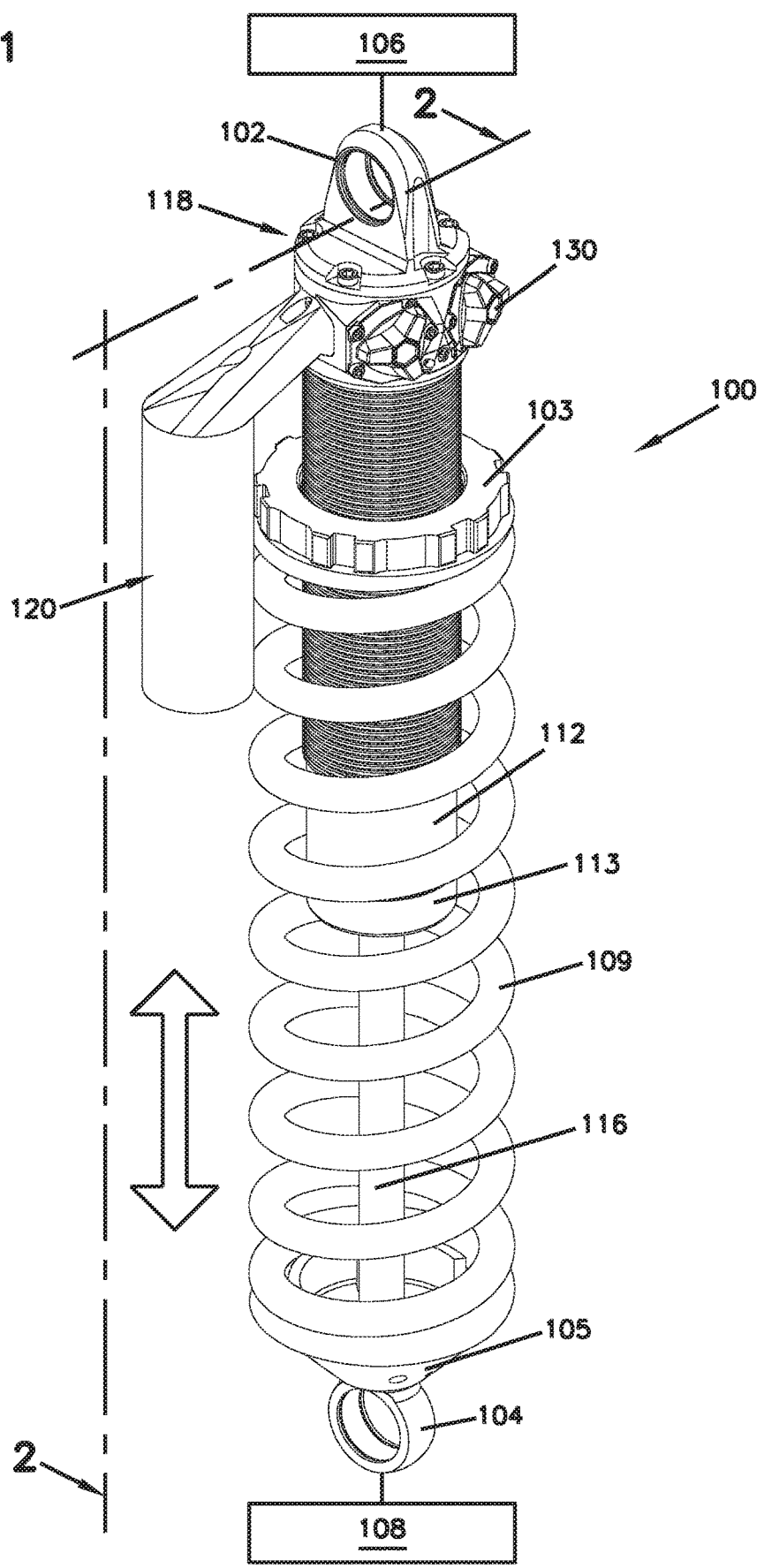
FIG. 1 illustrates a perspective view of an example shock absorber, according to one embodiment of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The shock absorber disclosed herein has several advantages. The shock absorber includes adjustable valving that is replaceable without needing to drain the fluid from the shock absorber. This allows the user to quickly change out the valving to alter the damping characteristics of the shock absorber. In some examples, such re-valving can be done with the shock absorber remaining installed, such as on a vehicle. Further, each replaceable valve of the shock absorber can also be separately adjustable. Further, the shock absorber includes a piston design that includes an integral valve and passages to allow fluid flow therethrough during a high speed compression event.

Figure 2:
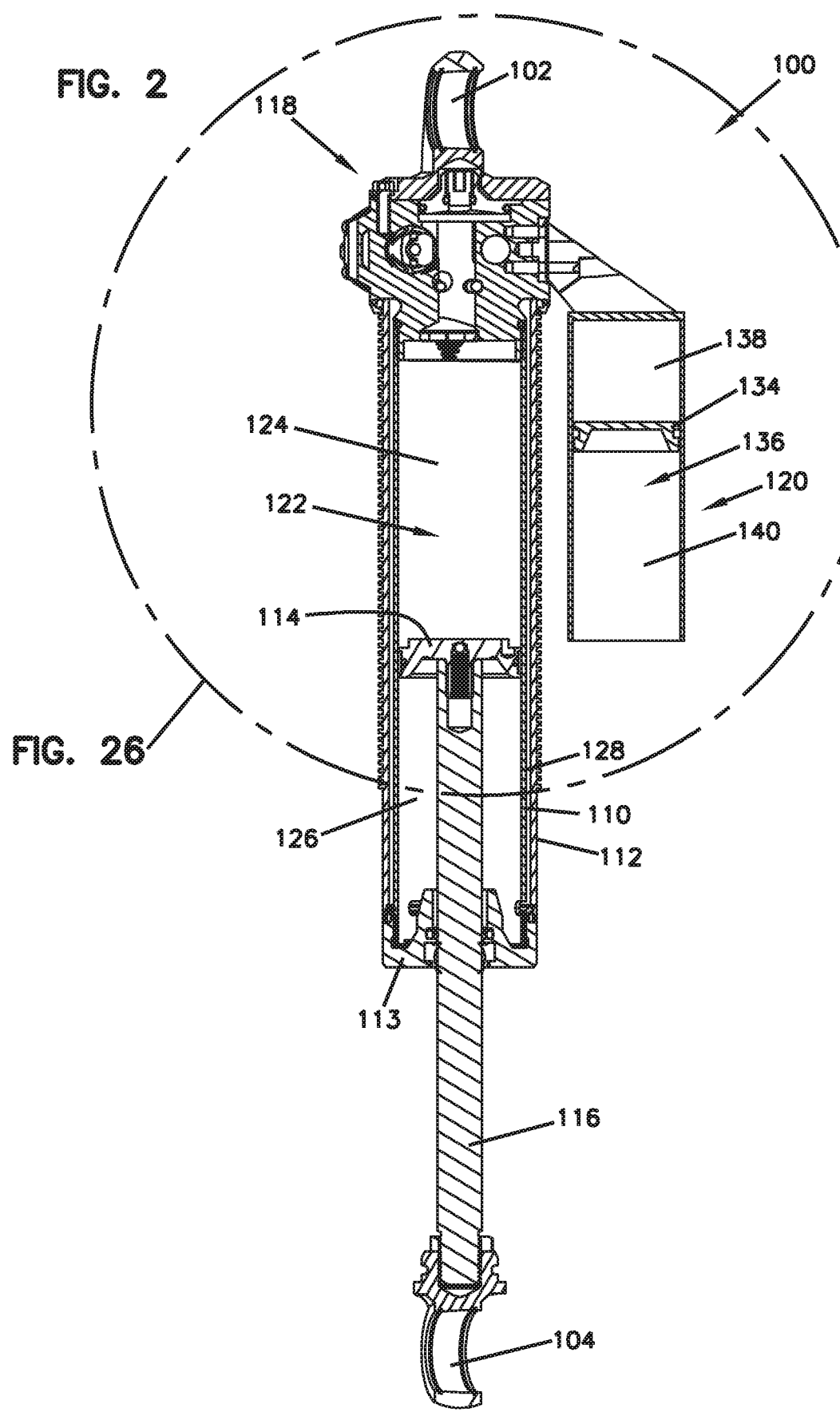
FIG. 2 illustrates a cross sectional view of the shock absorber along line 2-2 in FIG. 1.

A shock absorber 100 is shown in FIG. 1 and FIG. 2. In one example, the shock absorber 100 is a twin tube shock absorber. In other examples, the shock absorber 100 is a monotube shock absorber. In one example, the shock absorber 100 can be used as strut. In other examples, the shock absorber 100 can be used as a shock absorber. In some examples, the shock absorber 100 is at least partially ornamental in nature and features nonfunctional elements.

In the depicted example, the shock absorber 100 has a first attachment point 102 and a second attachment point 104 positioned at either end of the shock absorber 100. As shown schematically, the first attachment point 102 can be attached to a first surface 106 and the second attachment point 104 can be attached to a second surface 108. During operation, the first surface 106 and the second surface 108 can move with respect to one other. In some examples, the first and second surfaces 106, 108 are surfaces on a vehicle such as a car, motorcycle, bicycle, etc. The shock absorber 100 is configured to damp kinetic energy transferred between the first and second attachment points 102, 104 using a damping medium that flows within the shock absorber 100. In some examples, the damping medium is a fluid, such as an oil.

A cross sectional view along line 2-2 in FIG. 1 of the shock absorber 100 is shown in FIG. 2. The shock absorber 100 includes an inner tube 110, an outer tube 112, a piston 114, a piston rod 116, a manifold 118, and a pressure reservoir 120. Optionally, the shock absorber 100 can also include a coil spring 109.

In some examples, the coil spring 109 can be retained around the shock absorber 100 between a ring 103 and a cup 105. In some examples, the ring 103 is attached to the outer tube 112 and the cup is positioned around the piston rod 116. In some examples, the ring is threadably adjustable around the outer tube 112 to alter the preload exerted on the spring by the ring 103 and cup 105.

The inner tube 110 includes an interior volume 122 that is divided into a first chamber 124 and a second chamber 126 by the piston 114. Each chamber 124, 126 can be filled with the damping medium. The volume of each chamber 124, 126 can be altered as the piston 114 moves within the inner tube 110.

The outer tube 112 is positioned around the inner tube 110. As shown, the inner and outer tubes 110, 112 define an annular fluid flow passage 128 between the tubes 110, 112. The annular fluid flow passage 128 facilitates fluid flow between the second chamber 126, the first chamber 124, and the manifold 118. In some examples, the inner tube 112 is captured between the manifold 118 and a cap 113. In some examples, the cap 113 is attached to the outer tube 112 and the outer tube 112 is attached to the manifold 118. In some examples, the outer tube 112 is captured between the manifold 118 and the cap 113. In some examples, the cap 113 is attached to the inner tube 110 and the inner tube 110 is attached to the manifold 118.

The piston 114 is connected to the piston rod 116 and is configured to move within the inner tube 110 as the second surface 108 moves. In some examples, the piston 114 is configured to allow fluid flow therethrough during operation, such operation will be discussed in more detail below with respect to in FIGS. 27-30

The manifold 118 is in contact with, and in fluid communication with, the inner and outer tubes 110, 112. In some examples, the manifold 118 is attached to the outer tube 112 and not attached to the inner tube 110. In some examples, the manifold 118 is attached to the inner tube 110 and not attached to the outer tube 112. The manifold 118 includes a plurality of fluid flow passages therein to facilitate fluid flow within the shock absorber 100. Such fluid flow passages will be explained in more detail with respect to FIGS. 4-8. In some examples, the manifold 118 houses at least one high-speed valve 130. As depicted, the manifold 118 includes a pair of high speed valves 130. In some examples, the manifold 118 can also house at least one low speed valve 132. As depicted, the manifold 118 includes a pair of low speed valves 132. The high speed valves 130 and the low speed valves 132 will be discussed in more detail herein with respect to FIGS. 8-18.

The pressure reservoir 120 is attached to, and in fluid communication with, the manifold 118. The pressure reservoir 120 can include a floating piston 134 that divides an internal chamber 136 into a first pressure reservoir chamber 138 and a second pressure reservoir chamber 140. The second pressure reservoir chamber 140 can be pressurized via a secondary medium different from that of the damping medium. In some examples, the secondary medium can be a gas. The pressure reservoir 120 pressurizes the damping fluid within the shock absorber 100 so that there exists a positive damping fluid pressure in both the first and second chambers 124, 126 of the inner tube 110.

During operation of the shock absorber 100, the piston rod 116 moves the piston 114 within the inner tube 110 of the shock absorber 100. As the piston 114 moves within the inner tube 110, the piston 114 displaces damping fluid contained within either the first or second chambers 124, 126. If damping fluid is displaced from the first chamber 124 by the piston 114, such an event is referred to as a compression event for the shock absorber 100. If damping fluid is displaced from the second chamber 126 by the piston 114, such an event is referred to as a rebound event.

Generally, when damping fluid is displaced from either the first or second chambers 124, 126 of the inner tube 110, the damping fluid travels through the manifold 118 and back into the opposite chamber of the inner tube 110 from which it was displaced. In some examples, fluid flow can also travel through the high speed valve 130 and/or the low speed valve 132 before returning to the opposite chamber.

In some examples, fluid flow into and out of the first chamber 124 of the inner tube 110 can occur within the manifold 118. In some examples, fluid flow into and out of the second chamber 126 of the inner tube 110 can occur partially within the manifold 118 and partially within the annular fluid flow passage 128 between the inner and outer tubes 110, 112.

Figure 4:
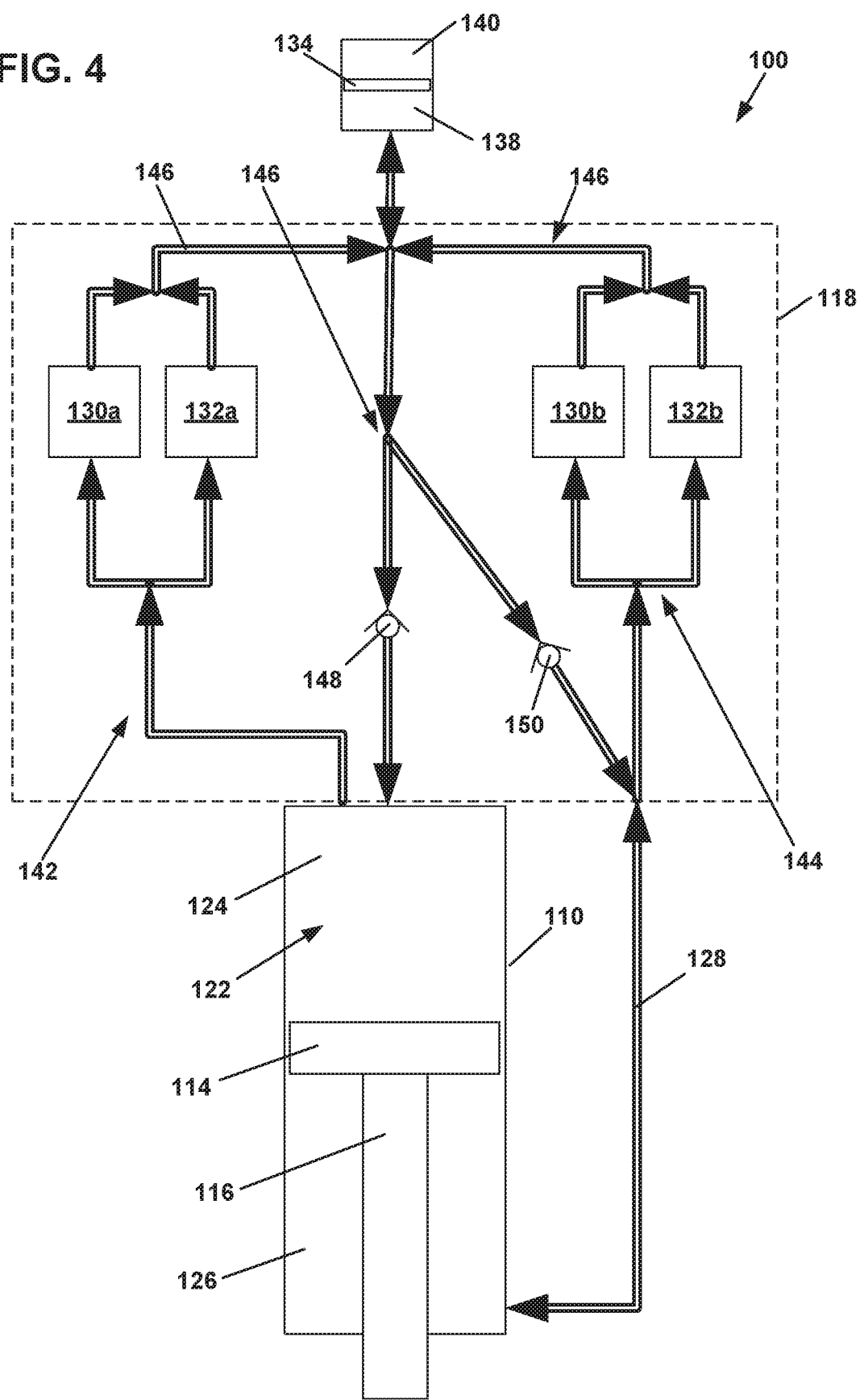
FIG. 4 illustrates a schematic representation of the shock absorber of FIG. 1.

FIG. 4 shows the schematic representation of the shock absorber 100. The shock absorber 100 includes a first chamber passage 142, a second chamber passage 144, a third shared passage 146, a first chamber check valve 148, and a second chamber check valve 150. As noted above, the manifold 118 includes a plurality of fluid flow passages including, but not limited to, the first chamber passage 142, the second chamber passage 144, and the third shared passage 146. The manifold 118 is also shown to include a pair of high-speed valves 130a, 130b and a pair of low speed valves, 132a, 132b. Further, as depicted, the pressure reservoir 120 and the annular fluid flow passage 128 are in fluid communication with the manifold 118.

The first chamber passage 142 connects the first chamber 124 of the inner tube 110 to the high-speed valve 130a and the low speed valve 132a. In some examples, the first chamber passage 142 is entirely contained within the manifold 118. In other examples, the first chamber passage 142 can be partially external of the manifold 118. In some examples, fluid flow leaves the first chamber 124 via the first chamber passage 142. Once fluid flow reaches the high speed valve 130a and low speed valve 132a, fluid flow can then pass through either and/or both of the high speed valve 130a and the low speed valve 132a.

Depending on the rate of fluid flow through the shock absorber 100 during operation, fluid flows through either the high-speed valve 130a or the low speed valve 132a. This fluid flow rate is determined by the speed at which the piston rod 116 moves the piston 114 within the inner tube 110. For example, when fluid flow is moving relatively quickly, sufficient fluid pressure is created so that fluid can pass through and interact with the high speed valve 130a. Similarly, when fluid flow is moving relatively slowly, generating lower pressure, fluid can pass through and interact with the low speed valve 132a. In some examples, the low speed valve 132a can be always open and therefore always allow a certain amount of flow (sometimes referred to as bleed) therethrough. Further, as described in more detail herein with respect to FIGS. 8-18, the high speed valve 130a and the low speed valve 132a can be configured to alter the damping characteristics and operation of the shock absorber 100 by changing how the fluid flow travels within the manifold 118.

The second chamber passage 144 is in communication with the second chamber 126 of the inner tube 110. In some examples, the second chamber passage 144 is in indirect communication with the second chamber 126. In some examples, the second chamber passage 144 is connected to the annular fluid flow passage 128 to connect to the second chamber 126 of the inner tube 110. In some examples, the second chamber passage 144 is entirely contained within the manifold 118. In other examples, the second chamber passage 144 can be partially external of the manifold 118.

In the depicted example, fluid flow leaves the second chamber 126 via the annular fluid flow passage 128 which connects with the second chamber passage 144 within the manifold 118. Fluid flow can then pass through either and/or both the high speed valve 130b and the low speed valve 132b.

In some examples, the high-speed valve 130b and the low speed valve 132b are substantially similar to the high speed valve 130a and the low speed valve 132a in both construction and operation. In some examples, the high speed valve 130b and the low speed valve 132b can have different operating characteristics from the high speed valve 130a and the low speed valve 132a. The high speed valve 130b and the low speed valve 132b can be configured to alter the damping characteristics and operation of the shock absorber 100 by changing how the fluid flow interacts with the high speed valve 130b and the low speed valve 132b.

The third shared passage 146 is in fluid communication with the first chamber passage 142 and the second chamber passage 144. The third shared passage 146 is configured to deliver fluid to either the first or second chambers 124, 126 of the inner tube 110. The third shared passage 146 receives fluid from the first chamber passage 142 via the high speed valve 130a and low speed valve 132a. The third shared passage 146 receives fluid from the second chamber passage 144 via the high speed valve 130b and low speed valve 132b. Due to the configuration of the shock absorber 100, the third shared passage 146 will only receive fluid flow from one of the first chamber passage 142 or the second chamber passage 144 at a time.

In some examples, the pressure reservoir 120 can be in fluid communication with the third shared passage 146. Because the third shared passage 146 contains a lower fluid pressure than the first chamber passage 142 and the second chamber passage 144, the pressure reservoir 120 is therefore in communication at all times with a low pressure portion of the shock absorber 100. This allows the overall shock absorber to operate with lower pressures, thereby increasing the stability and reliability of the shock absorber 100. In some examples, the pressure reservoir 120 reduces cavitation within the inner tube 110 when the piston 114 is moving therein.

The first chamber check valve 148 is a valve that is configured to prevent fluid flow from the first chamber 124 into the third shared passage 146 and only allow fluid from the third shared passage 146 into the first chamber 124. In some examples, the first chamber check valve 148 can be a spring-loaded valve. In such an example, the spring of the check valve 148 can be tuned so that the check valve operates and opens only at certain pressures.

The second chamber check valve 150 is a valve that is configured to prevent fluid flow from the second chamber 126 into the third shared passage 146 and only allow fluid from the third shared passage 146 into the second chamber 126. In some examples, the second chamber check valve 150 can be substantially similar to the first chamber check valve 148.

Figure 5:
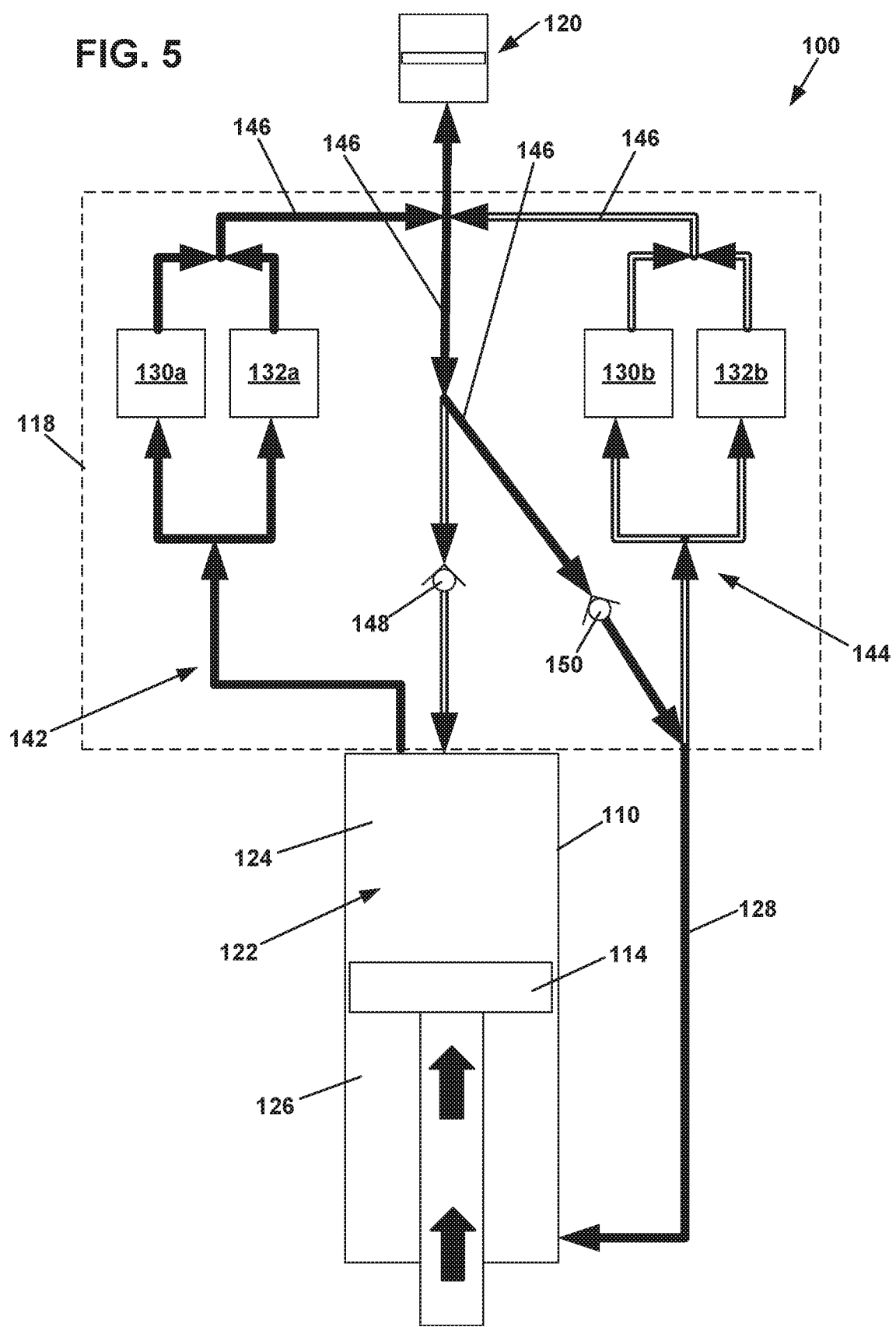
FIG. 5 illustrates a schematic representation of the shock absorber of FIG. 1 during a compression event.

FIG. 5 shows the shock absorber 100 during a compression event. During a compression event, piston 114 forces fluid from the first chamber 124 of the inner tube 110 to the first chamber passage 142. Fluid then flows through the high-speed valve 130a if it's a high speed compression event and/or through the low speed valve 132a if it's a low speed compression event. An example of a high speed compression event would be a vehicle hitting a pothole or braking hard. An example of a low speed compression event would be a vehicle transferring its weight during cornering or traversing a gradual undulation in the road. In some examples, the high speed valve 130a will only allow fluid flow therethrough when certain pressures exist in the first chamber passage 142. The low speed valve 132a is configured to allow fluid flow therethrough at pressures that are lower than those required to open the high speed valve 130a.

Once fluid passes through the high speed valve 130a and/or the low speed valve 132a, fluid flow enters the third shared passage 146. Once within the third shared passage 146, the fluid flows through the shared passage 146, through the second check valve 150, into the annular fluid flow passage 128, and finally into the second chamber 126. Return fluid flow into the second chamber 126 is at a lower fluid pressure relative to fluid leaving the first chamber 124.

When fluid is within the third shared passage 146, fluid cannot flow through the first chamber check valve 148 due to pressure on the opposite side of the first chamber check valve 148, within the first chamber 124. Such pressure is created within the first chamber 124 by the compression movement of the piston 114.

Fluid flow is allowed through the second chamber check valve 150 due to a lack of pressure on the opposite side of the valve 150. This is due to the fact that fluid flow is entering the second chamber 126 and not leaving the second chamber 126. If fluid flow was leaving the second chamber 126, such flow would exert pressure on the opposite side of the second chamber check valve 150, thereby preventing flow between the third shared passage 146 and the second chamber 126.

Figure 6:
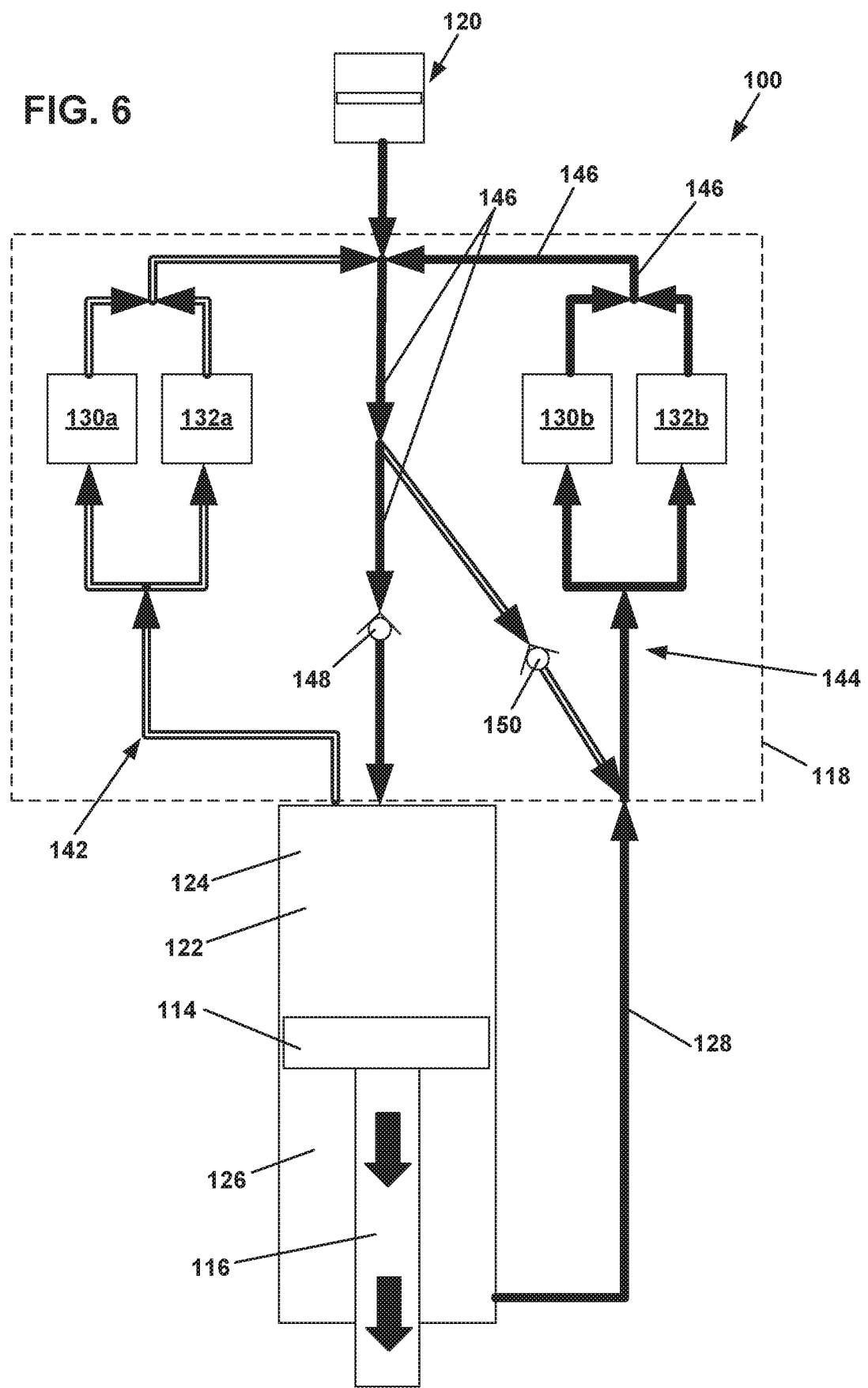
FIG. 6 illustrates a schematic representation of the shock absorber of FIG. 1 during a rebound event.

FIG. 6 shows the shock absorber during a rebound event. The rebound event is opposite of a compression event. During a rebound event, the piston 114 forces fluid from the second chamber 126. As fluid exits the second chamber 126, it enters the annular passage 128. From the annular passage 128, fluid flows into the second chamber passage 144 until it reaches the high speed valve 130b and the low speed valve 132b. Just like during the compression event, fluid flows through the high speed valve 130b and/or the low speed valve 132b to reach the third shared passage 146. Once within the third shared passage 146, fluid flows from the third shared passage 146, through the first chamber check valve 148, and into the first chamber 124. Fluid is allowed through the first chamber check valve 148 because fluid is entering the first chamber 124, and not leaving, therefore little pressure exists on the first chamber side of the first chamber check valve 148. Return fluid flow into the first chamber 124 is at a lower fluid pressure relative to fluid leaving the second chamber 126.

Figure 3:
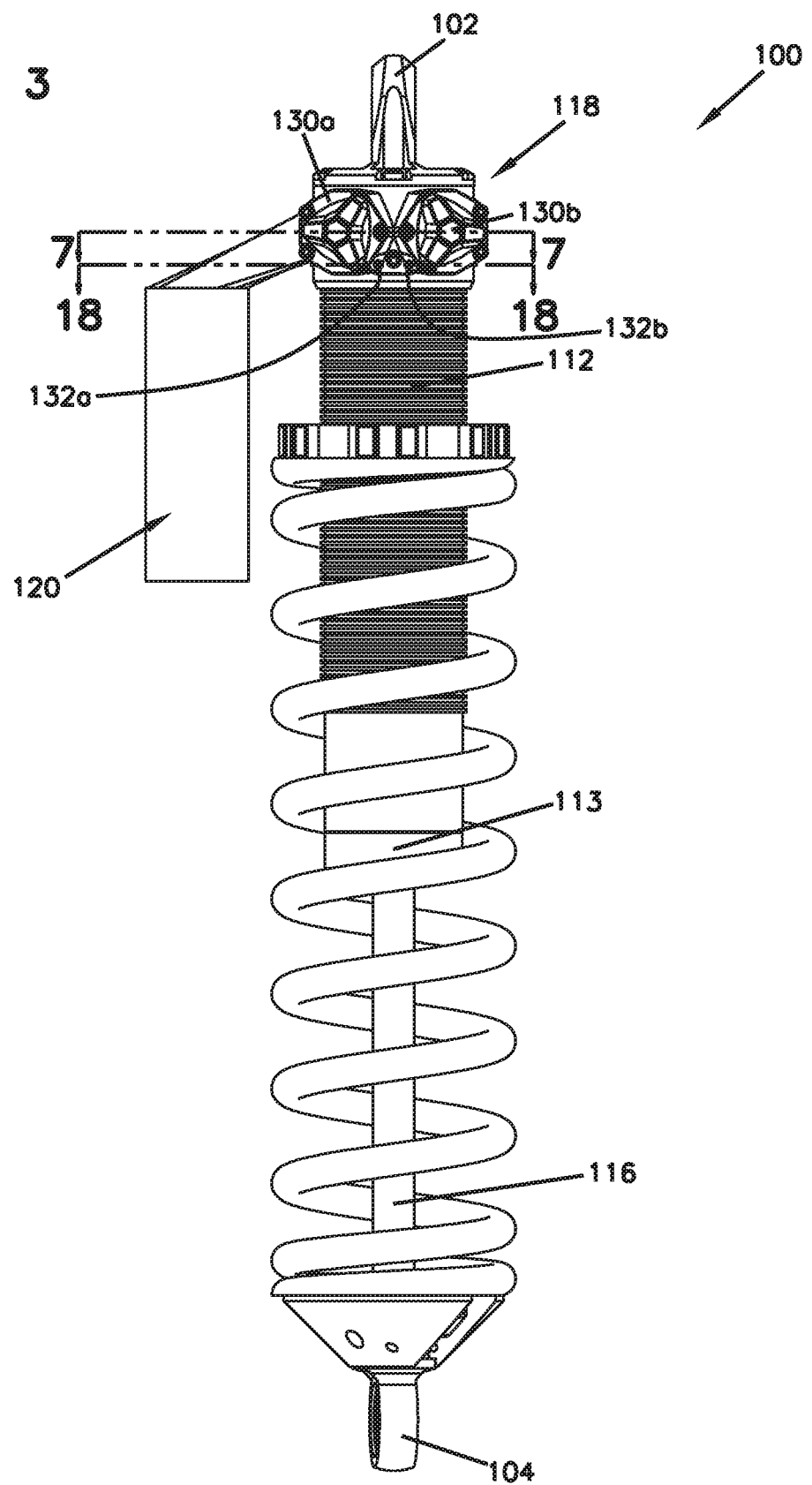
FIG. 3 illustrates a front view of the shock absorber of FIG. 1.
Figure 7:
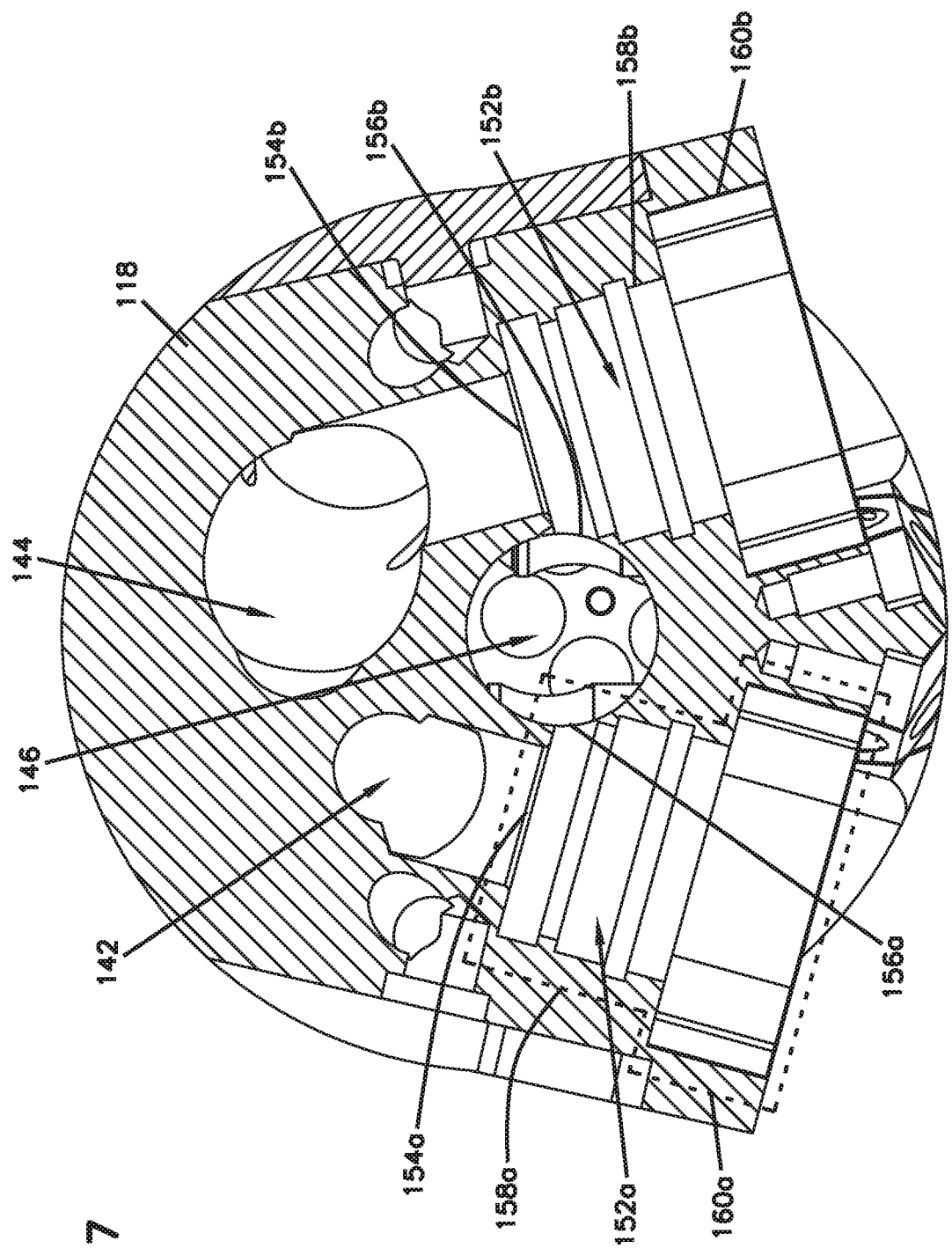
FIG. 7 illustrates a cross sectional view of the manifold of the shock absorber along line 7-7 in FIG. 3.

FIG. 7 shows a cross sectional view of only the manifold 118 along line 7-7 in FIG. 3. In the depicted example, the manifold 118 includes a pair of substantially similar valve chambers 152a, 152b. Each valve chamber 152a, 152b includes a first opening 154a, 154b, a second opening 156a, 156b, a wet portion 158a, 158b, and a dry portion 160a, 160b.

The valve chamber 152a corresponds with the first chamber passage 142 and the valve chamber 152b corresponds with the second chamber passage 144. In some examples, the valve chambers 152a, 152b are substantially similar. Therefore, the first chamber passage 142 and the second chamber passage 144 are connected to the third shared passage 146 by way of the valve chambers 152a, 152b.

The first opening 154a, 154b of each valve chamber 152a, 152b connects the valve chamber 152a, 152b to the first chamber passage 142 and the second opening 156, respectively.

The second openings 156a, 156b connect the valve chambers 152a, 152b to the third shared passage 146.

The wet portion 158a, 158b of each valve chamber 152a, 152b is configured to be in at least partial communication with the damping fluid contained within the shock absorber 100 (i.e., "wet"). Conversely, the dry portion 160a, 160b is configured to not be in contact with the fluid of the shock absorber 100 (i.e., "dry"). In some examples, the wet portion 158a, 158b can be configured to be a different shape from the dry portion 160a, 160b.

Figure 8:
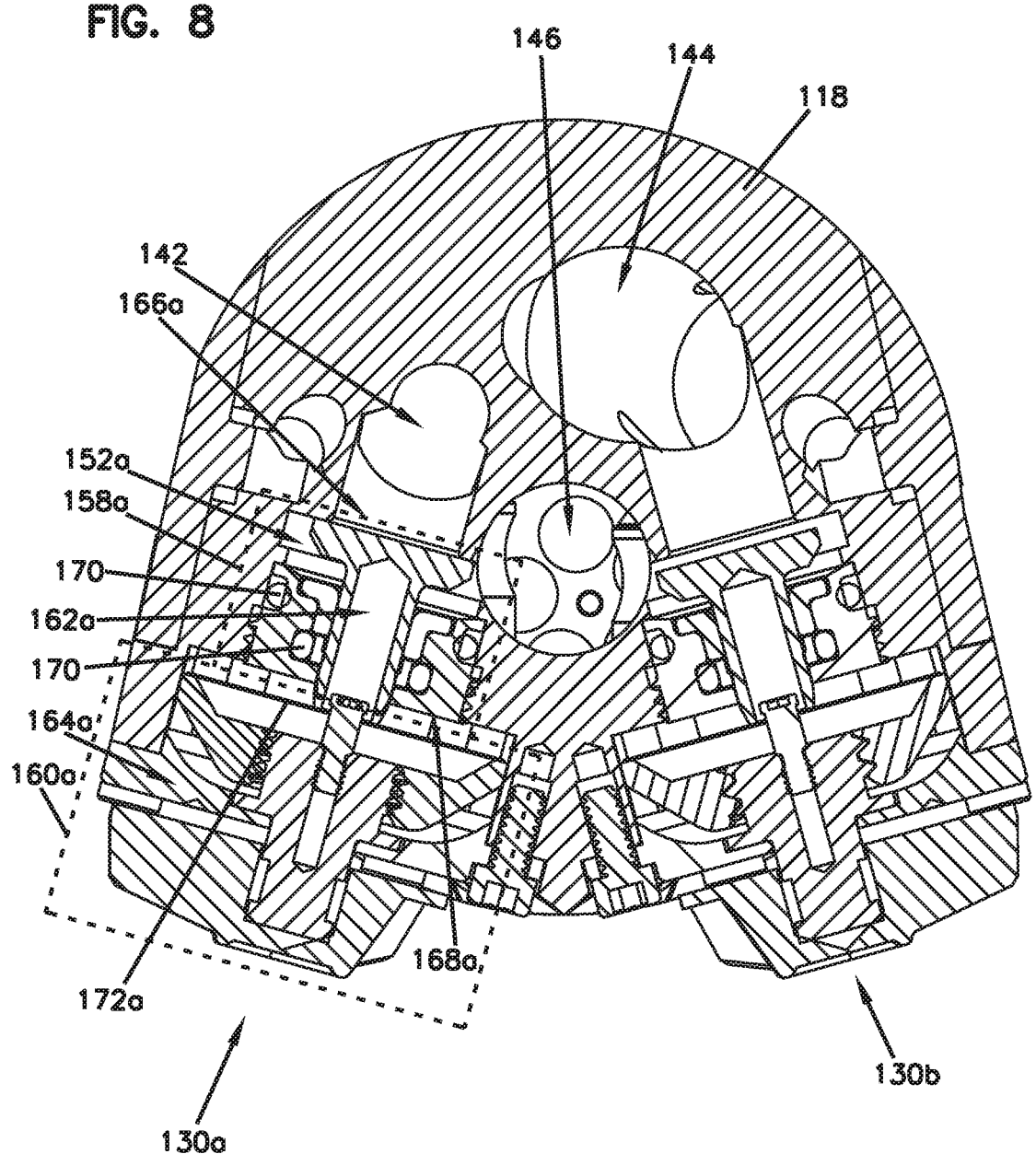
FIG. 8 illustrates a cross sectional view of the shock absorber along line 7-7 in FIG. 3.

FIG. 8 shows a cross sectional view of the shock absorber 100 along line 7-7 in FIG. 3. As shown, each valve 130a, 130b includes a first assembly 162a, 162b and a second assembly 164a, 164b. The first assembly 162a, 162b of each valve 130a, 130b is positioned within the wet portion 158a, 158b of each valve chamber 152a, 152b. The second assembly 164a, 164b of each valve 130a, 130b is positioned within the dry portion 160a, 160b of each valve chamber 152a, 152b.

The first assembly 162a, 162b is positioned adjacent to, and in communication with, the second assembly 164a, 164b. Because the first assembly 162a, 162b is positioned within the wet portion 158a, 158b of the valve chamber 152a, 152b, the first assembly 162a, 162b is the only portion of the valve 130a, 130b that comes in contact with fluid from the shock absorber 100.

In some examples, the first assembly 162a, 162b seals the wet portion 158a, 158b from the dry portion 160a, 160b. Specifically, the first assembly 162a, 162b includes a first side 166a, 166b and a second side 168a, 168b. At the first side 166a, 166b, the first assembly 162a, 162b encounters fluid from the shock absorber 100. At the second side, 168a, 168b, the first assembly 162a, 162b is in communication with the second assembly 164a, 164b. In some examples, to seal the wet portion 158a, 158b from the dry portion 160a, 160b, the first assembly 162a, 162b includes at least one seal 170 between the first side 166a, 166b and the second side 168a, 168b.

The first assembly 162a, 162b, is further configured to selectively allow fluid flow between the first opening 154a, 154b and the second opening 156a, 156b within the wet portion 158a. 158b of the valve chamber 152a, 152b. For example, the first assembly 162a selectively allows fluid flow from the first chamber passage 142 into the first opening 154a, into the wet portion 158a of the valve chamber 152a, out of the second opening 156a, and into the third shared passage 146.

The second assembly 164a, 164b of the valve 130a, 130b is configured to alter the behavior of the first assembly 162a, 162b. In some examples, the second assembly 164a, 164b is separable from the first assembly 162a, 162b. Specifically, the second assembly 164a, 164b controls the first assembly 162a, 162b to selectively allow fluid flow between the first opening 154a, 154b and the second opening 156a, 156b. In some examples, this control is accomplished via a spring 172a, 172b in the second assembly 164a, 164b.

By controlling the flow through the first opening 154a, 154b and the second opening 156a, 156b of each valve chamber 152a, 152b, the valves 130a, 130b can control the damping behavior of the shock absorber 100. For example, the valves 130a, 130b can make it relatively difficult for fluid to flow through the first opening 154a, 154b to the second opening 156a, 156b of the valve chamber 152a, 152b, thus, resulting in high fluid pressure and a stiff shock absorber response (force). Alternatively, the valves 130a, 130b can make it relatively easy for fluid to flow from the first opening 154a, 154b to the second opening 156a, 156b of each valve chamber 152a, 152b, thus, resulting in low fluid pressure and a soft shock absorber response (force).

In some examples, each valve 130a, 130b can be independently adjustable to independently control when, and how much, fluid flows through the first opening 154a, 154b to the second opening 156a, 156b. For example, the valve 130a can allow fluid flow from the first chamber passage 142 to the third shared passage 146 when a threshold pressure exists. Such threshold pressure can be equal to, or different from, the threshold pressure required to at least partially open valve 130b. In some examples, as the pressure increases past the threshold pressure, the fluid flow from the first chamber passage 142 to the third shared passage 146 can increase. In some examples, the adjustability of the valve 130a, 130b is controlled by the second assembly 164a, 164b.

In some examples, the second assembly 164a, 164b of each valve 130a, 130b is configured to be readily removable from the manifold 118 to allow the user to quickly and easily change the damping characteristic of the shock absorber 100 (e.g., threshold pressure to open each valve). When the second assembly 164a, 164b is removed from the valve chamber 152a, 152b, the first assembly 162a, 162b maintains a seal within the valve chamber 152a, 152b so that that all damping fluid within the shock absorber 100 remains within the shock absorber 100. This allows the user to change out second assemblies 164a, 164b without damping fluid escaping from the shock absorber 100 and without foreign fluids or gas entering shock absorber 100.

The user may want to change out second assemblies 164a, 164b for maintenance or to alter the damping behavior of the shock absorber 100. A variety of different second assemblies 164a, 164b can be installed into the manifold 118 to alter damping behavior. For example, an adjustable second assembly 164a, 164b can be installed within the valve chamber 152a, 152b that allows the user to alter the behavior of the valve 130a, 130b within a set range of parameters. In other examples, a non-adjustable second assembly 164a, 164b can be installed within the valve chamber 152a, 152b that prevents the user from further adjusting the damping behavior of the shock absorber 100.

Figure 9:
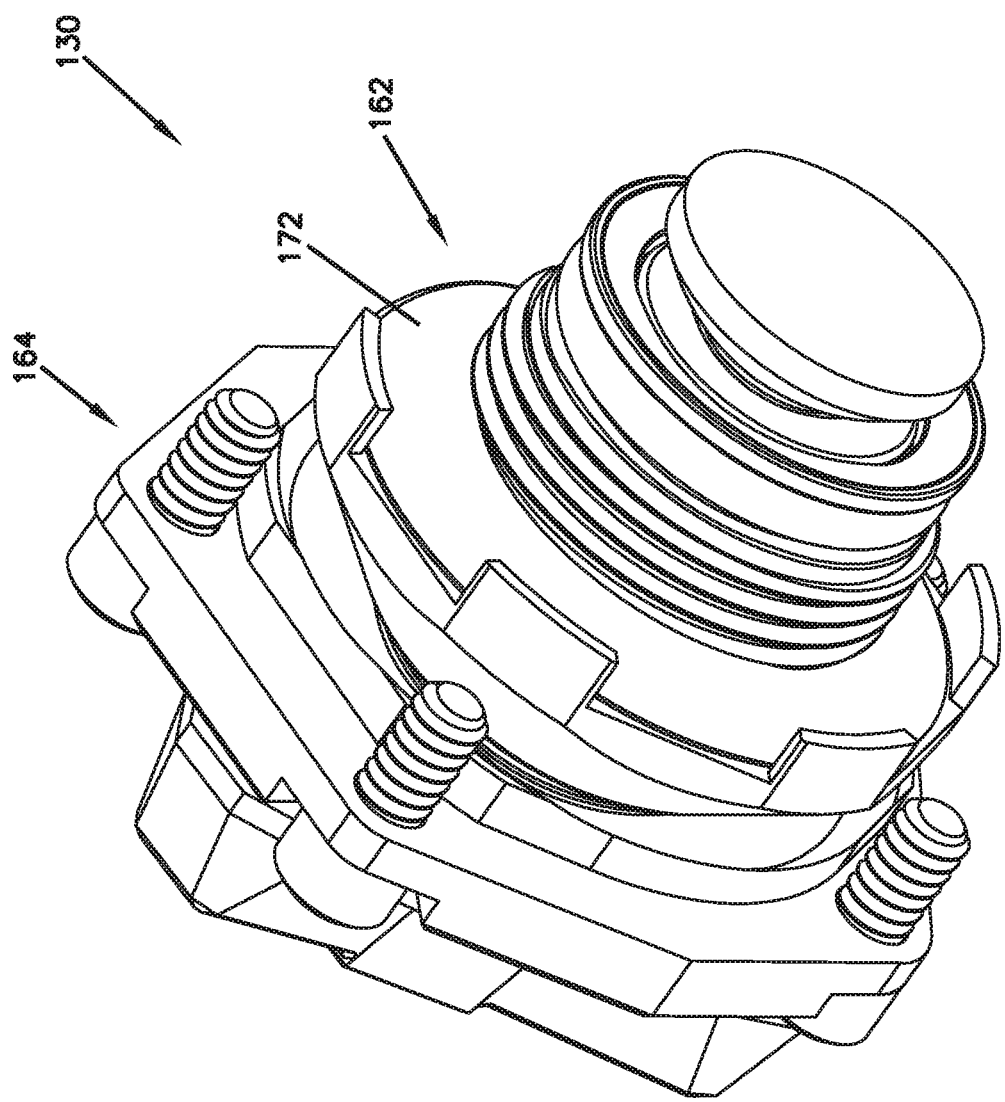
FIG. 9 illustrates a perspective view of a high speed valve, according to one embodiment of the present disclosure.
Figure 10:
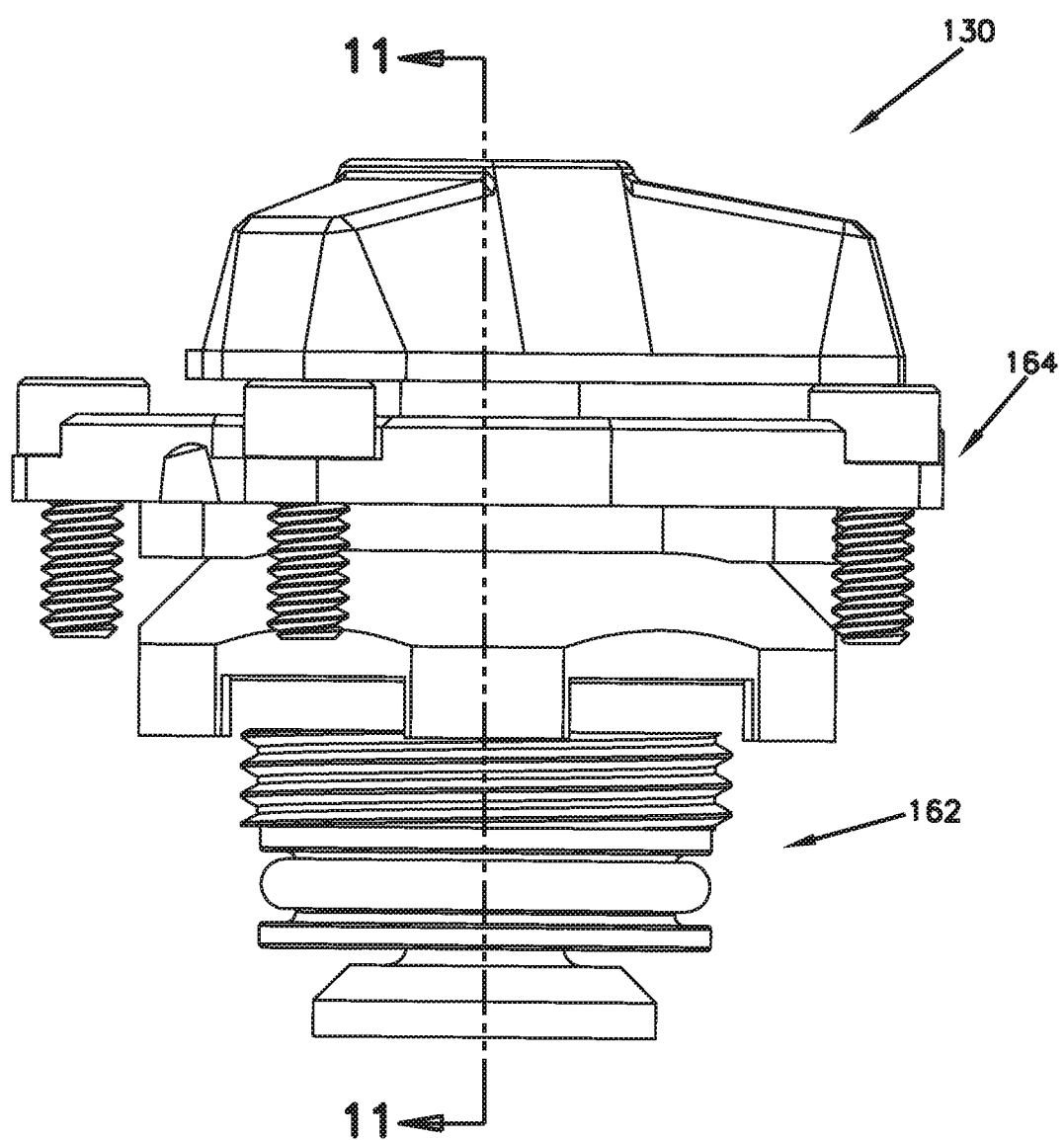
FIG. 10 illustrates a side view of the high speed valve of FIG. 9.
Figure 11:
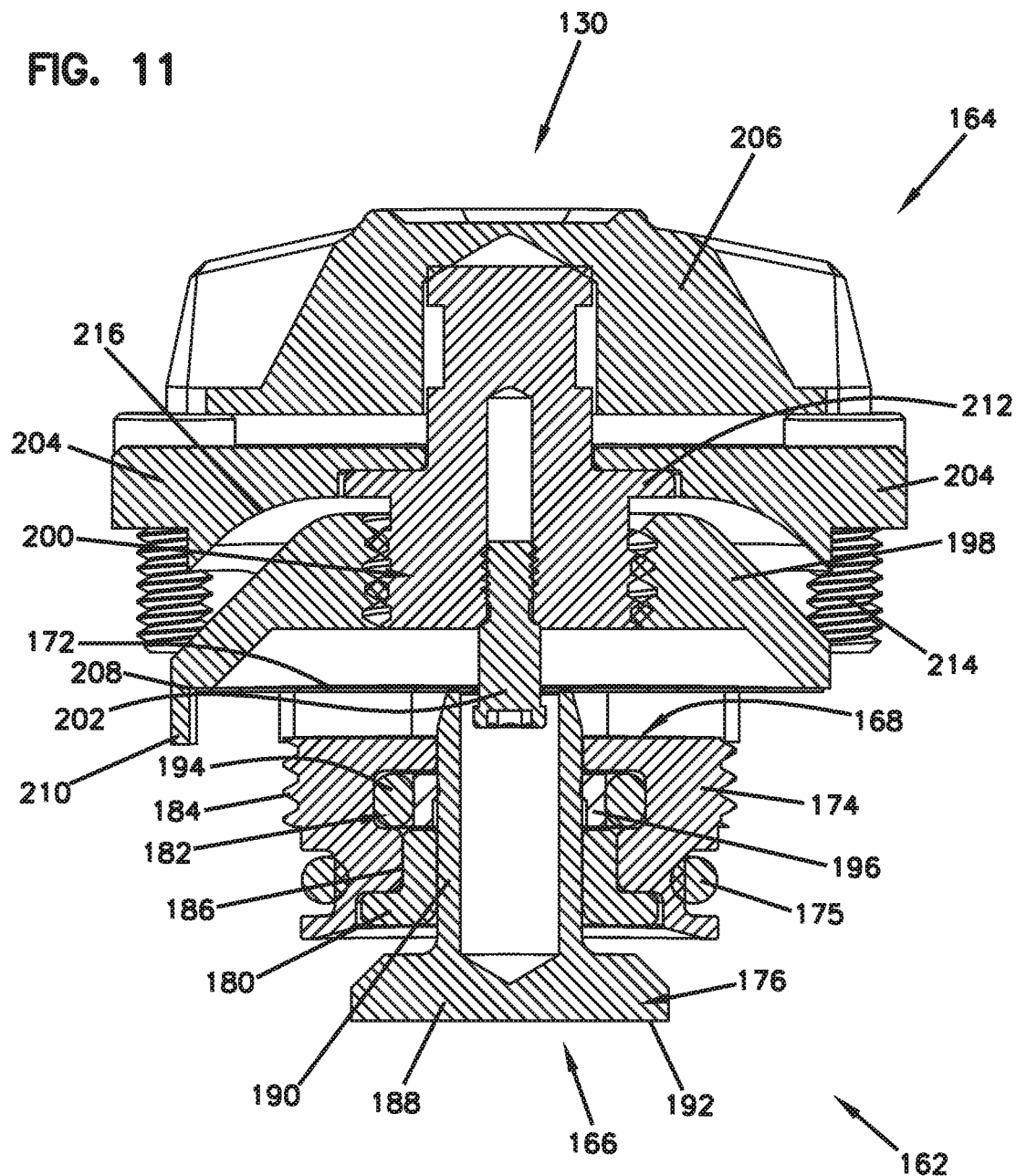
FIG. 11 illustrates a cross sectional view of the high speed valve along line 11-11 in FIG. 10.

FIG. 9 shows a perspective view of one of the valves 130a, 130b with the first assembly 162 and the second assembly 164 being positioned immediately adjacent to one another, similar to their position when installed in the manifold 118. FIG. 10 shows a side view of the valve 130, and FIG. 11 shows a cross-sectional view of the valve 130 along line 11-11 in FIG. 10.

The first assembly 162 includes the first side 166, the second side 168, a housing 174, a housing seal 175 positioned around the housing 174, a movable valve portion 176 positioned at least partially within the housing 174, a valve bushing 180, and a valve seal 182. The valve bushing 180 and the valve seal 182 are positioned around the movable valve portion 176, between the movable valve portion 176 and the housing 174.

The housing 174 is configured to be positioned within the wet portion 158 of the valve chamber 152. In some examples, the housing 174 includes external threads 184 to allow the housing 174 to be threaded into the valve chamber 152. The housing 174 defines a central aperture 186, of which the movable valve portion 176, valve bushing 180, and valve seal 182 are positioned within.

The housing seal 175 surrounds the housing 174 and is configured to form a seal between the housing 174 and the valve chamber 152. In some examples, the housing seal is a rubber O-ring.

The movable valve portion 176 is configured to either open or close the first opening 154 of the valve chamber 152. In some examples, the movable valve portion 176 has a head 188 connected to a valve shaft 190. The valve head 188 includes a valve face 192 that is configured to seal the first opening 154 of the valve chamber 152. In some examples, the movable valve portion 176 is a poppet valve.

The movable valve portion 176 is configured to move longitudinally within the central aperture 186 of the housing 174. Specifically, the valve shaft 190 is positioned to be movable within central aperture 186 of the housing 174. In some examples, at least the valve head 188 is configured to come into contact with the damping fluid of the shock absorber 100.

The valve bushing 180 is positioned around the shaft 190 of the movable valve portion 176. The valve bushing 180 aids in stabilizing and easing the movement of the valve shaft 190 within the central aperture 186 of the housing 174. In some examples, the valve bushing 180 can be optionally included in the first assembly 162. In some examples, the housing 174 and/or the movable valve portion 176 can be anodized to help reduce friction therebetween.

The valve seal 182 is also positioned around the valve shaft 190 and is configured to form a seal between the valve shaft 190 and the central aperture 186 of the housing 174. In some examples, the valve seal 182 is a spring energized seal. For example, the valve seal 182 can be a spring energized O-ring having an O-ring 194 and a seal body 196.

The second assembly 164 of the high speed valve 130 includes the spring 172, a spring preload adjuster 198, an adjustment shaft 200, a spring fastener 202, a valve cap 204, and an adjustment knob 206. In some examples, the second assembly 164 is configured to contact the first assembly 162 in order to control its behavior.

The second assembly can be configured in a variety of different ways. In some examples, the second assembly 164 only includes the spring 172 and a housing (such as the spring retainer 198, adjustment shaft 200, valve cap 204, or the like) to hold the spring 172 in communication with the movable valve portion 176. In some examples, the second assembly 164 can be configured so that the spring 172 is non-adjustable. In other examples, the second assembly 164 can be configured so that the spring 172 is adjustable.

The spring 172 is configured to resist the movement of the movable valve portion 176 of the first assembly 162, thereby controlling the overall damping behavior of the high speed valve 130. In one example, the spring 172 is a disc. In some examples, the spring 172 is a Belleville spring (also known as a Belleville washer). In some examples, the spring 172 is a perforated disc spring. In some examples, the spring 172 has a coned, conical, cupped, or trapezoidal cross section. In other examples, the spring 172 can have a frusto-conical shape. In other examples, a compression spring such as a helical spring or a conical spring can also be used. In still other examples, multiple springs can be used (e.g., multiple discs). A multitude of springs of varying types and amounts can be used and is considered within the scope of the present disclosure.

In some examples, the spring 172 can receive a force along its axis. The stiffer the spring 172, the higher the spring force, and therefore the higher the force required to by the movable valve portion 176 to deflect the spring 172.

In the depicted example, when positioned adjacent the first assembly 162, the spring 172 is configured to be held between a portion of the second assembly 164 and the movable valve portion 176. Specifically, the spring 172 is positioned between the spring preload adjuster 198 and the movable valve portion 176. In some examples, the spring 172 is configured to be in direct contact with the movable valve portion 176. In other examples, the spring 172 is configured to be in indirect contact with the movable valve portion 176. In some examples, the spring 172 is attached to a portion of the second assembly 164 via the fastener 202. In other examples, the spring 172 is captured between, and not attached to, a portion of the second assembly 164 and the movable valve portion 176. In some examples, the fastener 202 is attached to the adjustment shaft 200 to anchor the spring 172 to the spring preload adjuster 198.

The spring preload adjuster 198 is configured to capture the spring 172. In some examples, the spring preload adjuster 198 is movable within the second assembly 164. In other examples, the spring preload adjuster 198 is fixed with respect to the valve cap 204.

The spring preload adjuster 198, in some examples, includes a flange 208 that is configured to interface with a portion of the spring 172. The flange 208 can interface with an outer portion of the spring 172. In some examples, the spring preload adjuster 198 includes at least one stop 210 that can be configured to limit the movement of the spring preload adjuster 198 and/or properly position the spring preload adjuster 198 when installed in the valve chamber 152 of the manifold 118.

The optional adjustment shaft 200 is configured to be attached (e.g., threaded) into the spring preload adjuster 198. In some examples, as the adjustment shaft 200 can be either threaded into or out of the spring preload adjuster 198 to cause relative movement therebetween. As shown, the adjustment shaft 200 is attached to the adjustment knob 206 so that, as the adjustment knob 206 is rotated, the adjustment shaft 200 is rotated. The adjustment shaft 200 can also include a valve cap flange 212 that is configured to contact an underside of the valve cap 204 to retain the adjustment shaft 200 within the second assembly 164. In some examples, the adjustment shaft 200 can be fixed to the spring preload adjuster 198. In some examples, the valve cap flange 212 can be in contact with the spring preload adjuster 198 at a minimum adjustability setting.

As noted above, the spring fastener 202 is configured to attach the spring 172 to the second assembly 164. In some examples, a portion of the spring fastener 202 can be positioned within the valve shaft 190 of the movable valve portion 176. In some examples, the spring fastener 202 is a threaded fastener. In other examples, the fastener is a bolt that is positioned within the adjustment shaft 200.

The valve cap 204 is configured to secure the second assembly 164 to the manifold 118 via a plurality of valve cap fasteners 214. The valve cap 204 can include an interior contour 216 that is shaped similar to that of the shape of the spring preload adjuster 198. In some examples, the interior contour 216 of the valve cap 204 is generally rounded (e.g., domed).

The adjustment knob 206 is attached to the adjustment shaft 200 to facilitate the movement of the spring preload adjuster 198 within the second assembly 164. When the valve 130 is positioned within the manifold 118, as the adjustment knob 206 is rotated, the spring preload adjuster's position with respect to the movable valve portion 176 of the first assembly 162 can be altered. In some examples, the adjustment knob 206 is configured to a have a plurality of rotational detent positions (i.e., clicks) to allow the user to rotate the adjustment knob 206 to a predetermined position. In some examples, the adjustment knob 206 is at least partially ornamental in nature and features nonfunctional elements. In some examples, the adjustment knob 206 can be manually rotated. In other examples, the adjustment knob 206 can be replaced with a powered device such as a servo motor to allow for remote control of the movement of the spring preload adjuster 198.

Figure 12:
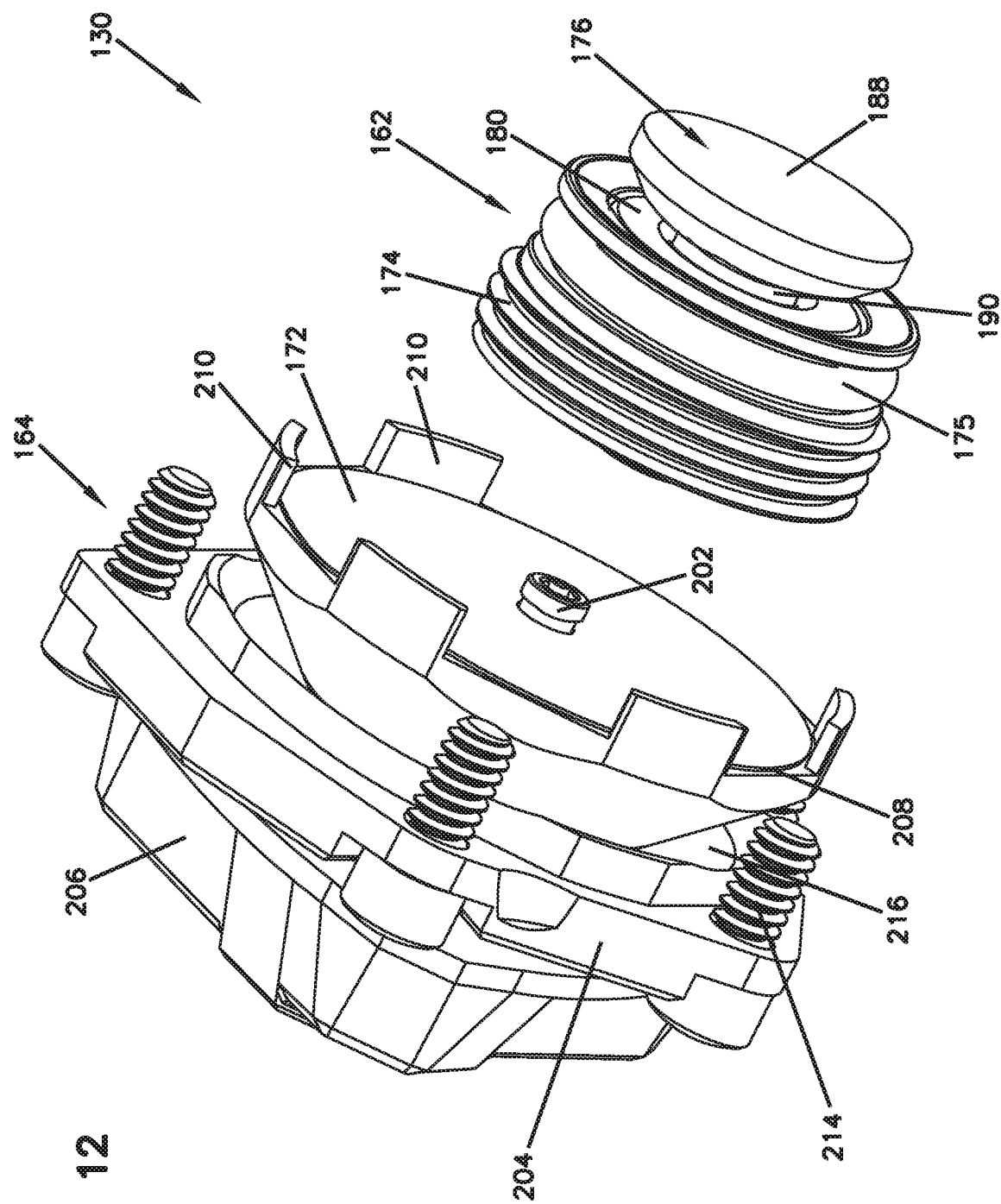
FIG. 12 illustrates a partially exploded view of the high speed valve of FIG. 9.

FIG. 12 shows a perspective view of the first assembly 162 and the second assembly 164 of the high speed valve 130 partially separated.

Figure 13:
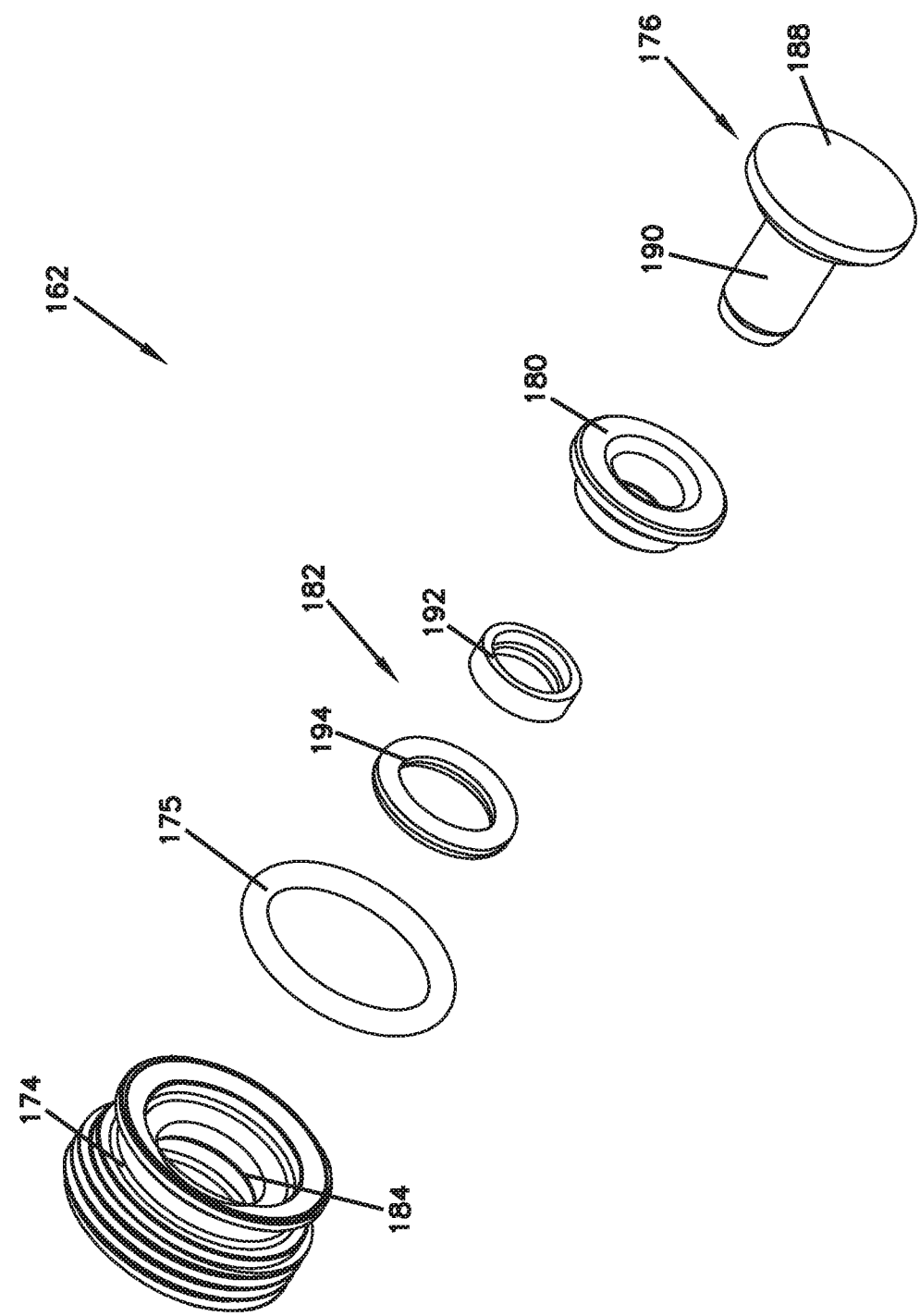
FIG. 13 illustrates a front exploded view of a first assembly of the high speed valve of FIG. 9.
Figure 14:
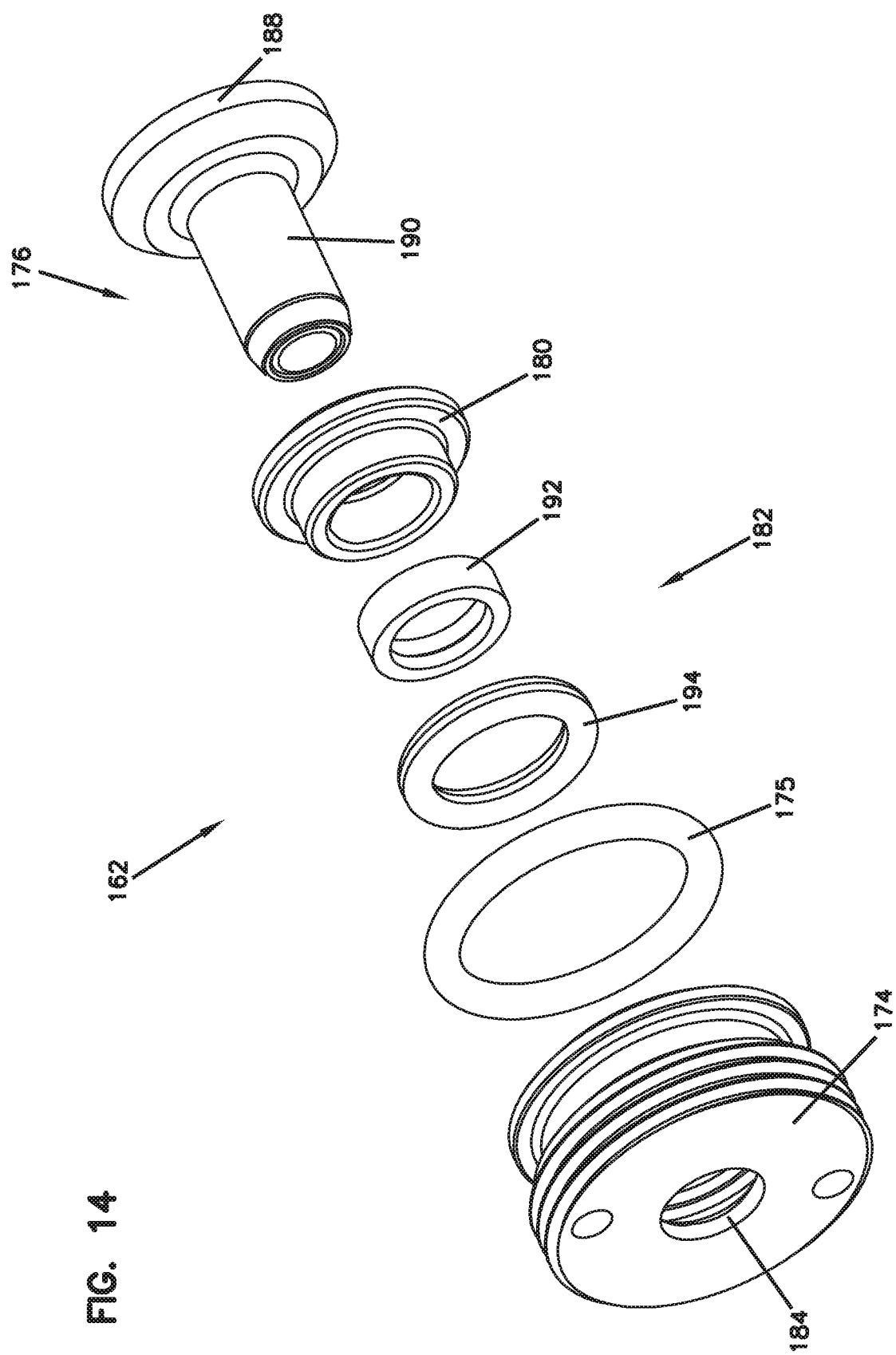
FIG. 14 illustrates a rear exploded view of the first assembly of the high speed valve of FIG. 9.

FIG. 13 shows a front exploded view of the first assembly 162. FIG. 14 shows a rear exploded view of the first assembly 162.

Figure 15:
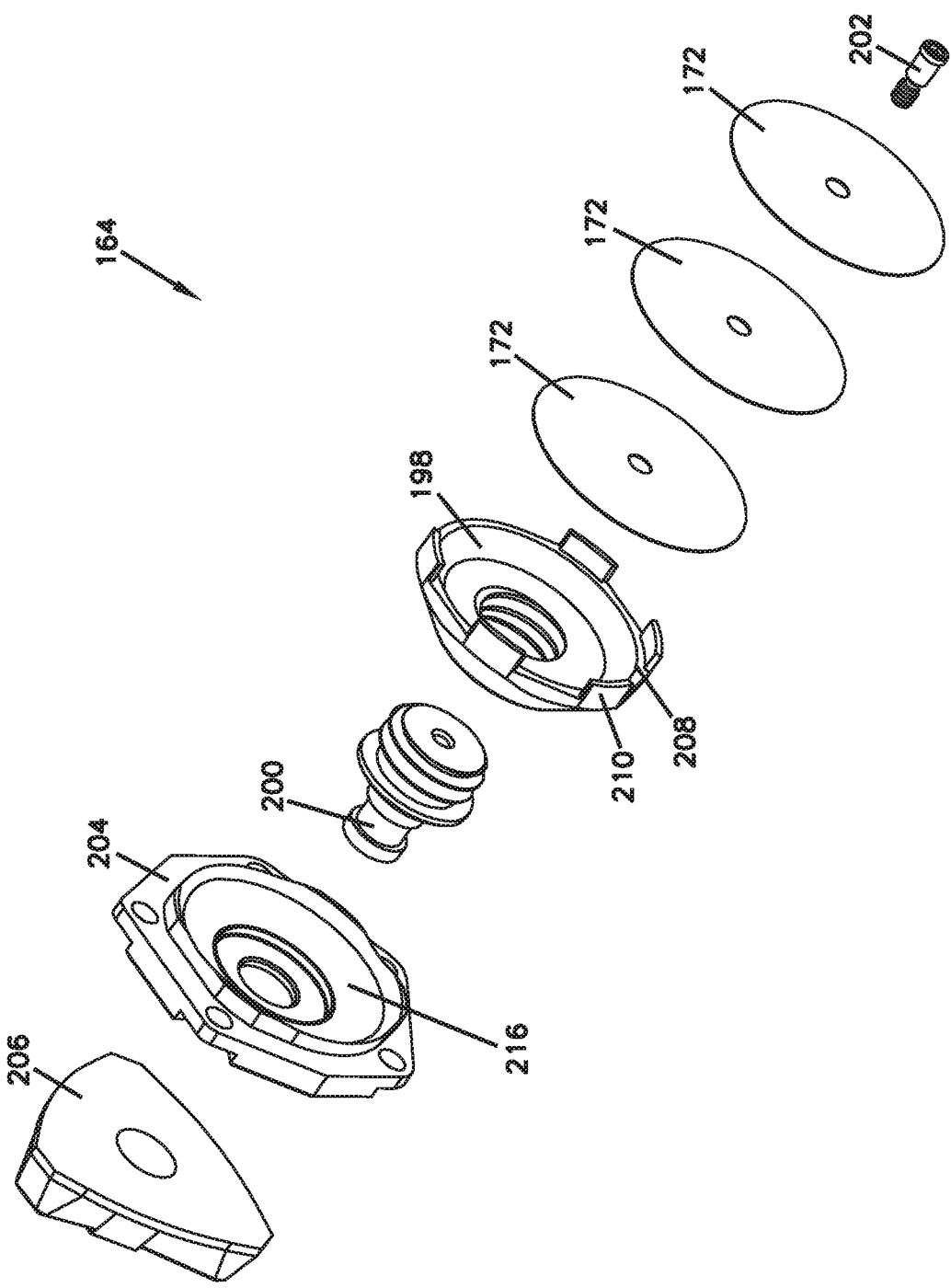
FIG. 15 illustrates a front exploded view of a second assembly of the high speed valve of FIG. 9.
Figure 16:
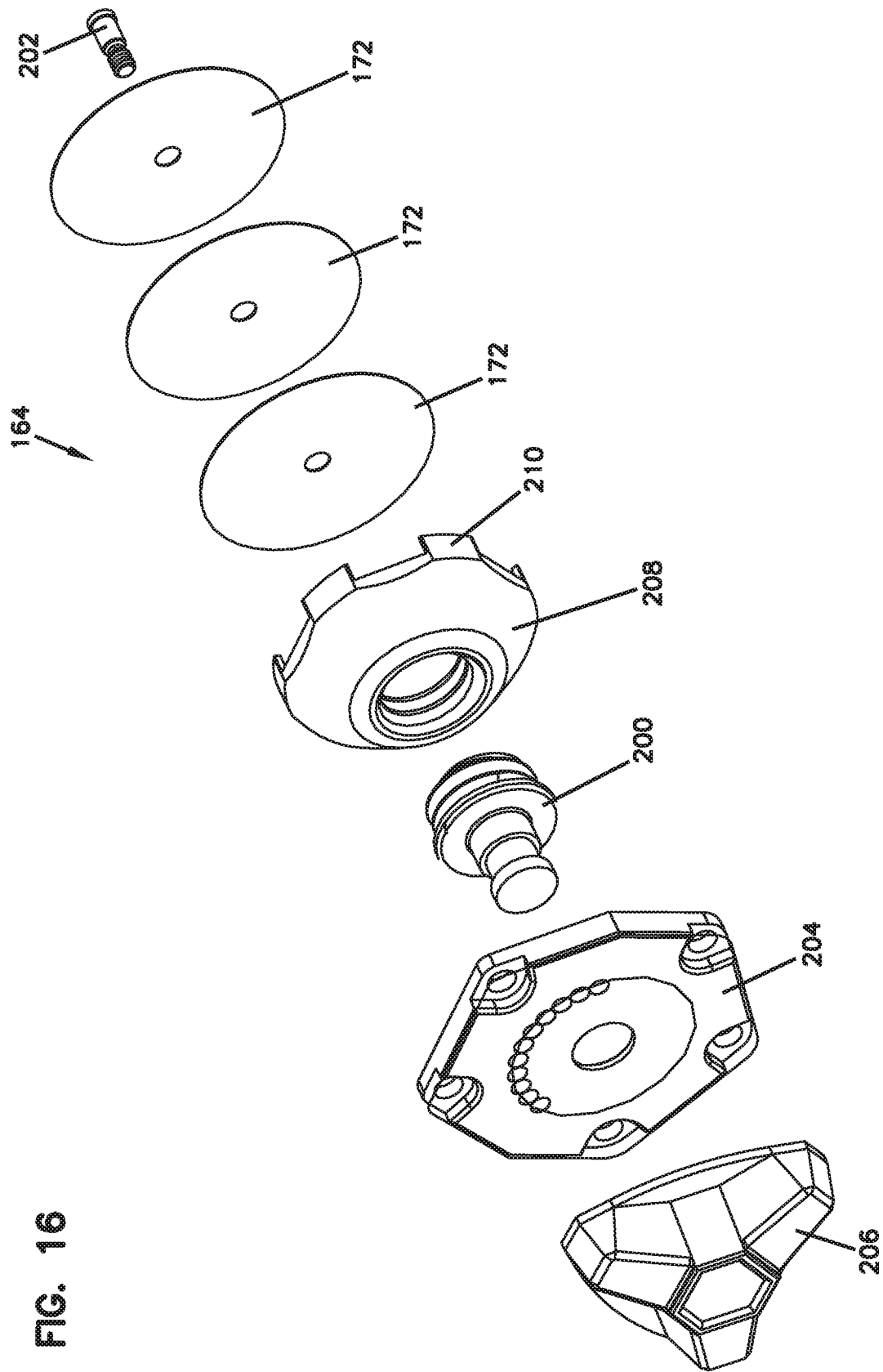
FIG. 16 illustrates a rear exploded view of the second assembly of the high speed valve of FIG. 9.

FIG. 15 shows a front exploded view of the second assembly 164. FIG. 16 shows a rear exploded view of the second assembly 164. Multiple springs 172 are shown in FIGS. 15 and 16 and are meant to be illustrative that, as an option, multiple springs 172 can be used in the second assembly 164.

Figure 17:
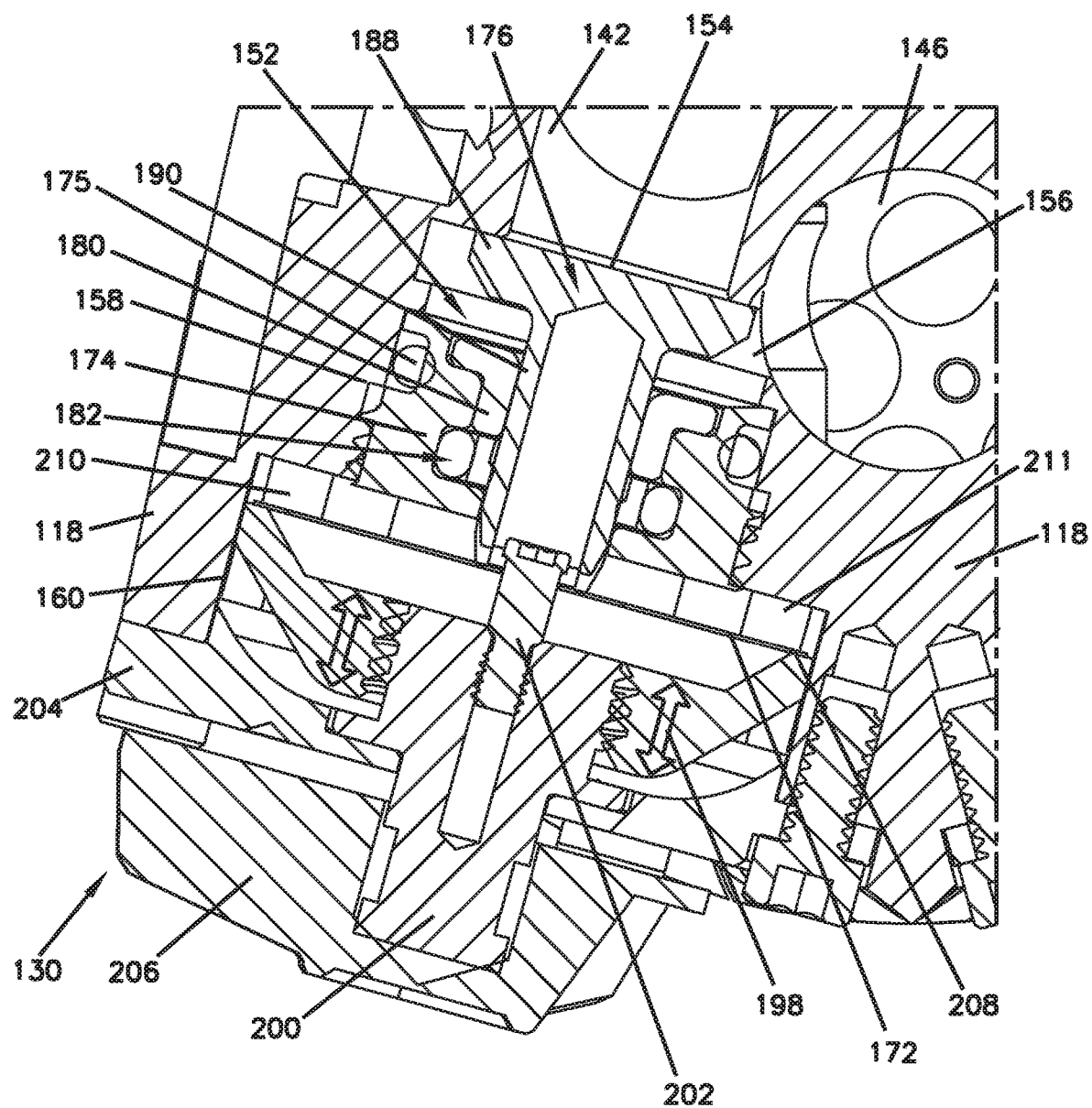
FIG. 17 illustrates a zoomed-in view of the cross section of FIG. 8.

FIG. 17 shows the high speed valve 130 installed in the manifold 118. As shown, the second assembly 164 can selectively adjust how much force is required on the valve face 192 of the head 188 of the movable valve portion 176 in order for the movable valve portion 176 to move within the housing 174 and place the first and second openings 154, 156 in fluid communication with one another. Specifically, as the knob 206 is rotated, the spring preload adjuster increases or decreases the amount of force needed to overcome the spring 172 being in contact with the movable valve portion 176, as indicated by arrows in FIG. 17. In some examples, the stop 210 is configured to contact a stop surface 211 within the valve chamber 152 when moved a maximum distance toward the movable valve portion 176.

In the depicted example, seals 175 and 182 prevent fluid from entering the dry portion 160 of the valve chamber 152. Therefore, when the second assembly 164 is removed from the manifold 118, even though there is no force exerted on the movable valve portion 176 keeping the movable valve portion 176 closed, the seals 175 and 182 keep all fluid within the wet portion 158 of the valve chamber 152.

In other examples, the movable valve portion 176 can be spring loaded within the first assembly 162 so as to be biased to a closed position and thereby seal the shock absorber 100 when the second assembly 164 is removed.

Figure 18:
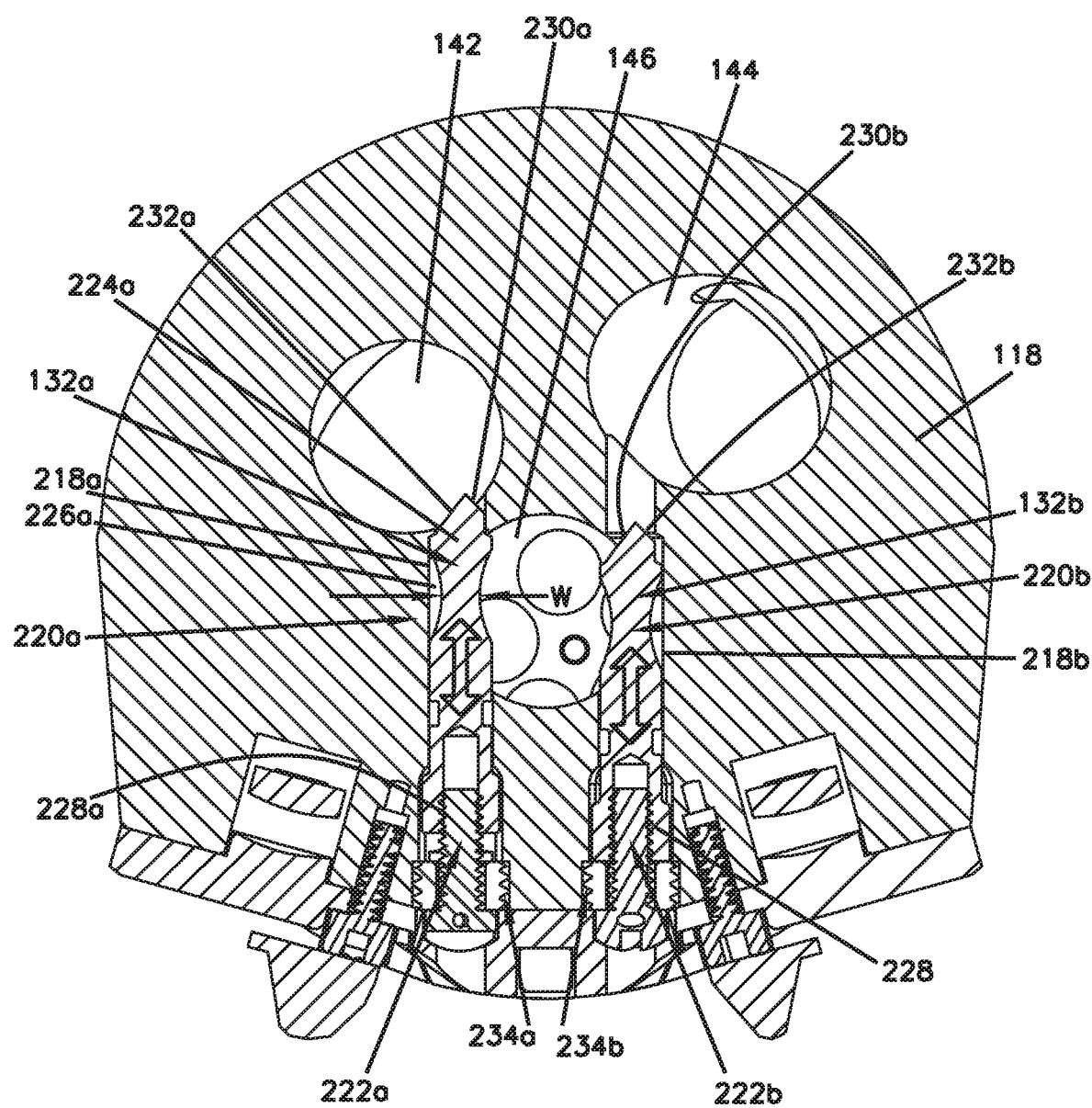
FIG. 18 illustrates a cross sectional view of the shock absorber along line 18-18 in FIG. 3.

FIG. 18 shows a cross sectional view of the shock absorber 100 along line 18-18 in FIG. 3. Similar to the high speed valve 130a described above, the low speed valve 132a is shown to selectively allow fluid between the first chamber passage 142 and the third shared passage 146. Further, the valve 132b is shown to selectively allow fluid flow between the second chamber passage 144 and third shared passage 146.

Each low speed valve 132a, 132b is positioned within a low speed fluid chamber 218a, 218b within the manifold 118. Further, each valve 132a, 132b includes a valve body 220a, 220 and an adjustment mechanism 222a, 222b.

The low speed fluid chambers 218a, 218b of the manifold 118 are configured to connect the first chamber passage 142 to the third shared passage 146 and the second chamber passage 144 to the third shared passage 146, respectively. Each valve 132a, 132b is movably positioned (as indicated by arrows in FIG. 18) within each low speed fluid chamber 218a, 218b to meter fluid flow therethrough. In some examples, each valve 132a, 132b can selectively block flow within each low speed fluid chamber 218a, 218b. In some examples, the valves 132a, 132b can be adjustable to allow a varied amount of fluid between the first and second chamber passages 142, 144 and the third shared passage 146. In other examples, the valves 132a, 132b are fixed to allow a non-adjustable flow within the low speed fluid chamber 218a, 218b.

The body 220a, 220b of each valve 132a, 132b includes a head portion 224a, 224b, a third shared passageway portion 226a, 226b, and an end portion 228a, 228b.

The head portion 224a, 224b of each valve body 220a, 220b is configured to encounter damping fluid when fluid flows from the first chamber passage 142 to the third shared passage 146 and from the second chamber passage 144 to the third shared passage 146. In some examples, the head 224 can have a shape that is configured to provide linear fluid metering adjustment increments between the first and second chamber passages 142, 144 and the third shared passage 146. In some examples, the shape of the head portion 224 is at least partially conical. In the depicted example, the head portion 224 can have a conical portion 230 and a flat face 232. An example of the low speed valves 132a, 132b are disclosed in U.S. Non-Provisional Application entitled "Bleed Needle for a Hydraulic System" with Ser. No. 16/115,275, filed on even date herewith and herein incorporated by reference in its entirety.

The third shared passageway portion 226a, 226b of each body 220a, 220b of each valve 132a, 132b can be configured to be at least partially positioned within the low speed fluid chambers 218a, 218b and the third shared passage 146. In some examples, the third shared passageway portion 226a, 226b can be shaped to minimize fluid flow obstruction within the third shared passage 146. For example, the third shared passageway portion 226a, 226b of each valve 132a, 132b can have a tapered shape. In other examples, the third shared passageway portion 226a, 226b can have a width W that is less that the width of the head portion 224a 224b.

The end portion 228a, 228b of each valve body 220a, 220b is positioned opposite the head portion 224a, 224b and is configured to interface with the adjustment mechanism 222a, 222b of each valve 132a, 132b. In some examples, the end portion 228a, 228b is configured to be coupled to the adjustment mechanism 222a, 222b via a threaded interface.

In some examples, the adjustment mechanism 222a, 222b of each valve 132a, 132b is configured to allow the user to adjust the positioning of the valve 132a, 132b, specifically the valve body 220a, 220b, within the low speed fluid chamber 218a, 218b. In some examples, the adjustment mechanism 222a, 222b can be threaded into the manifold 118 at a first attachment portion 234a, 234b and in movable contact with the valve body 220a, 220b. In some examples, as the adjustment mechanism 222a, 222b of each valve 132a, 132b is rotated about a longitudinal axis, the adjustment mechanism 222a, 222b causes the valve body 220a, 220b to move longitudinally within the low speed fluid chamber 218a, 218b. In some examples, the user can rotate the adjustment mechanism 222a, 222b via an adjustment interface 236a, 236b. In some examples, the adjustment interface 236a, 236b is a head of a bolt or screw. In other examples, the adjustment interface 236a, 236b is a knob. Therefore, depending on the low speed damping response sought, the user can adjust the position of the valves 132a, 132b within each low speed fluid chamber 218a, 218b to achieve the desired response. In some examples, the adjustment mechanism 222a, 222b can include detent positions. In some examples, the adjustment mechanism 222a, 222b can be replaced with a fixed length needle. Adjustment mechanism 222a, 222b can be removed without loss of fluid or risk of fluid contamination.

Figure 19:
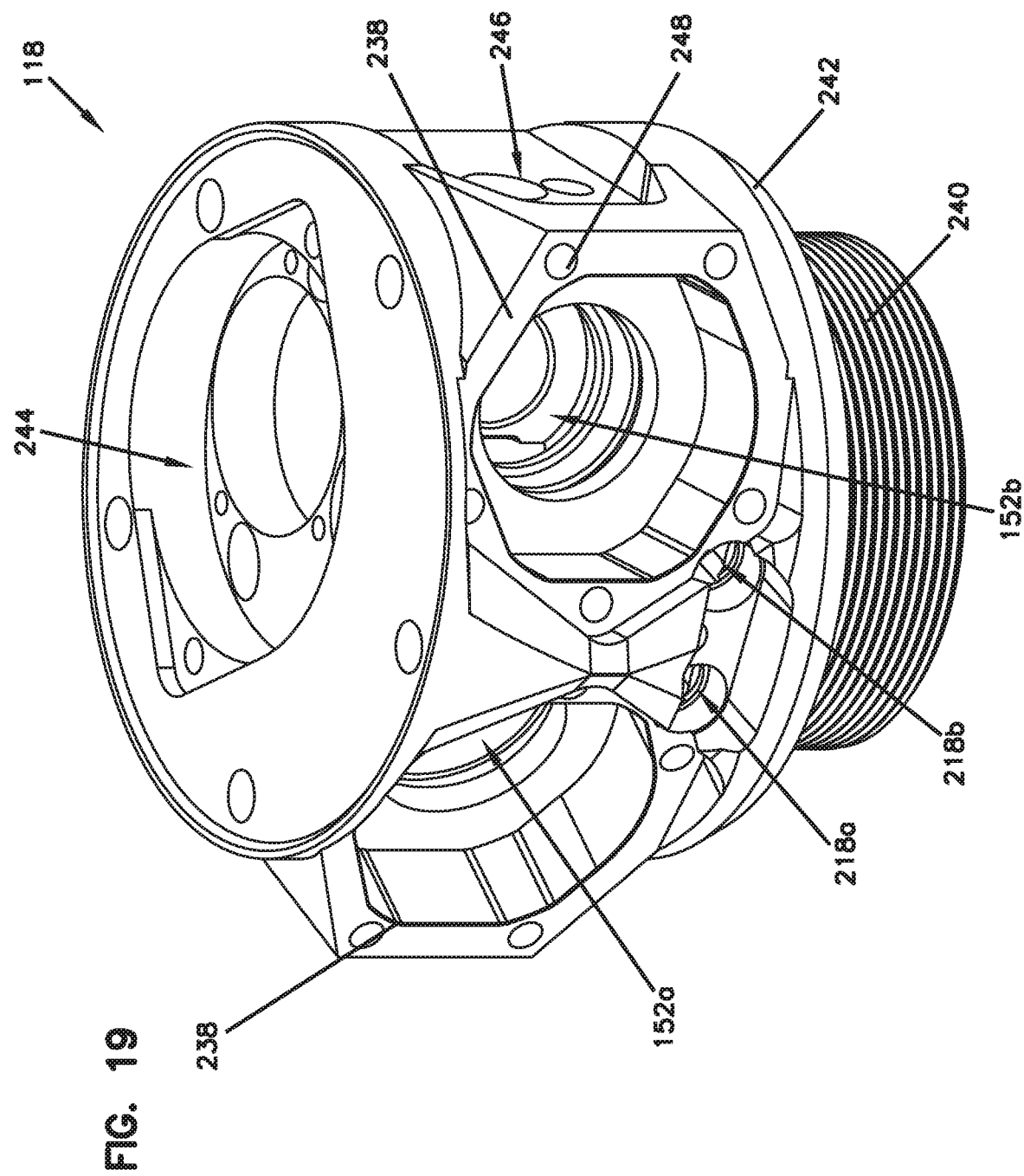
FIG. 19 illustrates a perspective view of a shock absorber manifold, according to one embodiment of the present disclosure.
Figure 20:
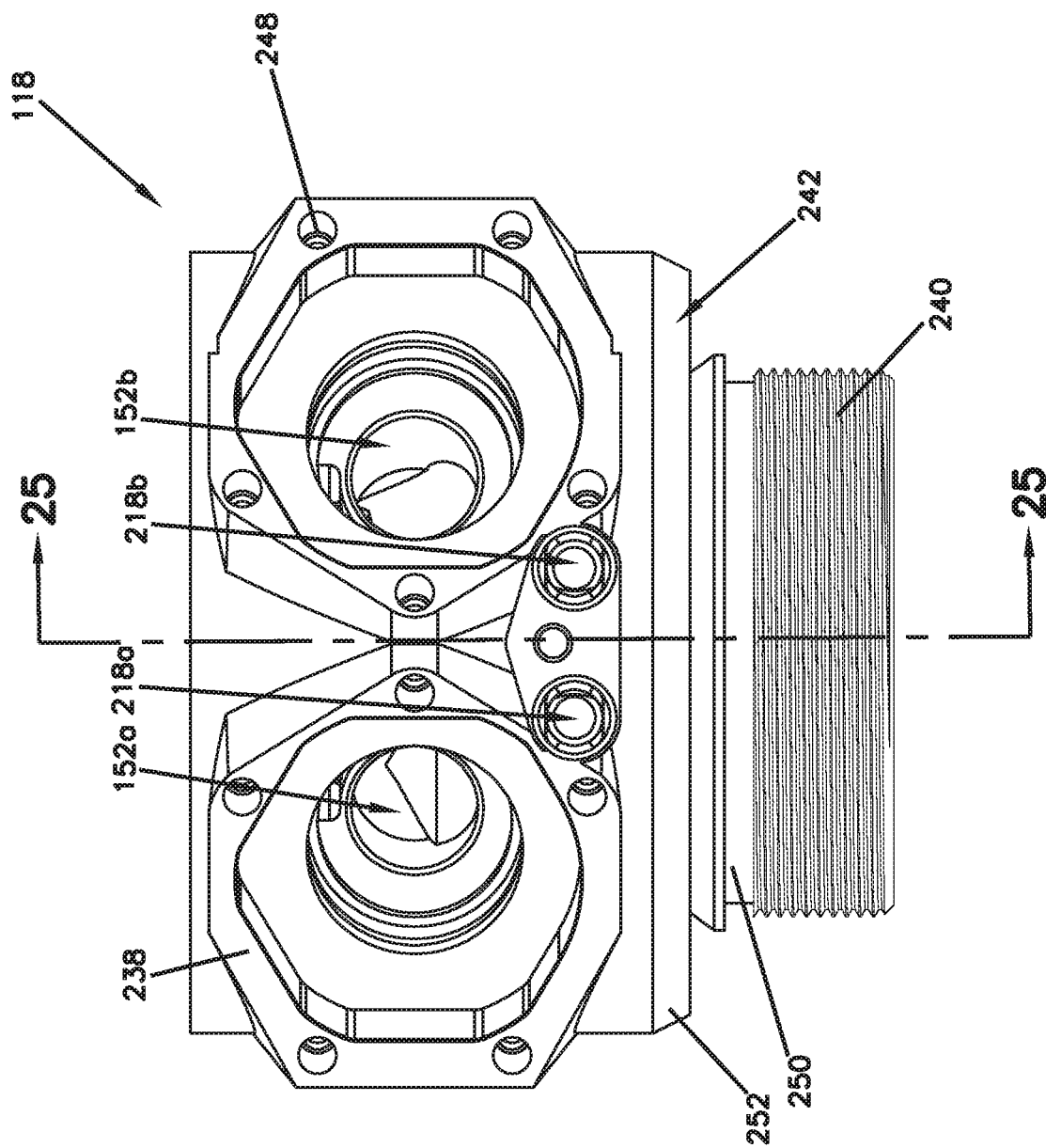
FIG. 20 illustrates a front view of the shock absorber manifold of FIG. 19.

FIG. 19 shows a perspective view of the manifold 118 without the valves 130a, 130b or valves 132a, 132b. FIG. 20 shows a front view of the manifold 118. The manifold 118 includes a pair of manifold valve cap flanges 238, an inner tube attachment interface 240, an outer tube flange 242, and a pair of pressure reservoir ports 246.

The manifold valve cap flanges 238 are configured to facilitate the attaching of the valve caps 204a, 204b of the valves 130a, 130b to the manifold 118. In some examples, the manifold valve cap flanges 238 each include a plurality of apertures 248 that are configured to receive the valve cap fasteners 214.

The inner tube attachment interface 240 is configured to receive the inner tube 110. In some examples, the inner tube attachment interface 240 is a threaded interface. In other examples, the inner tube 110 is permanently attached to the manifold 118 (e.g., welded, cast, machined, etc.). In some examples, the inner tube attachment interface 240 includes a seal recess 250 that is configured to receive a seal to form a seal between the manifold 118 and the inner tube 110.

The outer tube flange 242 is configured to receive the outer tube 112. In some examples, the outer tube flange 242 includes a lip 252 that is configured to partially surround the outer tube 112. In some examples, the outer tube flange 242 is configured to include a seal 256 (shown in FIG. 26) to form a seal between the manifold 118 and the outer tube 112.

Figure 25:
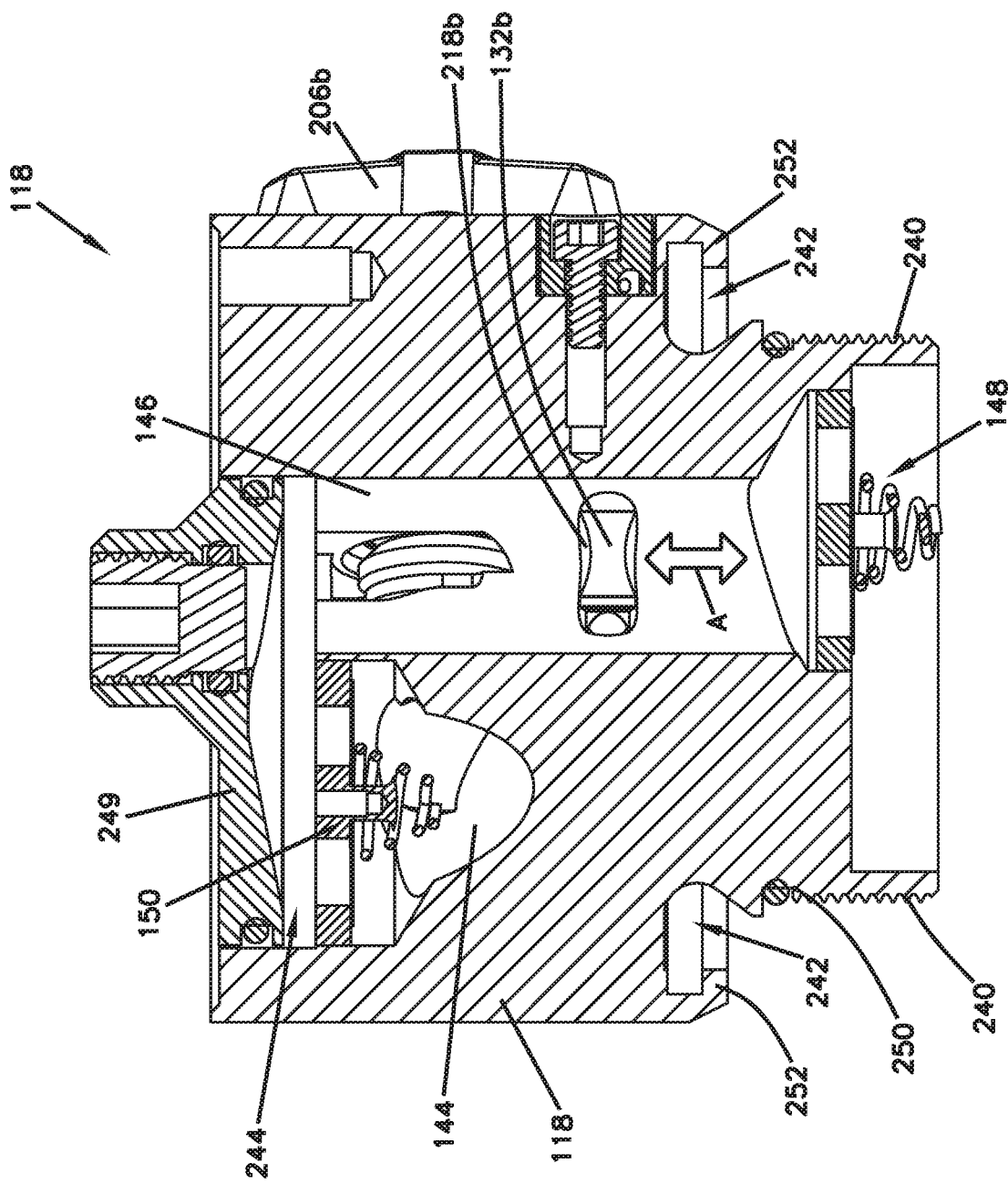
FIG. 25 illustrates a cross sectional view of the shock absorber manifold along line 25-25 in FIG. 20.

A top cap port 244 is configured to receive a top cap (shown in FIG. 25). As shown, the top cap is removed from the top cap port 244, allowing the user to gain access to, for example, the passages 142, 144, 146 of the manifold 118. In some examples, the top cap port 244 also allows the user to access the second chamber check valve 150 (shown in FIG. 25).

Figure 21:
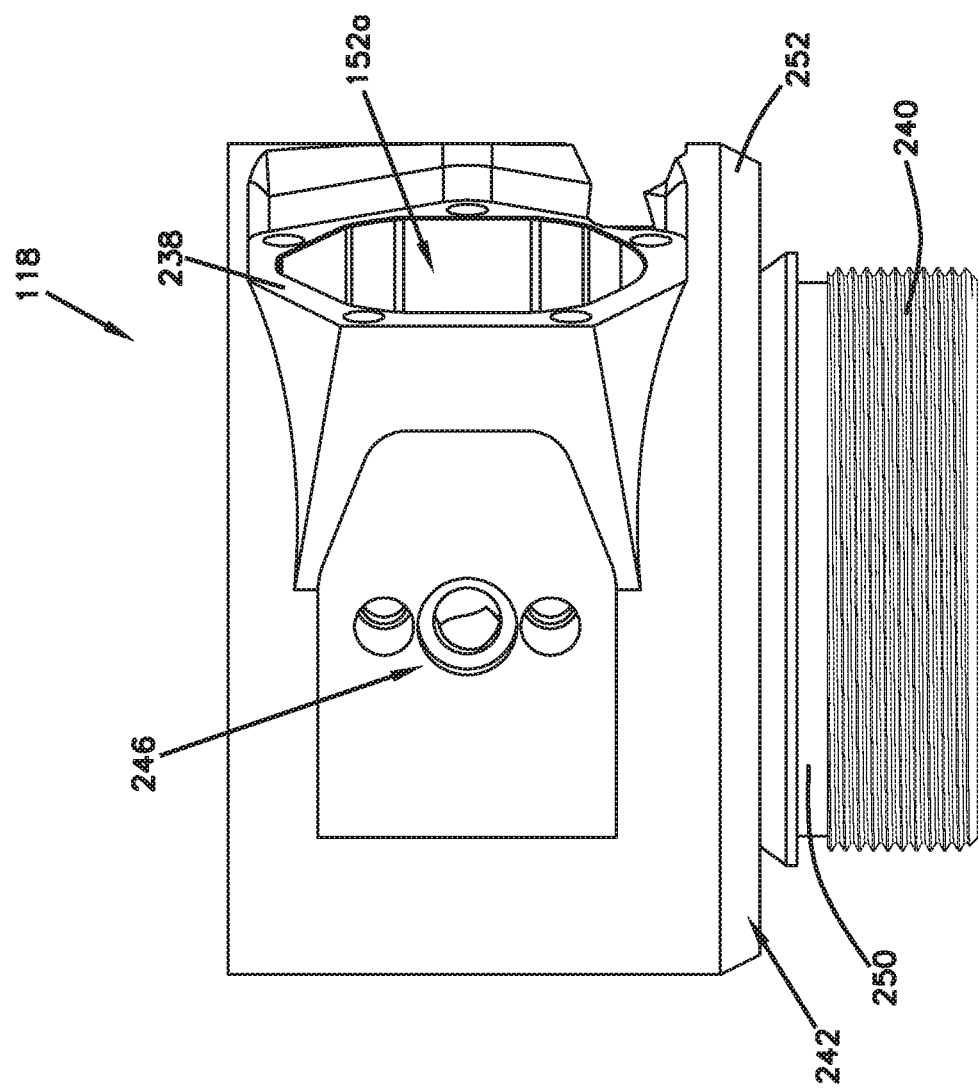
FIG. 21 illustrates a side view of the shock absorber manifold of FIG. 19.
Figure 22:
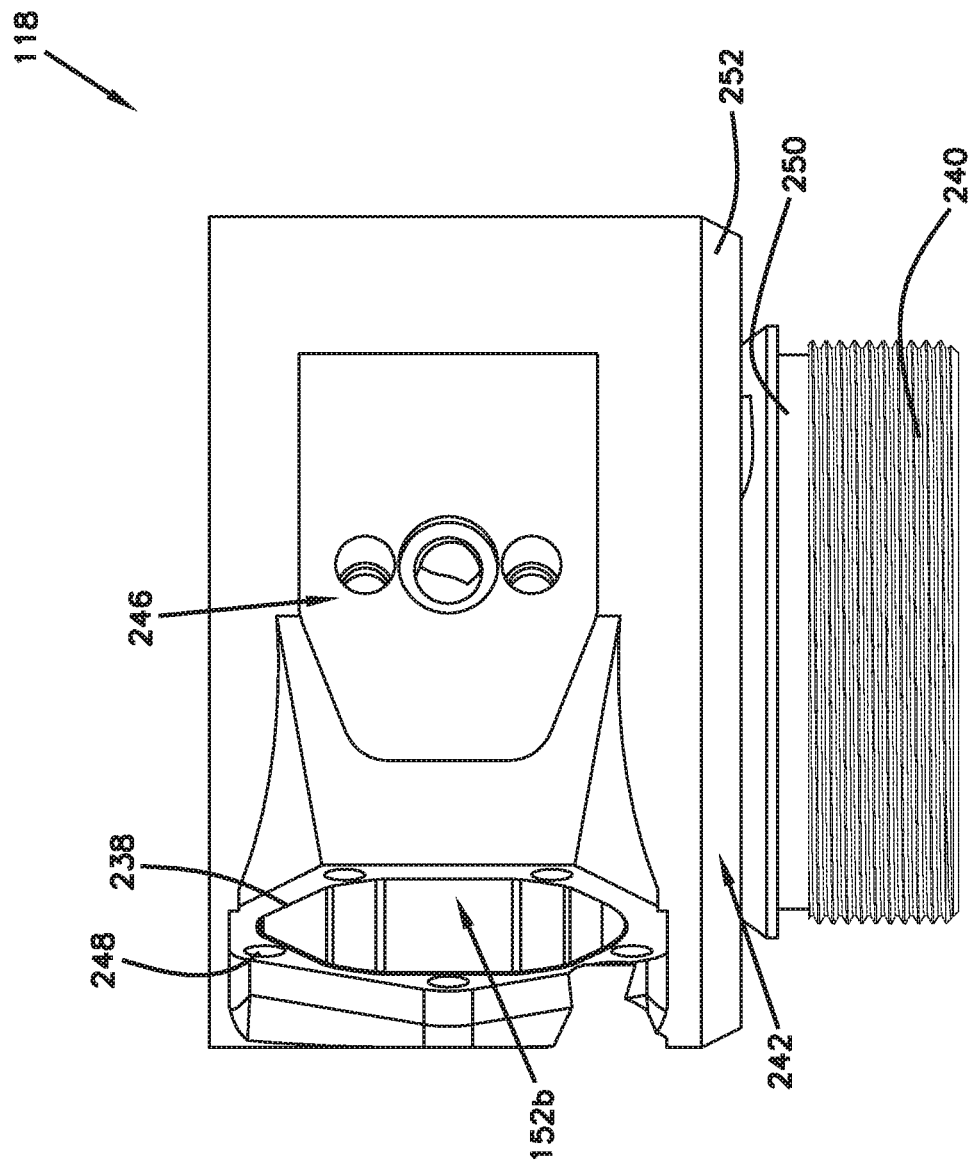
FIG. 22 illustrates another side view of the shock absorber manifold of FIG. 19.

FIGS. 21 and 22 show side views of the manifold 118. As shown, the pressure reservoir ports 246 are positioned at either side of the manifold 118. In some examples, the pressure reservoir ports 246 are configured to place the pressure reservoir 120 in fluid communication with the first chamber passage 142, second chamber passage 144, and/or third shared passage 146. In some examples, the pressure reservoir 120 can be in fluid communication with either or both of the pressure reservoir ports 246. In some examples, if the pressure reservoir 120 is in fluid communication with only one set of the pressure reservoir ports 246, and the opposite set of pressure reservoir ports 246 can be sealed. In other examples, the pressure reservoir 120 can be attached to the manifold 118 over the either of the pressure reservoir ports 246. In other examples, the pressure reservoir ports 246 are connected to a remotely positioned pressure reservoir 120.

Figure 23:
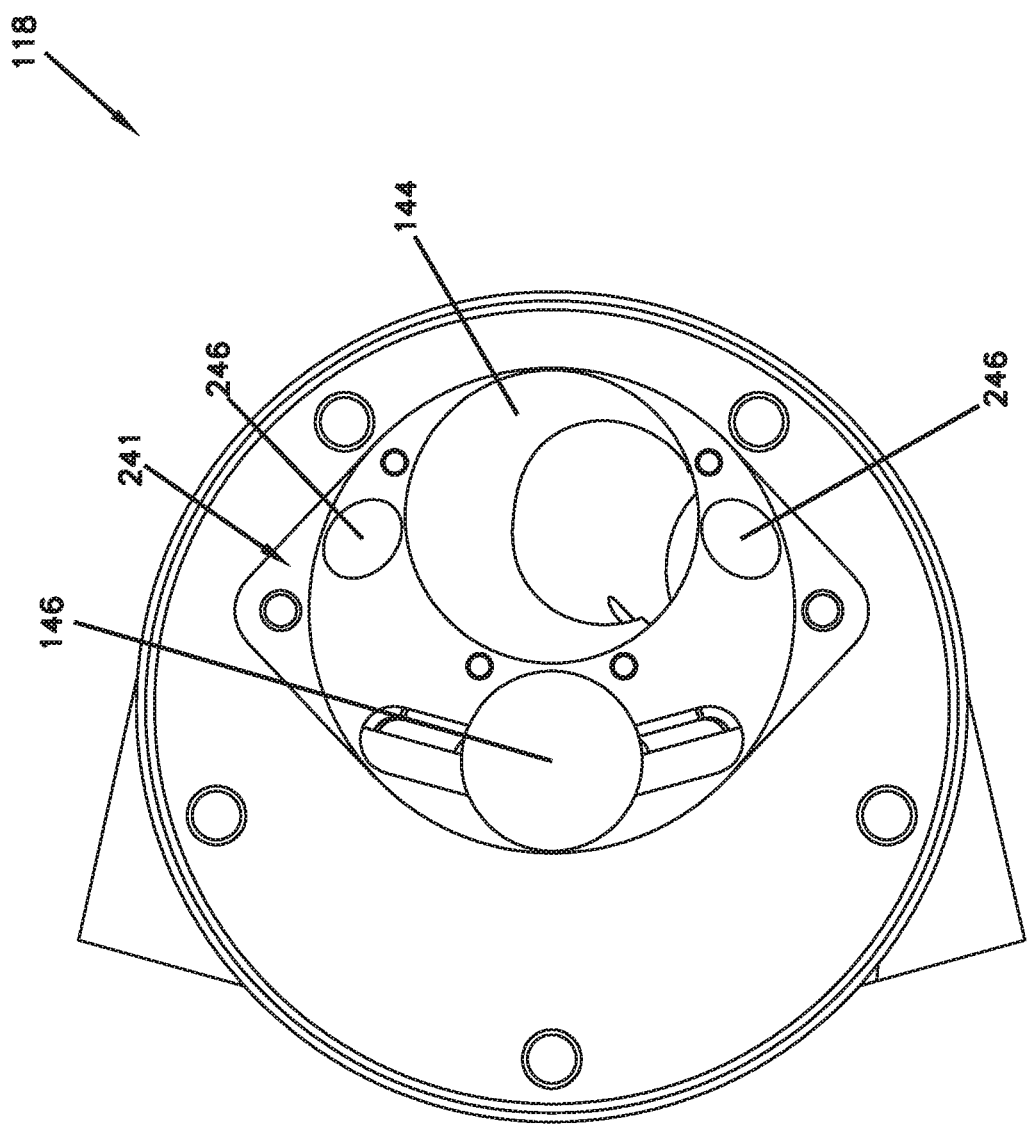
FIG. 23 illustrates a top view of the shock absorber manifold of FIG. 19.

FIG. 23 shows a top view of the manifold 118. The second chamber passage 144 and the third shared passage 146 are shown. In some examples, the second chamber check valve 150 is positioned between the second chamber passage 144 and the third shared passage 146 within the top cap port 244 of the manifold 118. In the depicted examples, the pressure reservoir ports 246 are shown to be in communication with the top cap port 244, thereby putting the pressure reservoir ports 246 in fluid communication with the third shared passage 146 and periodically in fluid communication with the second chamber passage 144 (i.e., when the second chamber check valve 150 is open).

Figure 24:
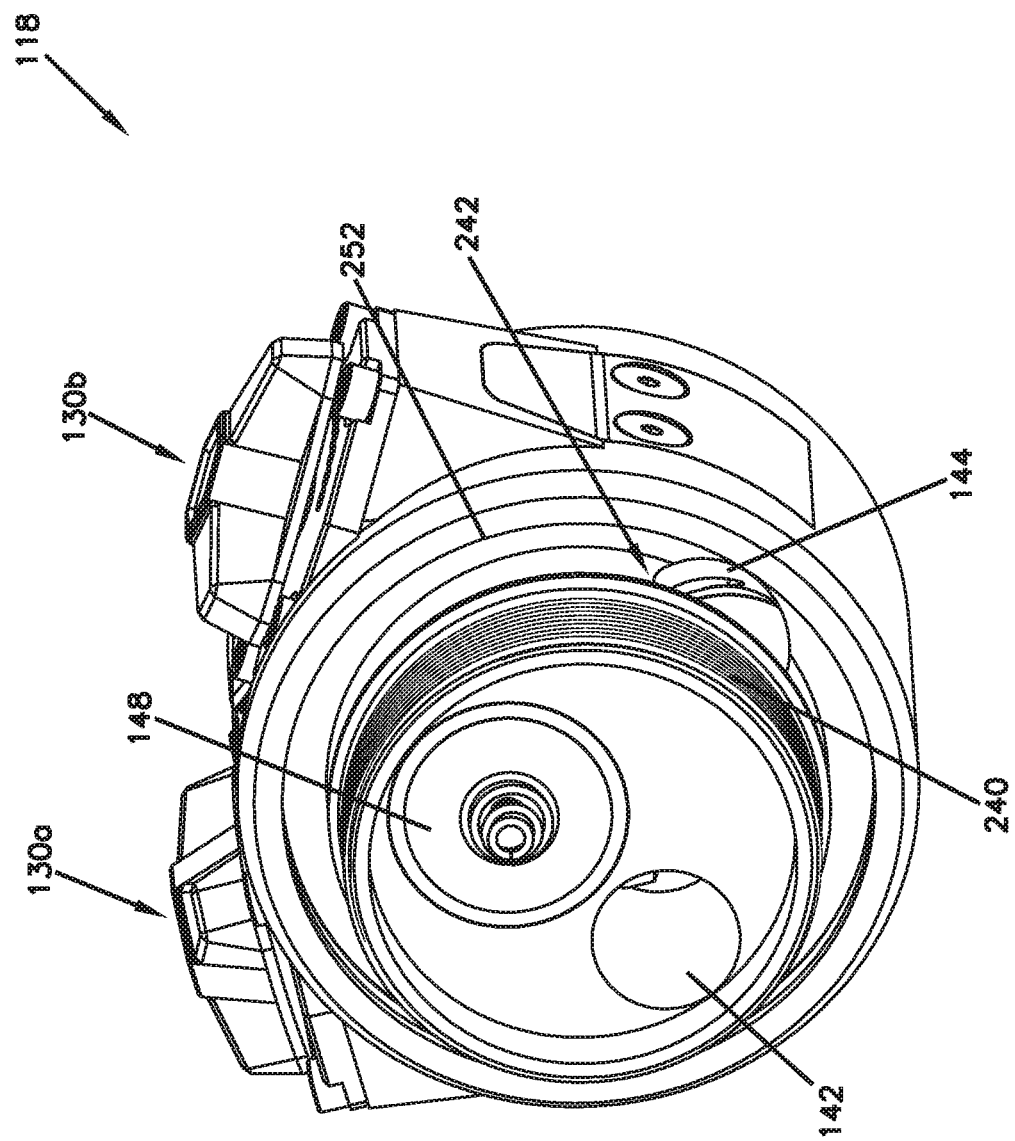
FIG. 24 illustrates a bottom perspective view of the shock absorber manifold of FIG. 19.

FIG. 24 shows a bottom perspective view of the manifold 118. In the depicted example, the manifold 118 includes valves 130a, 130b. The manifold 118 also includes the first chamber check valve 148.

The first chamber check valve 148 is positioned adjacent the first chamber passage 142. As described above, the first chamber check valve 148 remains closed during a compression event and open during a rebound event to allow fluid to flow from the third shared passage 146 into the inner tube 110. In some examples, the first chamber check valve 148 can include a spring 149 and a disc 151. In some examples, the spring 149 biases the disc 151 to a closed position.

The opening of the second chamber passage 144 is shown to be positioned within the outer tube flange 242 so that fluid can flow to and from the annular passage 128.

FIG. 25 shows a cross sectional view of the manifold 118 along line 25-25 in FIG. 20. The manifold 118 is shown to include the first chamber check valve 148 positioned within the third shared passage 146, the second chamber check valve 150 positioned between the second chamber passage 144 and the third shared passage 146, and a top cap 249 positioned over the top cap port 244.

As represented by a double sided arrow A, fluid flow within the third shared passage 146 can either travel toward the first chamber check valve 148 (during a rebound event) or toward the second chamber check valve 150 (during a compression event). Therefore, the check valves 148, 150 only allow fluid flow out of the third shared passage 146 and not into the third shared passage 146. All fluid flowing into the third shared passage 146 must first pass through either the high speed valves 130a, 130b low speed valves 132a, 132b, or from the pressure reservoir 120.

Figure 26:
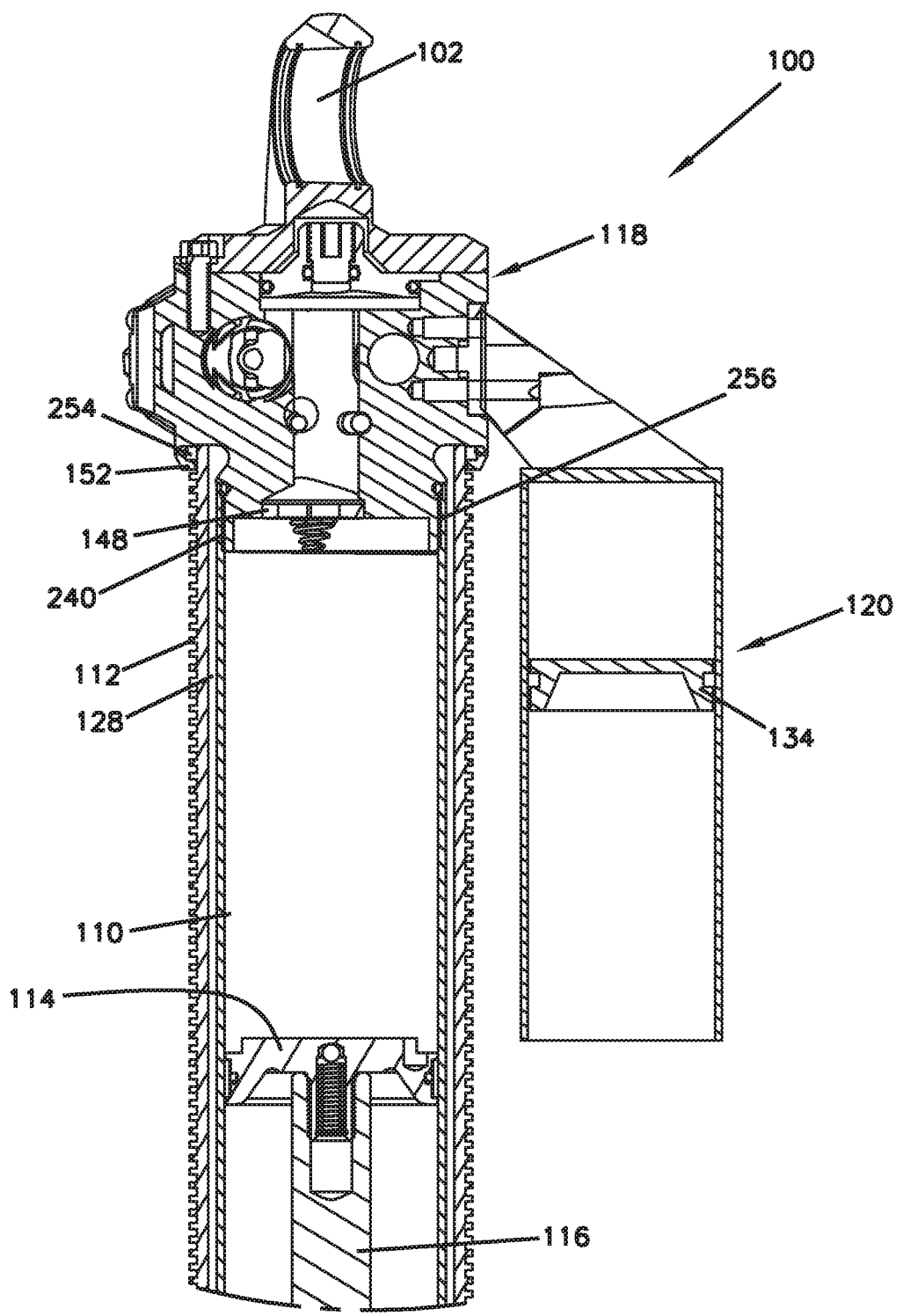
FIG. 26 illustrates a zoomed-in view of the cross section of FIG. 2.

FIG. 26 is a blown up portion of FIG. 2. A seal 254 is positioned within the outer tube flange 242 between the outer tube 112 and the manifold 118. In some examples, the outer tube 112 is in contact with the manifold 118 and not attached to the manifold 118. Further, the seal 256 is shown positioned between the inner tube 110 and the manifold 118. The inner tube 110 is shown to be attached to the manifold 118 at the inner tube attachment interface 240.

Figure 27:
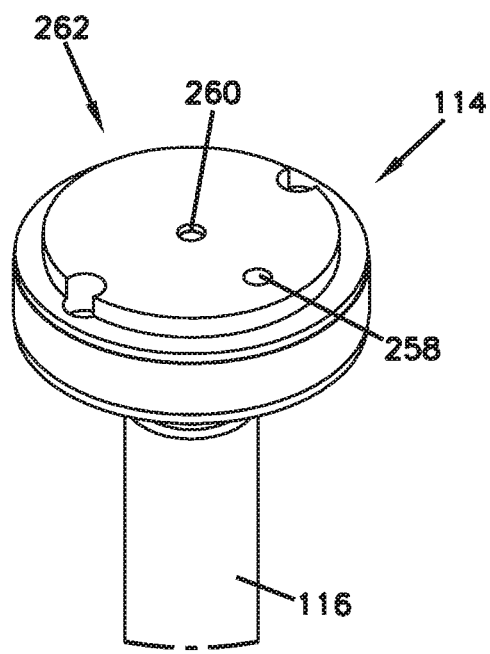
FIG. 27 illustrates a perspective view of a shock absorber piston, according to one embodiment of the present disclosure.
Figure 28:
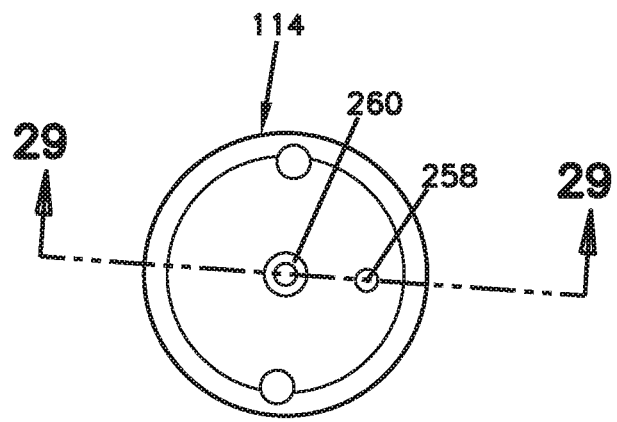
FIG. 28 illustrates a top view of the shock absorber piston of FIG. 27.

FIG. 27 shows a perspective view of the piston 114. FIG. 28 shows a top view of the piston 114. The piston 114 includes a bleed port 258 and a pass through port 260.

Figure 29:
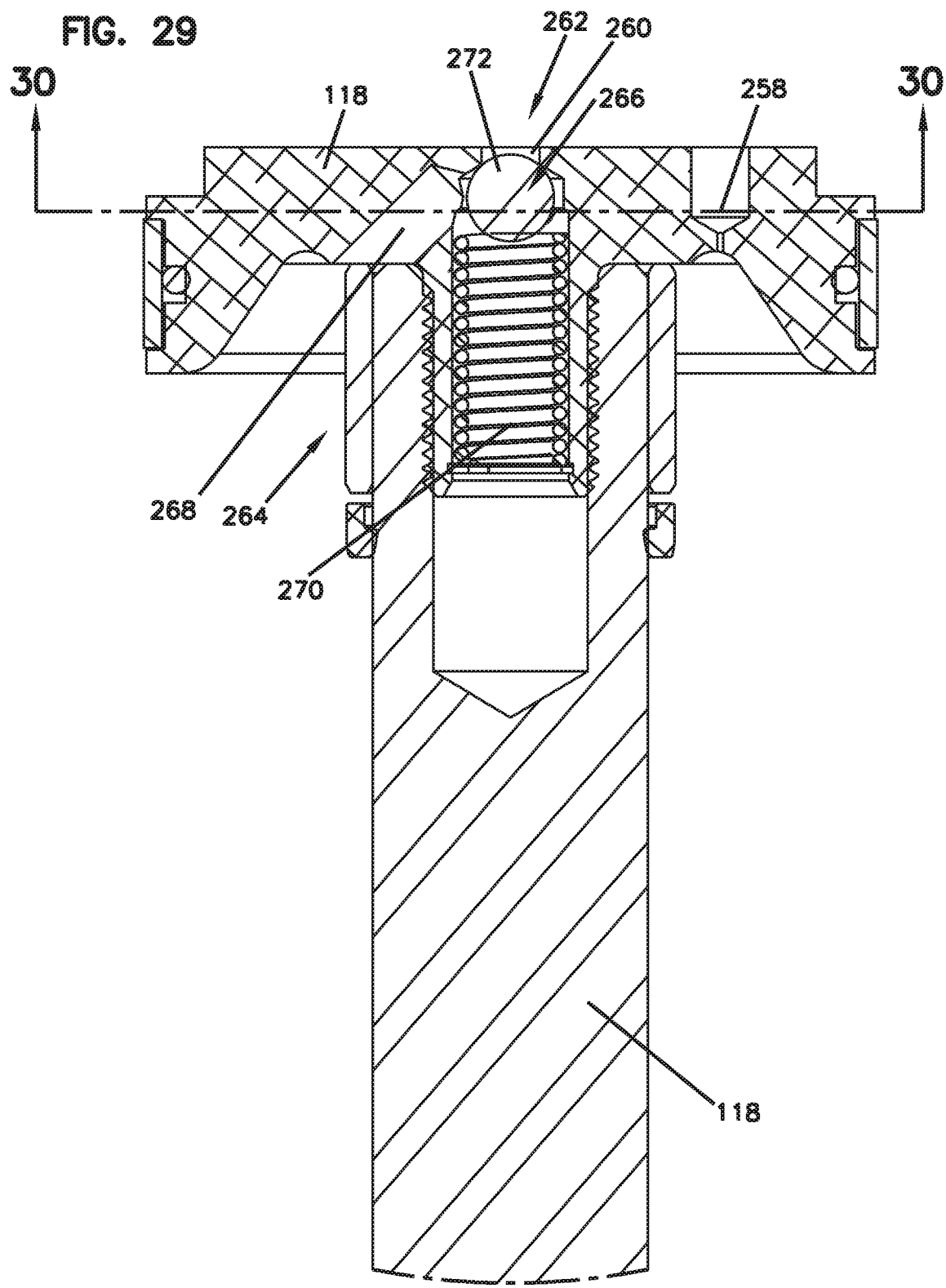
FIG. 29 illustrates a cross sectional view of the piston along line 29-29 in FIG. 28.

FIG. 29 shows a cross sectional view of the piston 114 along line 29-29 in FIG. 28. The piston 114 includes a top side 262, a bottom side 264, the pass through port 260, a pass through port valve 266, at least one pass through port auxiliary passage 268, and the bleed port 258. The pass through port valve 266 is configured to selectively allow fluid flow from the top side 262 to the bottom side 264 of the piston 114 via the pass through port 260 and the pass through port auxiliary passage 268.

The pass through port valve 266 is configured to selectively place the pass through port 260 in fluid communication with the at least one pass through port auxiliary passage 268. In the depicted example, the pass through port valve 266 is a check valve that has a spring 270 and a valve body 272.

In some examples, the spring 270 can be a helical spring, disc spring, or other elastic type material. In the depicted example, the spring 270 is a helical compression spring.

In some examples, the valve body 272 can be a disc, ball, cone, or a variety of other shapes. In some examples, the spring 270 is configured to contact the valve body 272 and bias the valve body 272 into a closed position. In the closed position, the pass through port valve 266 prevents fluid flow between the pass through port 260 and at the least one pass through port auxiliary passage 268. To move the pass through port valve 266 to an open position, fluid at the first side of the piston 114 must act on the valve body 272 and overcome the force of the spring 270.

In some examples, the spring 270 can be configured to only be compressed, and thereby opening the valve 266, during a high speed compression event encountered by the shock absorber 100 (i.e., a large bump like a pothole). In other examples, the spring 270 can be configured to be compressed, thereby opening the valve 266, during low speed events of the shock absorber. In some examples, the spring 270 can be adjustable.

The bleed port 258 is configured to allow air to travel from the bottom side 264 of the piston 114 to the top side 262 of the piston 114. In some examples, the bleed port 258 can be always open. The bleed port 258 eases the ability of the user to remove any air in the system after manufacturing or rebuild.

Figure 30:
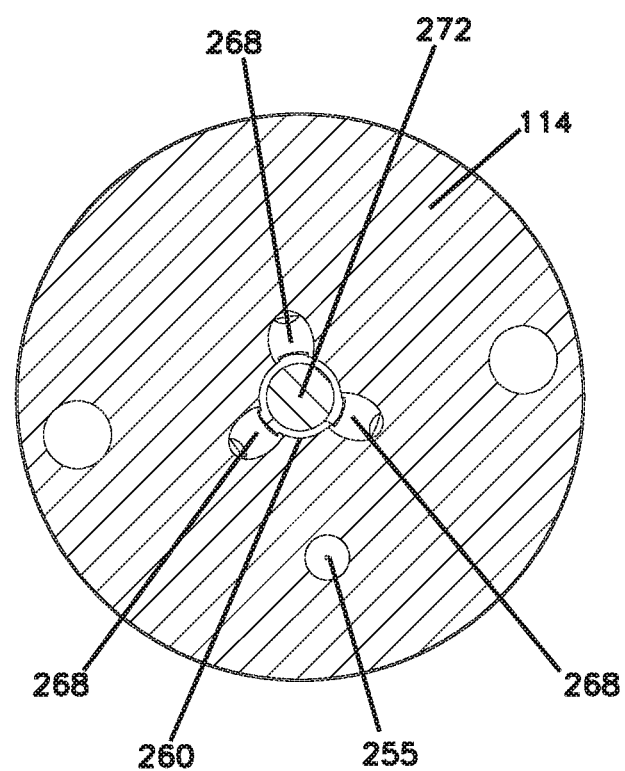
FIG. 30 illustrates a cross sectional view of the piston along line 30-30 in FIG. 29.

FIG. 30 shows a horizontal cross section of the piston 114 along line 30-30 in FIG. 29. As shown, the piston 114 can include a plurality of pass through port axillary passages 268 in selective fluid communication with the pass through port 260.

Figure 31:
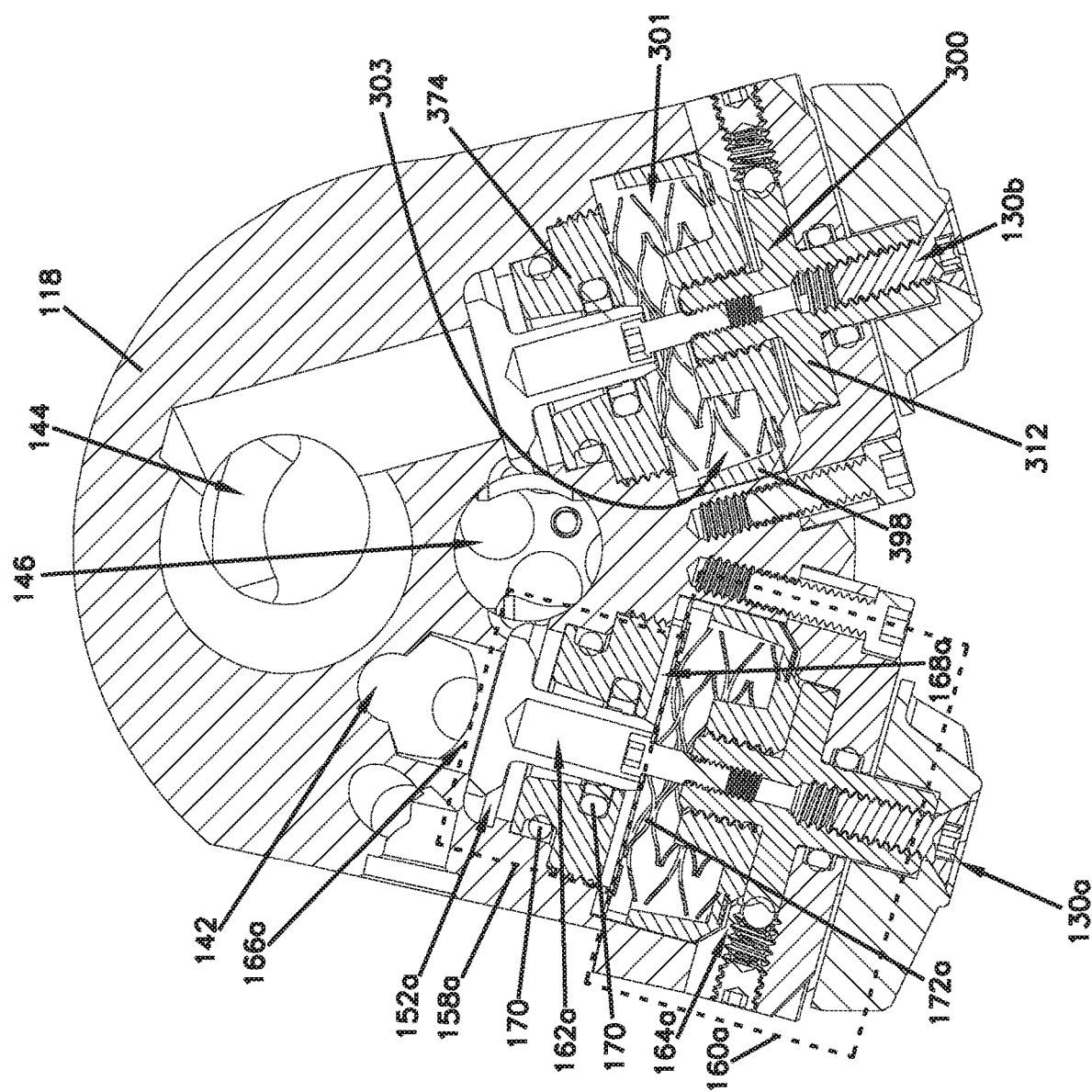
FIG. 31 illustrates a cross sectional view of the shock absorber, according to one embodiment of the present disclosure.

FIG. 31, like FIG. 8, shows a cross sectional view of the shock absorber 100 along line 7-7 in FIG. 3. The first assembly 162a, 162b of each valve 130a, 130b is positioned within the wet portion 158a, 158b of each valve chamber 152a, 152b. The second assembly 164a, 164b of each valve 130a, 130b is positioned within the dry portion 160a, 160b of each valve chamber 152a, 152b. Differing from the FIG. 8, each valve in FIG. 31 is shown with the second assembly 164a, 164b including a spring stack 301. In some examples, the spring stack 301 includes at least one wave spring.

Figure 32:
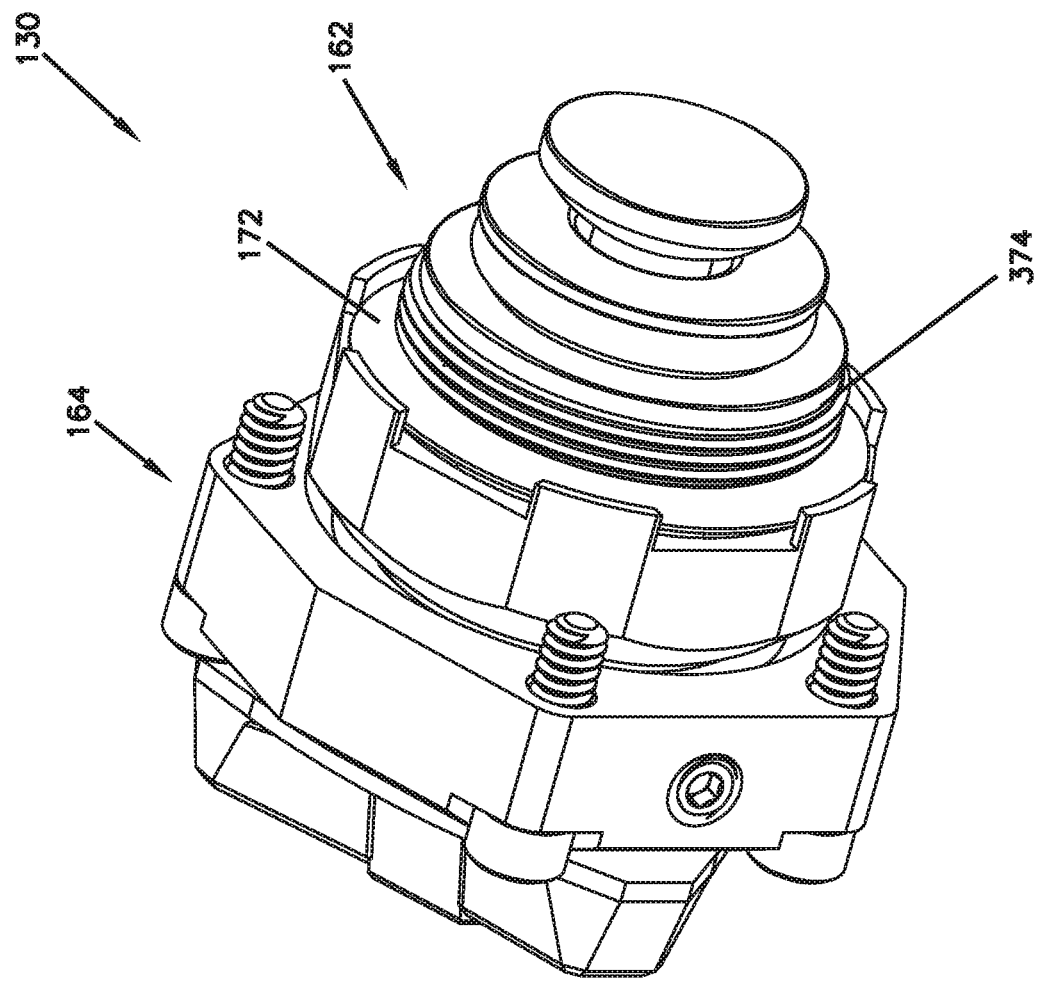
FIG. 32 illustrates a perspective view of a high speed valve, according to one embodiment of the present disclosure.
Figure 33:
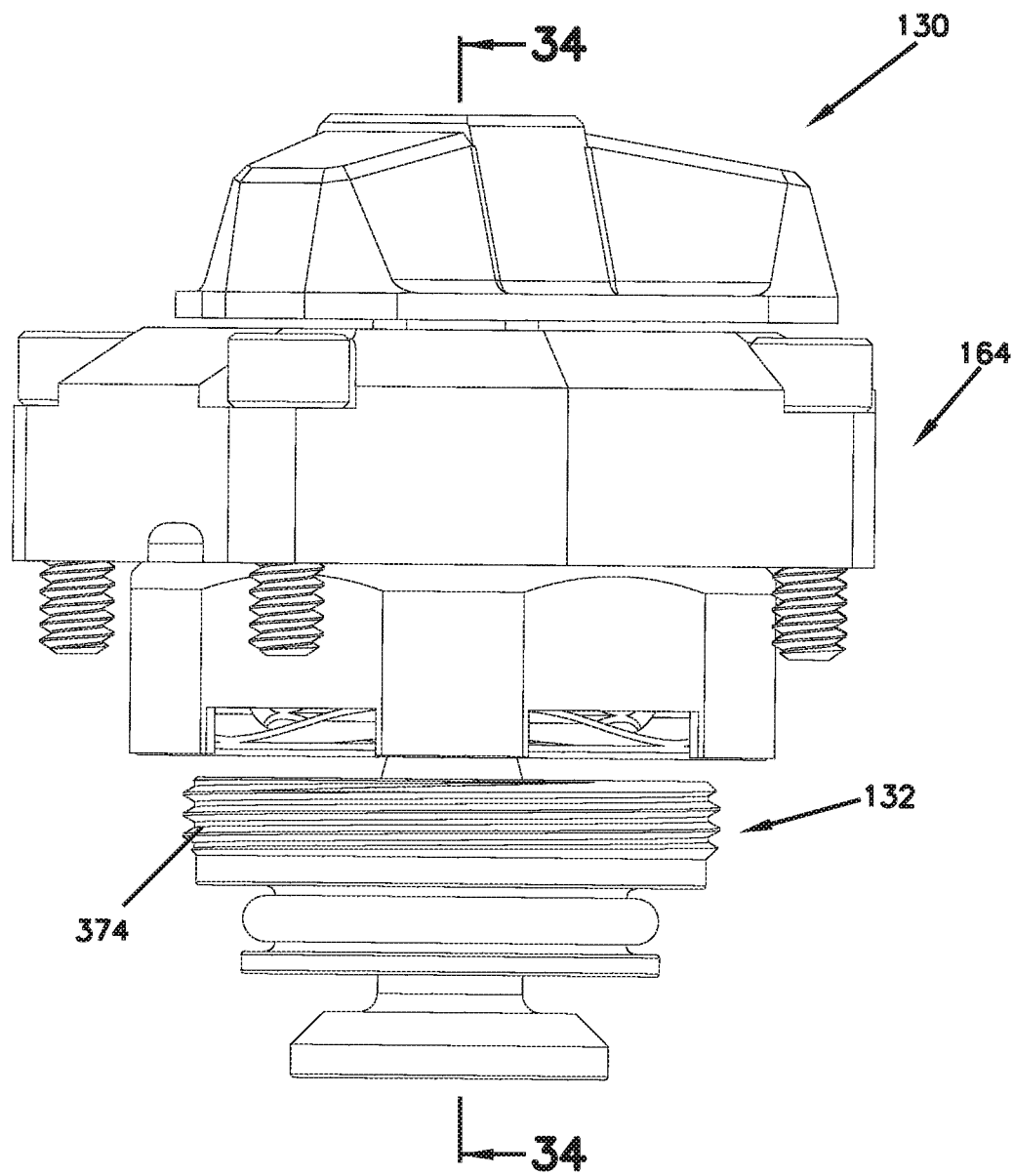
FIG. 33 illustrates a side view of the high speed valve of FIG. 32.
Figure 34:
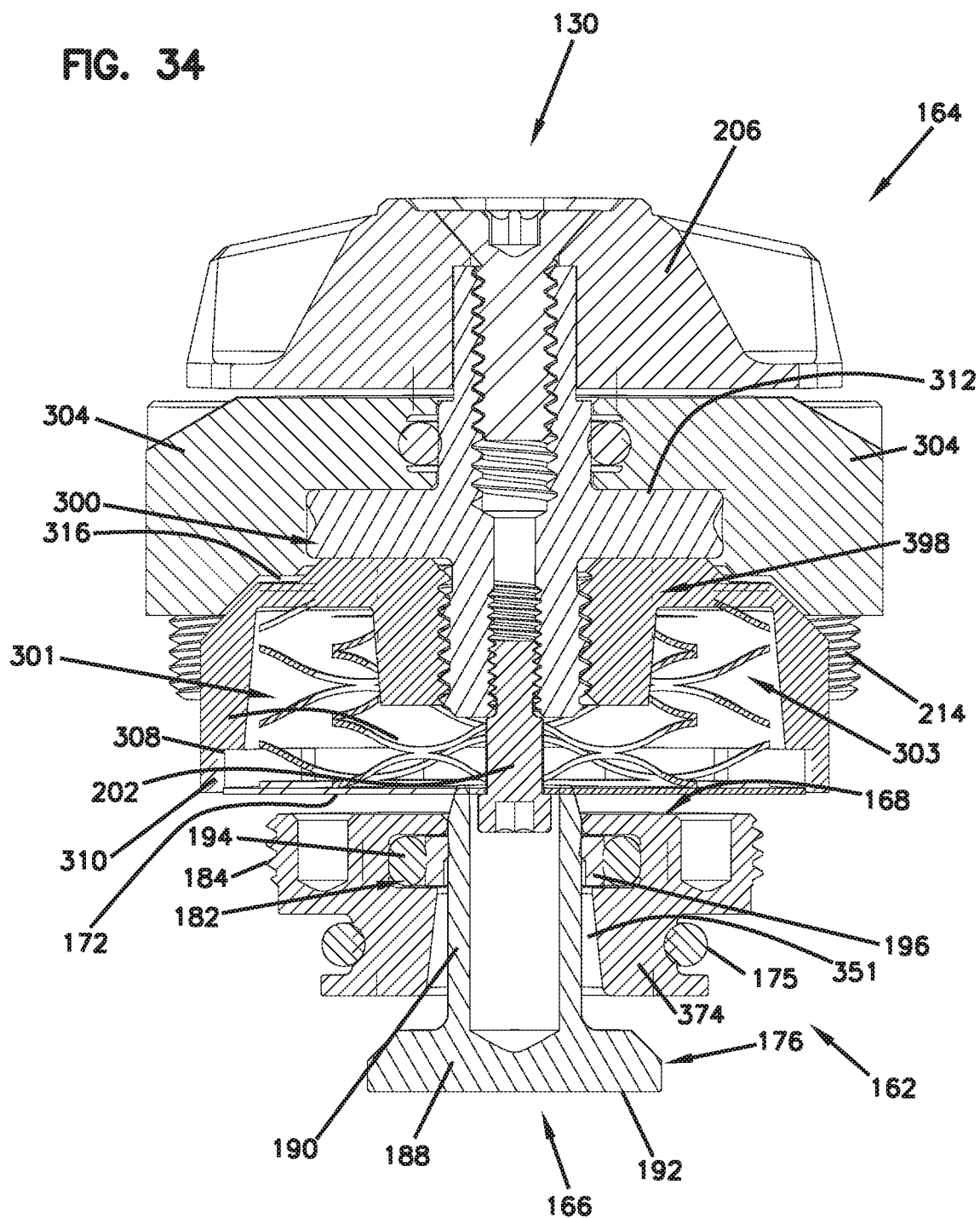
FIG. 34 illustrates a cross sectional view of the high speed valve along line 34-34 in FIG. 32.

FIG. 32 shows a perspective view of one of the valves 130a, 130b with the first assembly 162 and the second assembly 164 being positioned immediately adjacent to one another, similar to their position when installed in the manifold 118. FIG. 33 shows a side view of the valve 130, and FIG. 34 shows a cross-sectional view along line 34-34 of the valve 130. The valve 130 in FIGS. 32-34 is shown to include a spring stack 301.

The first assembly 162 is shown to not include a valve bushing, but instead a housing 374 that includes a tapered recess 351 that does not make contact with the shaft 190 of the movable valve portion 176. The housing 374, is substantially similar to the housing 174 described above, and is configured to be positioned within the wet portion 158 of the valve chamber 152.

The second assembly 164 of the valve 130 includes the spring 172, a spring preload adjuster 398, a spring stack 301, an adjustment shaft 300, a spring fastener 202, a valve cap 304, and an adjustment knob 206. The spring preload adjuster 398, adjustment shaft 300, and valve cap 304 are substantially similar to the spring preload adjuster 198, adjustment shaft 200, and valve cap 204 disclosed above.

The spring stack 301 acts to exert an additional force on the spring 172. The spring stack 301 resides within a recess 303 of the spring preload adjuster 398 and is held in place by the spring fastener 202 between the spring 172 and interior walls 309 of the recess 303 of the spring preload adjuster 398. As the spring preload adjuster 398 moves, the spring 172 is moves, and thereby the spring stack 301 is either compressed or decompressed. Such movement of the spring preload adjuster 398 by adjustment knob changes the spring 172's amount of resistance of the movement of the movable valve portion 176 of the first assembly 162, thereby controlling the overall damping behavior of the high speed valve 130. In some examples, the spring preload adjuster 398, like spring preload adjuster 198, includes at least one stop 310 that can be configured to limit the movement of the spring preload adjuster 398 and/or properly position the spring preload adjuster 398 when installed in the valve chamber 152 of the manifold 118. The spring preload adjuster 398 also includes a flange 308 that is configured to interface with a portion of the spring 172. The flange 308 can interface with an outer portion of the spring 172.

The adjustment shaft 300, being substantially similar to adjustment shaft 200 described above, is configured to be attached (e.g., threaded) into the spring preload adjuster 398. In some examples, the adjustment shaft 300 can be either threaded into or out of the spring preload adjuster 398 to cause relative movement therebetween. As shown, the adjustment shaft 300 is attached to the adjustment knob 206 by way of a fastener 311 so that, as the adjustment knob 206 is rotated, the adjustment shaft 300 is rotated. The adjustment shaft 300 can also include a valve cap flange 312 that is configured to contact an underside of the valve cap 304 to retain the adjustment shaft 300 within the second assembly 164.

The valve cap 304 includes an interior contour 316 that is shaped similar to that of the shape of the spring preload adjuster 398.

Figure 35:
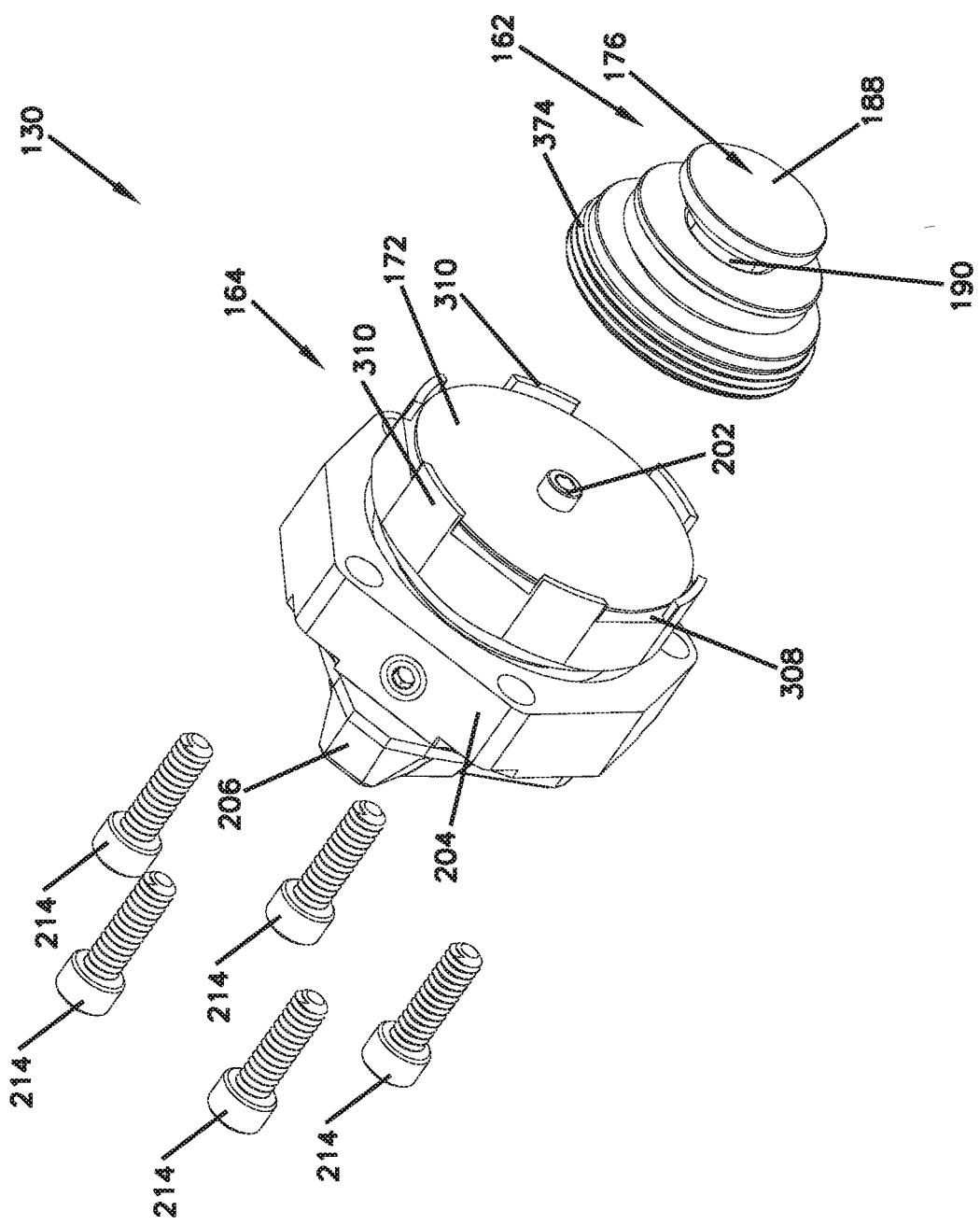
FIG. 35 illustrates a partially exploded view of the high speed valve of FIG. 9.

FIG. 35 shows a perspective view of the first assembly 162 and the second assembly 164 of the high speed valve 130 partially separated, and the second assembly includes a spring stack 301.

Figure 36:
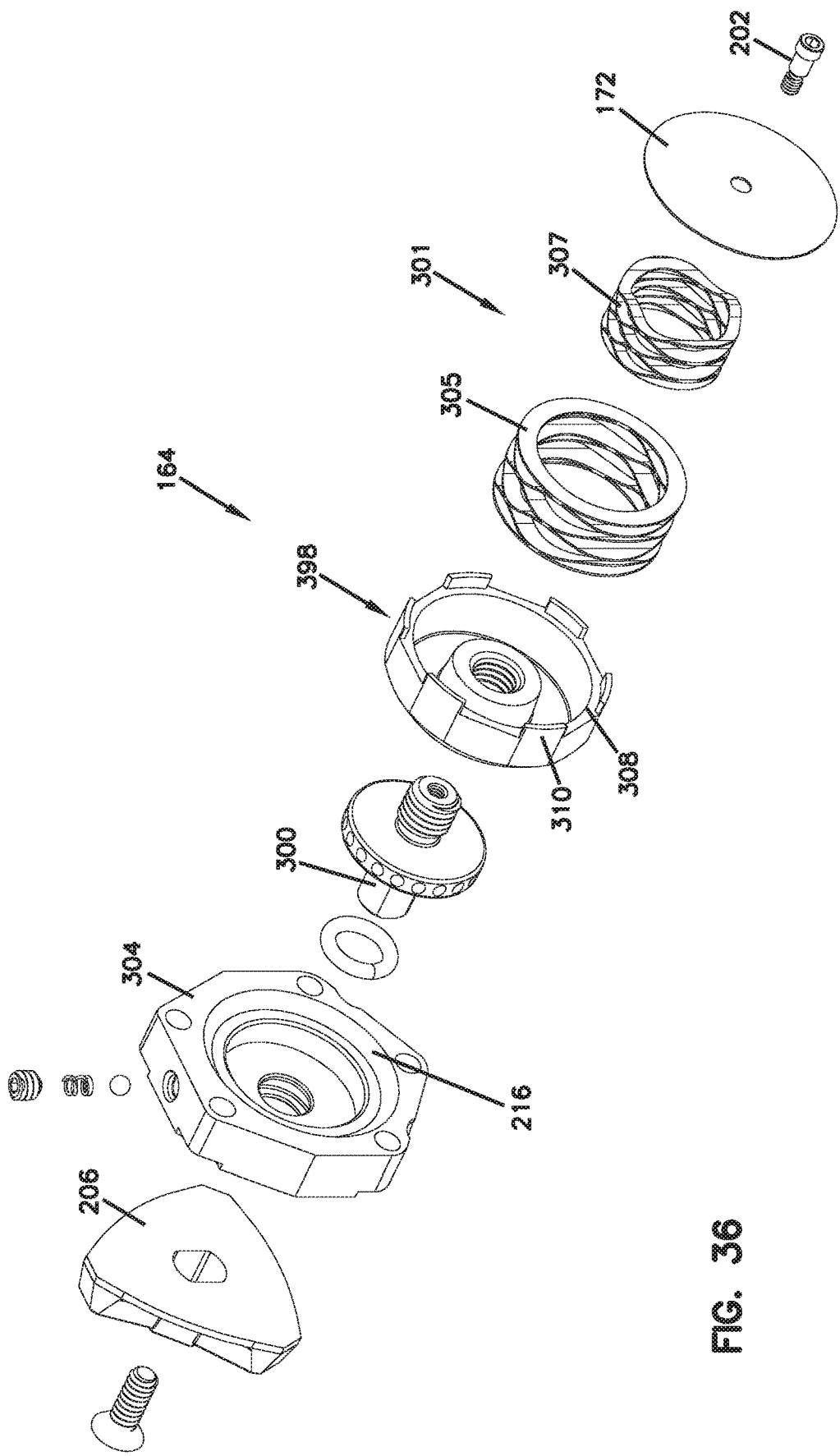
FIG. 36 illustrates a front exploded view of a second assembly of the high speed valve of FIG. 32.
Figure 37:
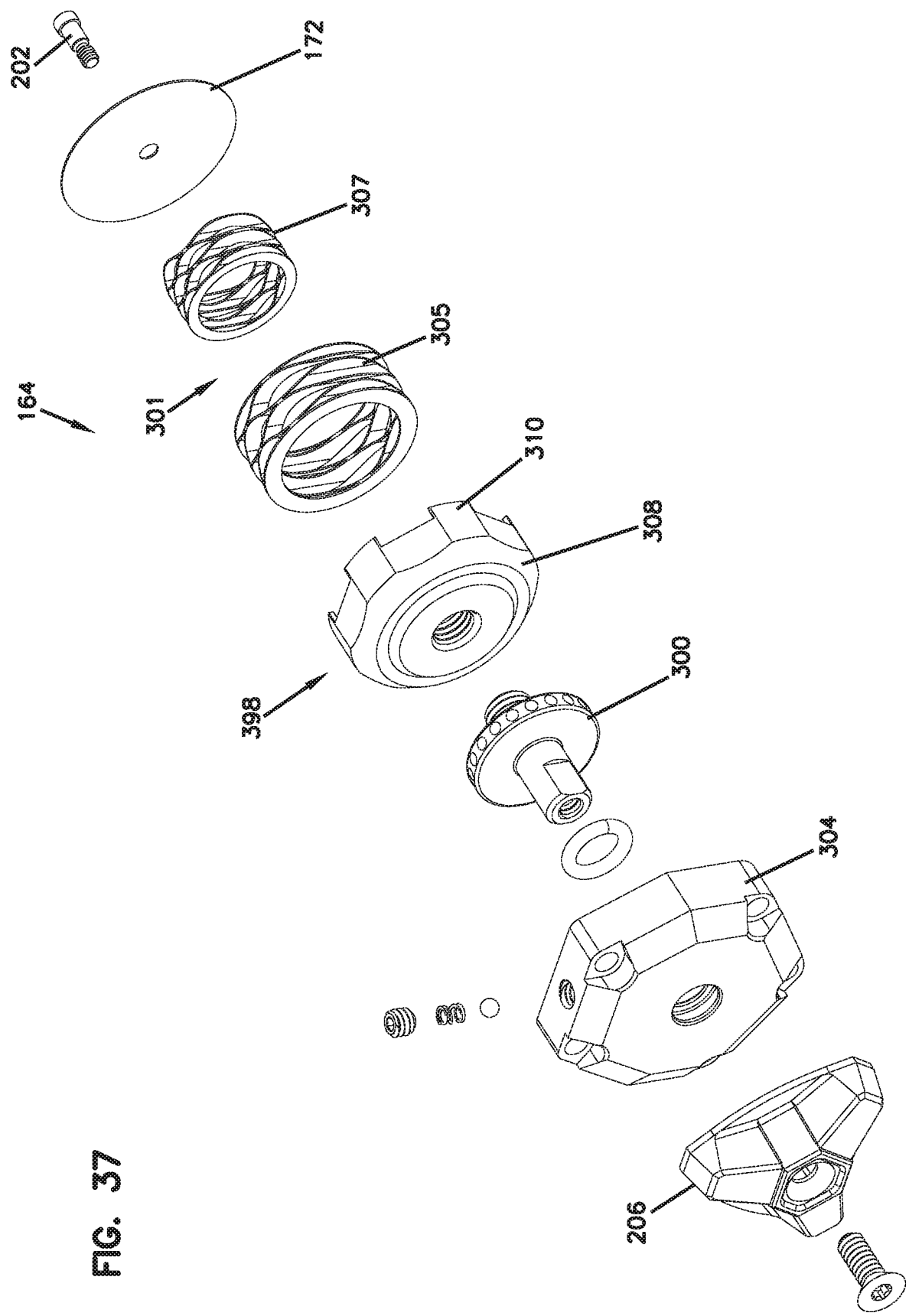
FIG. 37 illustrates a rear exploded view of the second assembly of the high speed valve of FIG. 32.

FIG. 36 shows a front exploded view of the second assembly 164. FIG. 37 shows a rear exploded view of the second assembly 164. The spring stack 301 shown includes a first spring 305 and a second spring 307. In the depicted example, the second spring 307 nests within the first spring 305 when the second assembly 164 is assembled. Multiple springs can be used in the spring stack 301. In some examples, the spring stack 301 can include a single spring. In some examples, the springs of the spring stack 301 can be compression springs. In some examples, the springs of the spring stack 301 can be wave springs, also known as flat wire compression springs. In other examples, the springs of the spring stack 301 can be coil springs. In other examples still, the springs of the spring stack 301 can include a plurality of different types of springs.

Figure 38:
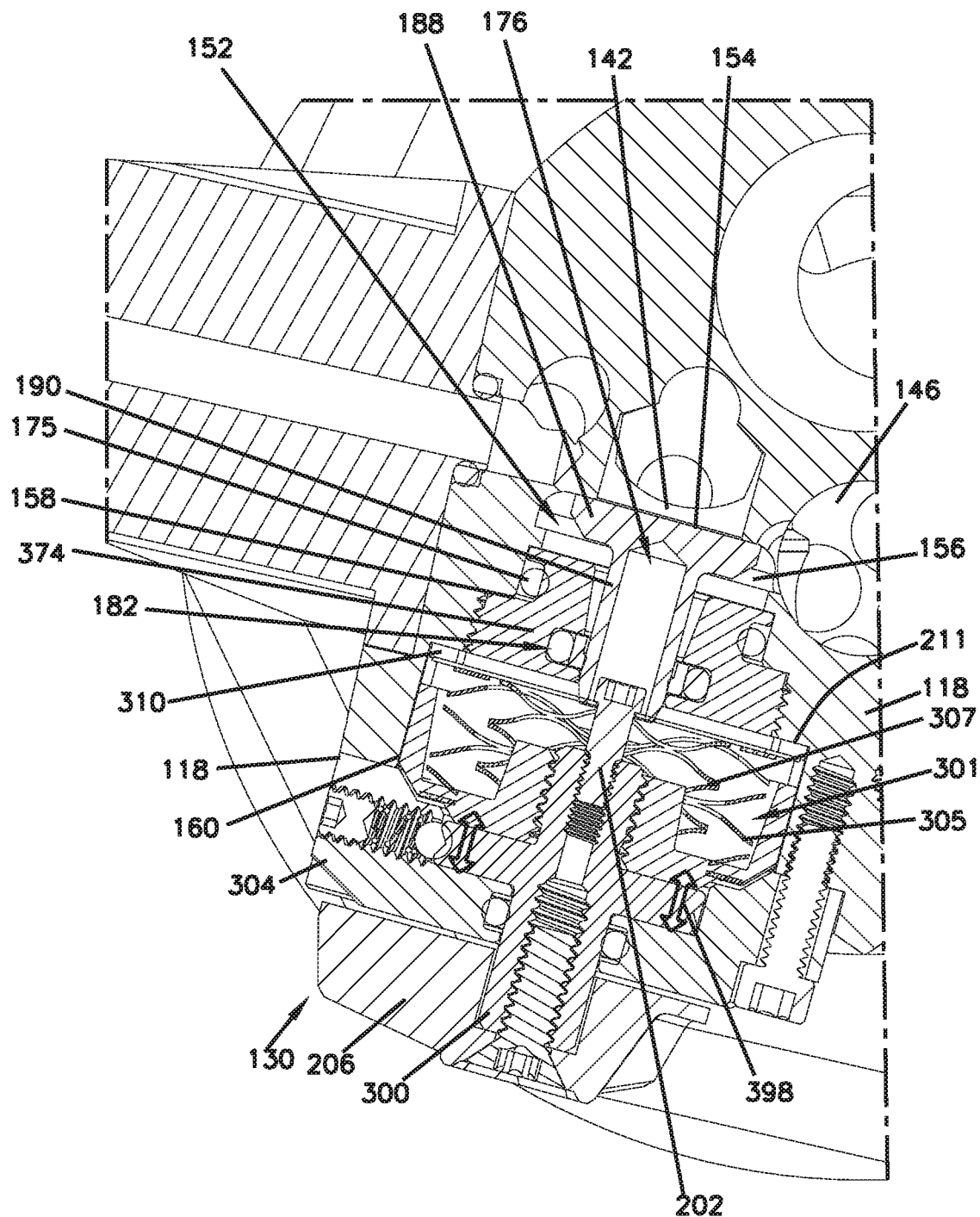
FIG. 38 illustrates a zoomed-in view of the cross-section of the shock absorber of FIG. 31.
Figure 39:
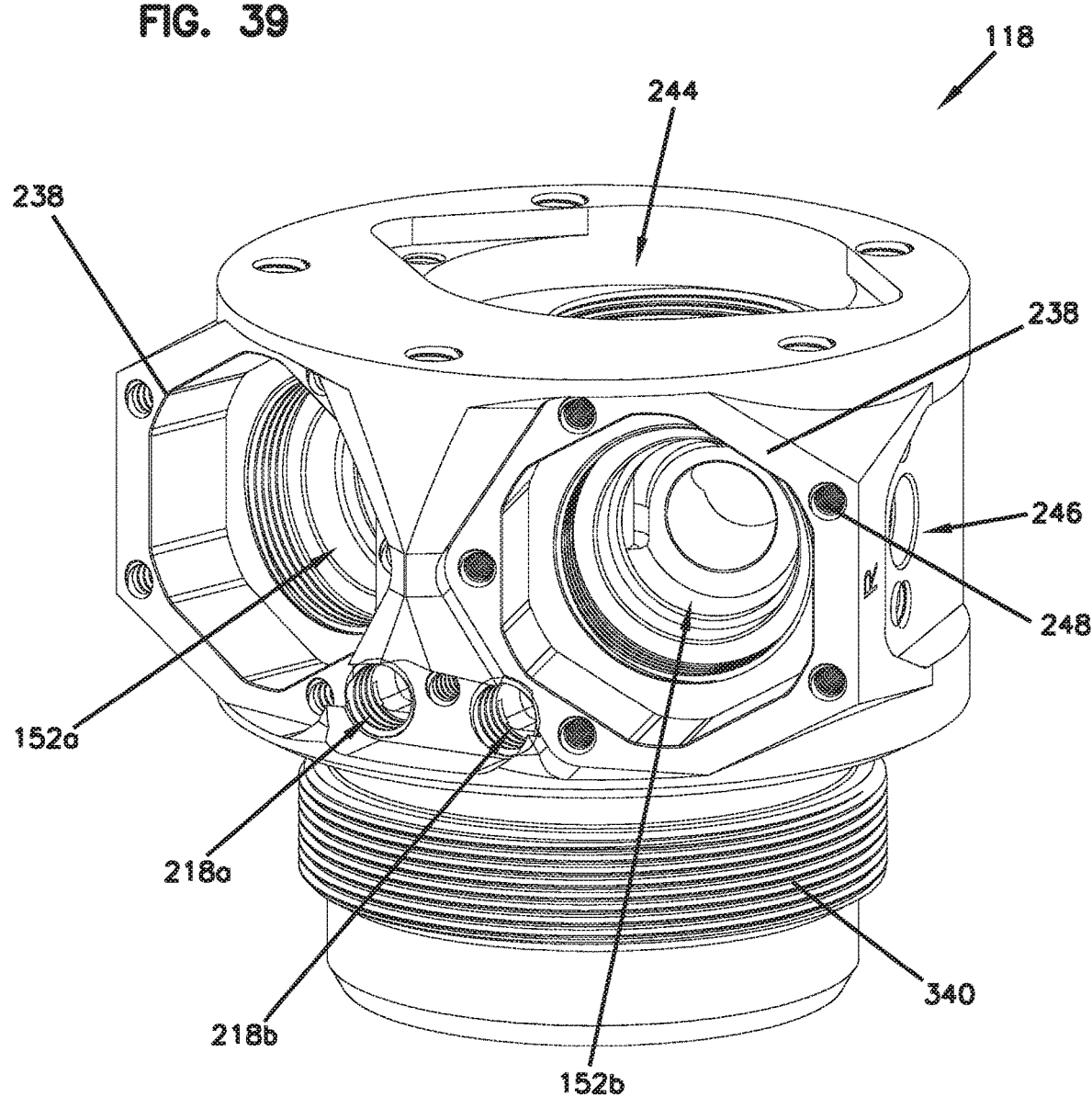
FIG. 39 illustrates a perspective view of a shock absorber manifold, according to one embodiment of the present disclosure.
Figure 40:
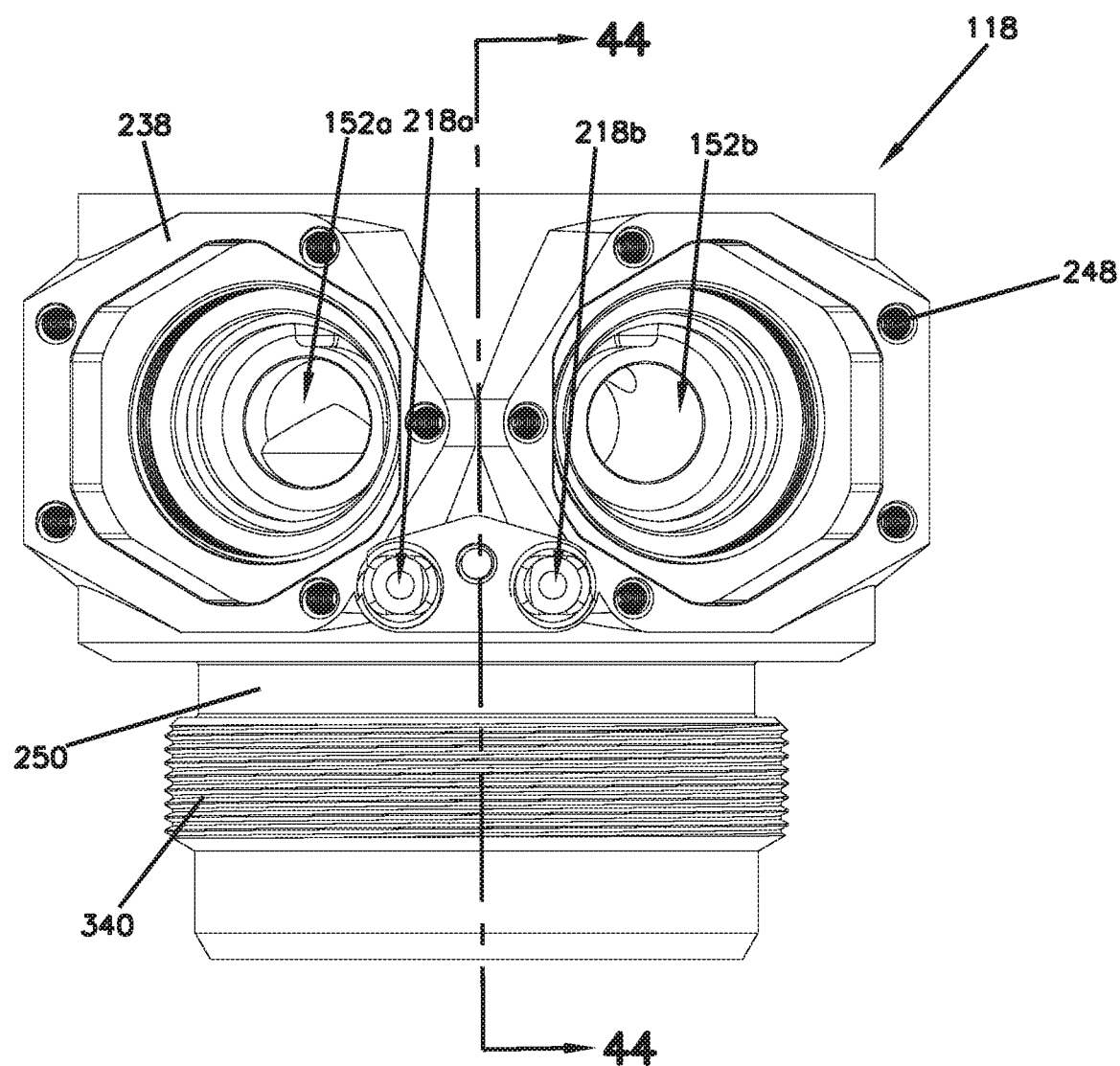
FIG. 40 illustrates a front view of the shock absorber manifold of FIG. 39.
Figure 41:
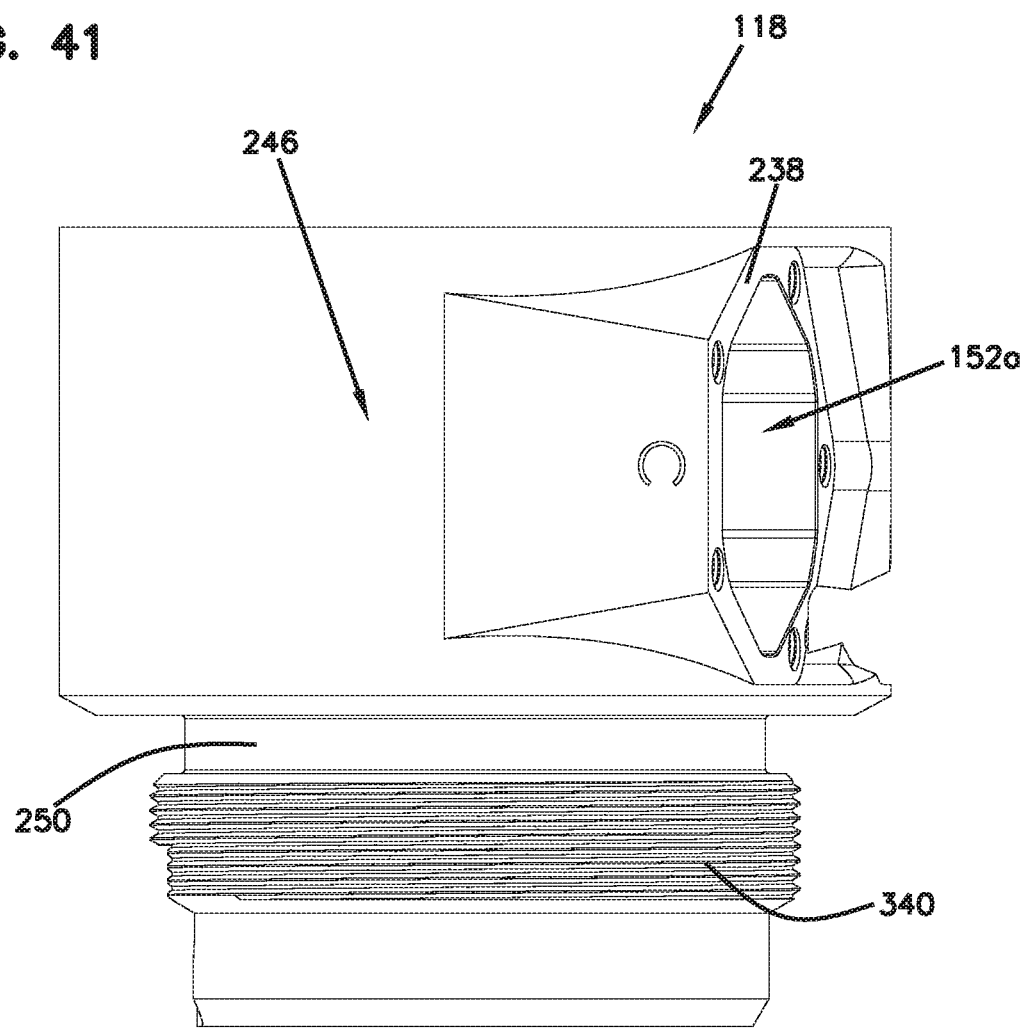
FIG. 41 illustrates a side view of the shock absorber manifold of FIG. 39.
Figure 42:
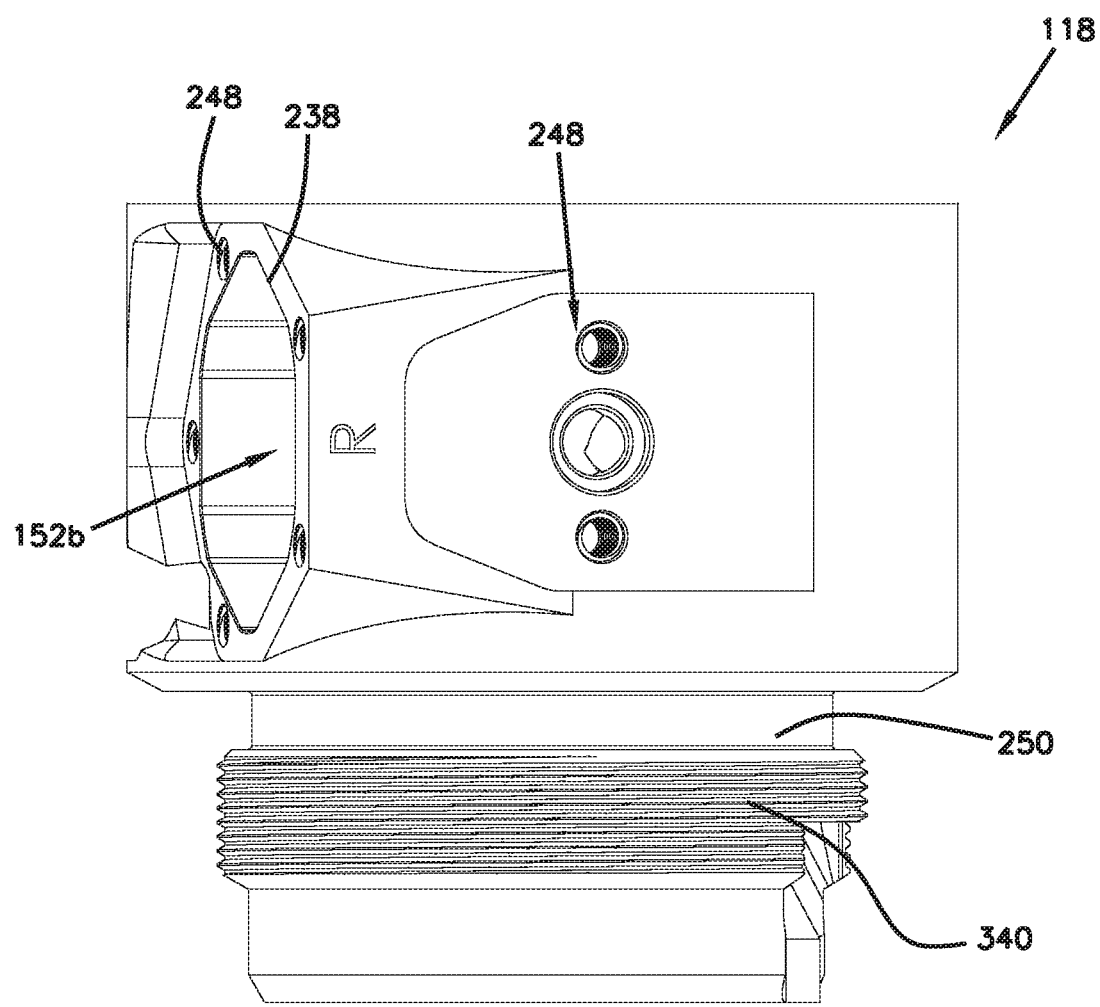
FIG. 42 illustrates another side view of the shock absorber manifold of FIG. 39.

FIG. 38 shows the high speed valve 130 installed in the manifold 118. Specifically, as the adjustment knob 206 is rotated, the spring preload adjuster 398 increases or decreases the amount of force needed to overcome the spring 172 being in contact with the movable valve portion 176, as indicated by arrows in FIG. 38. In some examples, the stop 310 is configured to contact the stop surface 211 within the valve chamber 152 when moved a maximum distance toward the movable valve portion 176.

FIGS. 39-44 show the manifold 118 without the valves 130a, 130b or valves 132a, 132b. The manifold 118 includes an outer tube attachment interface 340 and an inner tube flange 342. In the depicted examples, the outer tube 112 is threaded onto the manifold 118 and the inner tube is captured between. In some examples, the outer tube attachment interface 340 is a threaded interface. In other examples, the outer tube 112 is permanently attached to the manifold 118 (e.g., welded, cast, machined, etc.). In some examples, the outer tube attachment interface 340 includes a seal recess 250 that is configured to receive a seal to form a seal between the manifold 118 and the outer tube 112.

Figure 43:
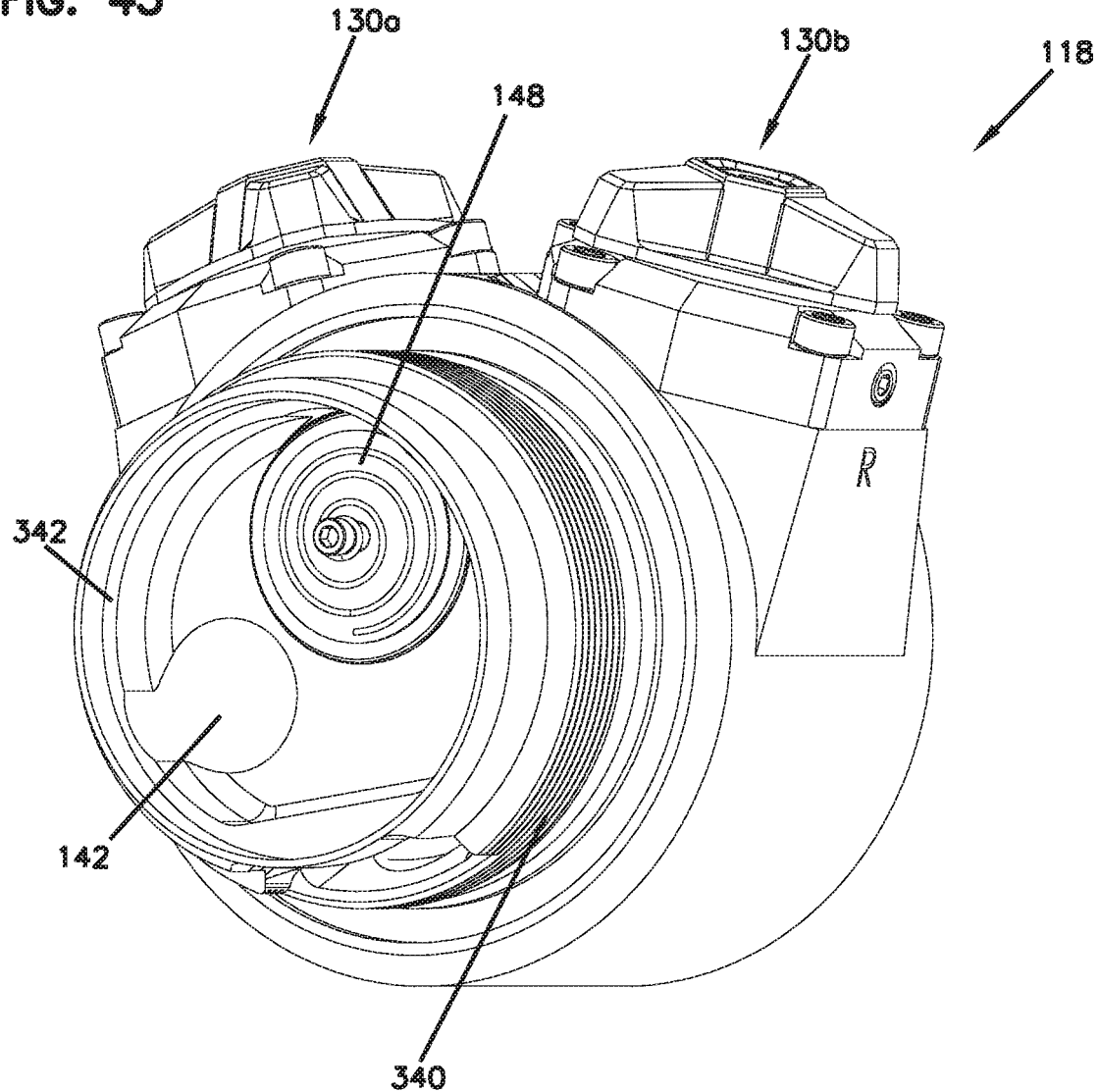
FIG. 43 illustrates a bottom perspective view of the shock absorber manifold of FIG. 39.
Figure 44:
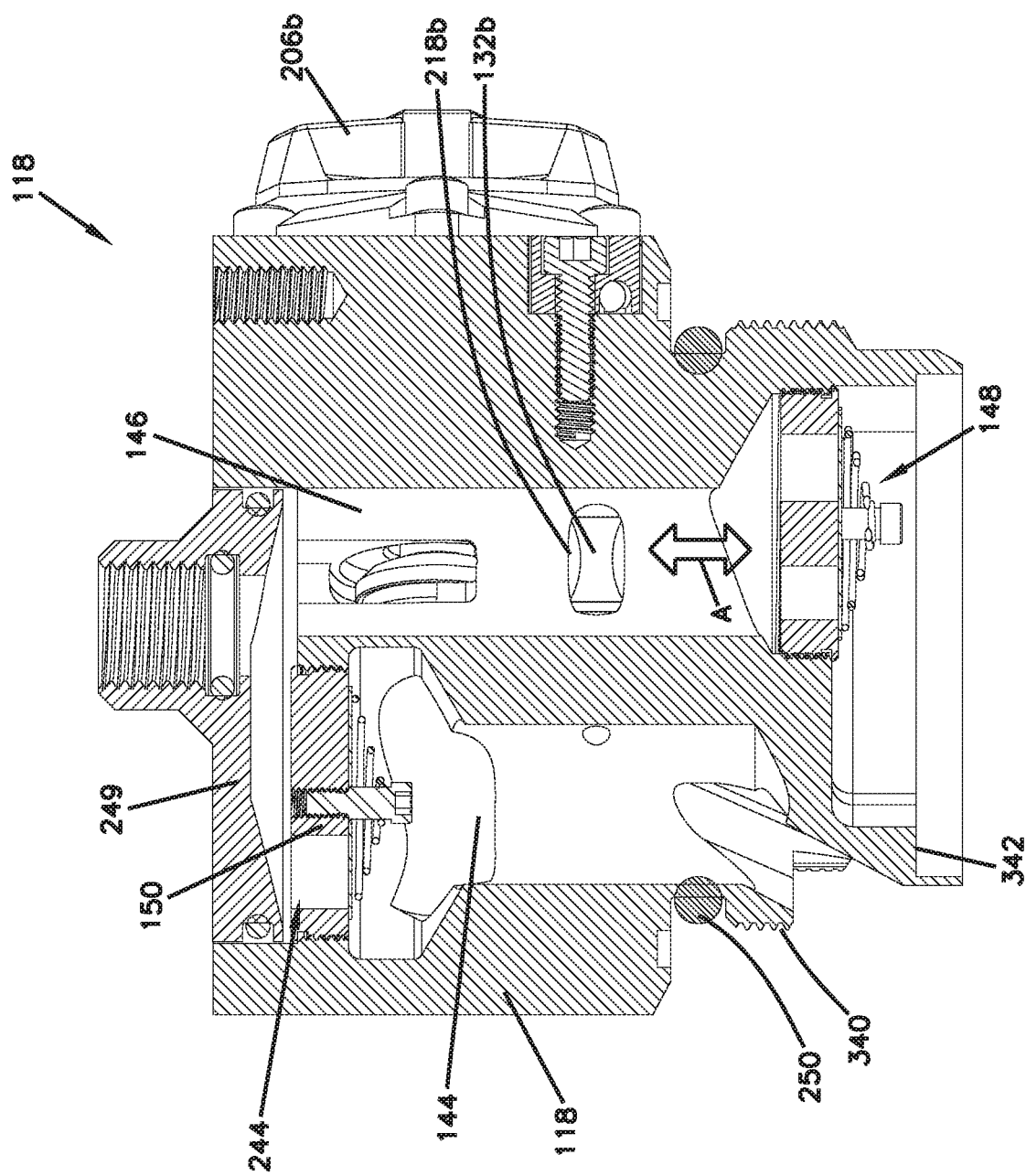
FIG. 44 illustrates a cross sectional view of the shock absorber manifold along line 44-44 in FIG. 40.
Figure 45:
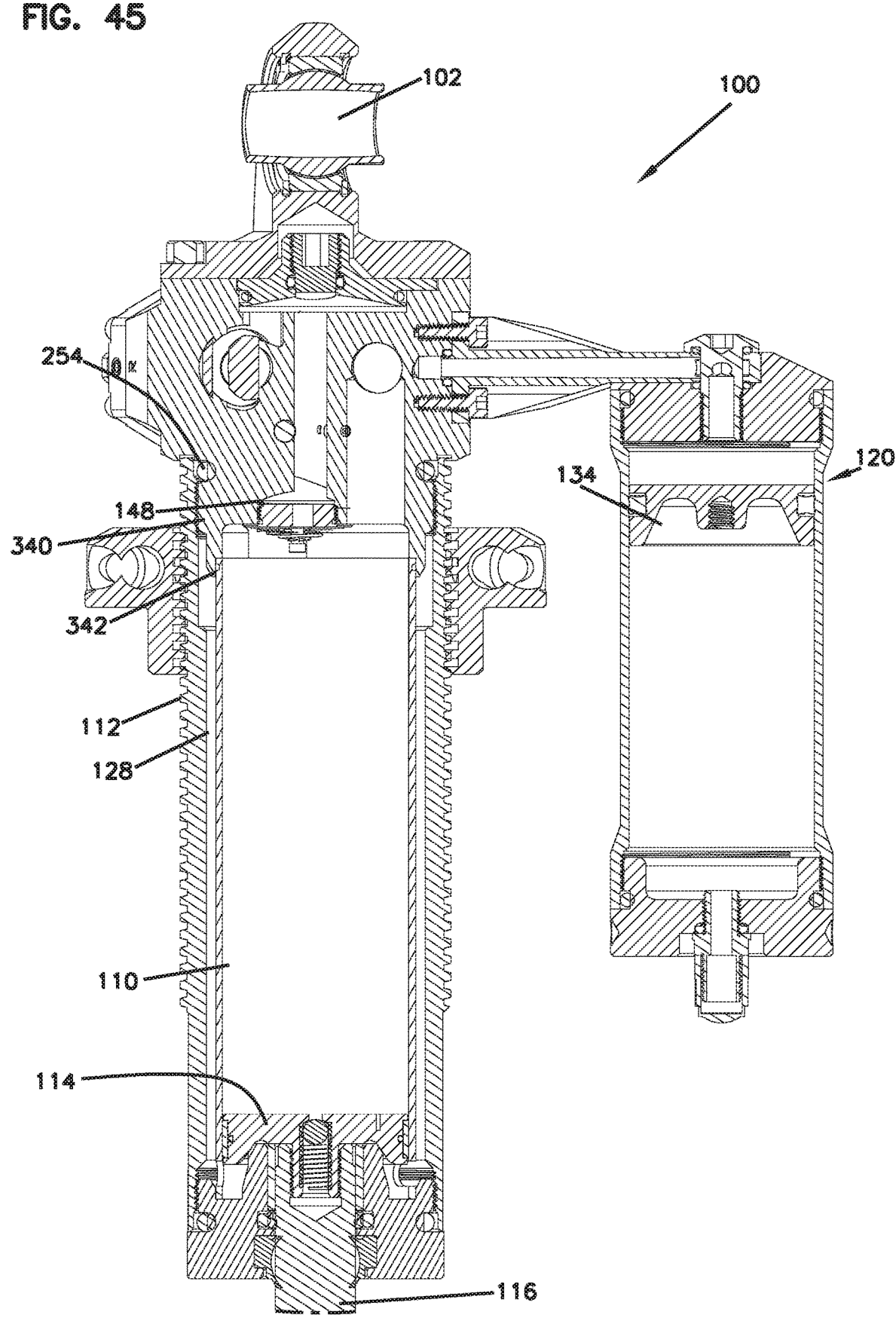
FIG. 45 illustrates a zoomed-in view of the cross section of the shock absorber.

The inner tube flange 342, as shown in FIG. 43 and FIG. 44, is configured to receive the inner tube 110. In some examples, the inner tube flange 342 is configured to include a seal to form a seal between the manifold 118 and the inner tube 110.

FIG. 26 is a blown up portion of FIG. 2. A seal 254 is positioned within the seal recess 250 between the outer tube 112 and the manifold 118. In some examples, the outer tube 112 is in contact with the manifold 118 and not attached to the manifold 118. The outer tube 112 is shown to be attached to the manifold 118 at the outer tube attachment interface 340.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

We claim:

1. A valve system for a shock absorber comprising:
a body including:
   a valve chamber for receiving a valve, the valve chamber having a wet portion and a dry portion, wherein the wet portion includes a first opening and a second opening, and wherein fluid flow is selectively allowed to flow between the first and second openings within the wet portion via the valve; and
   the valve comprising:
      a first assembly having a housing positioned within the valve chamber, the first assembly further including a movable valve portion sealed within the housing and at least partially positioned within the wet portion of the valve chamber, wherein the valve portion is movable to selectively control fluid flow between the first and second openings of the wet portion of the valve chamber, the housing including at least one seal to seal the wet portion of the valve chamber from the dry portion; and
      a second assembly removably positioned within the dry portion of the valve chamber, the second assembly including a spring for resisting the movement of the movable valve portion via a spring pressure.

2. The valve system of claim 1, wherein the spring of the second assembly is in contact with the movable valve portion of the first assembly.

3. The valve system of claim 1, wherein the spring pressure of the spring is adjustable.

4. The valve system of claim 3, wherein the spring is adjustable via a spring preload adjuster, the spring preload adjuster being coupled to the spring to selectively move at least a portion of the spring.

5. The valve system of claim 4, wherein the spring is at least one of a disc spring, Belleville washer, and perforated disc that is deflectable, and wherein the spring preload adjuster is in contact with an outer edge of the spring.

6. The valve system of claim 4, wherein the spring preload adjuster includes at least one stop that is configured to contact a stop surface of the dry portion of the valve chamber, wherein the stop limits the amount of movement of the spring preload adjuster.

7. The valve system of claim 1, further comprising a seal positioned between the housing and the movable valve body of the first assembly.

8. The valve system of claim 1, further comprising a seal positioned between the housing and the valve chamber.

9. The valve system of claim 1, wherein the housing of the first assembly is threadably attached to the valve chamber.

10. A shock absorber comprising:
an inner tube defining an interior volume;
a piston movably positioned within the interior volume, wherein the piston divides the interior volume into a first chamber and a second chamber; and
a body including:
   a first passageway in communication with the first chamber;
   a second passageway in communication with the second chamber;
   a third passageway selectively in communication with the first and second passageways and selectively in communication with the first and second chambers; and
   at least one flow control valve positioned between one of the first and second passageways and the third passageway;
   wherein the at least one flow control valve comprises:
      a first assembly having a first side and second side, the first assembly including a movable valve portion positioned and sealed within a housing, the housing including at least one seal to seal all fluid on the first side of the first assembly, wherein at least a portion of the valve portion is in contact with fluid at the first side of the first assembly; and
      a second assembly positionable adjacent the second side of the first assembly, the second assembly including a spring for resisting the movement of the valve portion, wherein the second assembly is separable from the first assembly.

11. The shock absorber of claim 10, wherein the spring of the second assembly of the at least one flow control valve is in contact with the movable valve portion of the first assembly.

12. The shock absorber of claim 10, wherein the at least one flow control valve is positioned between the first passageway and the third passageway, the shock absorber further comprising a second flow control valve positioned between the second passageway and the third passageway.

13. The shock absorber of claim 10, further comprising an outer tube surrounding the inner tube, wherein the inner and outer tubes define an annular passageway disposed therebetween, the annular passageway being in communication with the second chamber of the interior volume of the inner tube.

14. A replaceable valve without a seal for a shock absorber comprising:
a spring preload adjuster;
a spring configured to be positioned at a first side of the spring preload adjuster, wherein the spring includes a first side immediately adjacent the spring preload adjuster and a second, opposite side positionable immediately adjacent a movable valve sealed within a housing of the shock absorber, wherein the spring is configured to resist movement of the movable valve;

a fastener for connecting the spring and the spring preload adjuster; and a valve cap positioned at a second, opposite side of the spring preload adjuster, wherein the valve cap is configured to attach to the shock absorber.

15. The replaceable valve of claim 14, wherein the spring preload adjuster is movable to selectively deflect the spring.

16. The replaceable valve of claim 14, further comprising an adjustment shaft having a first side coupled to the spring preload adjuster, wherein the adjustment shaft is configured to move the spring preload adjuster.

17. The replaceable valve of claim 16, wherein the spring preload adjuster is threaded onto the adjustment shaft.

18. The replaceable valve of claim 16, further comprising an adjustment knob attached to a second side of the adjustment shaft.

19. The replaceable valve of claim 14, wherein the spring is at least one of a wave and a disc spring, wherein the spring preload adjuster is positioned around an outer edge of the spring.

20. The replaceable valve of claim 14, further comprising a plurality of springs.

21. The replaceable valve of claim 20, wherein the plurality of springs is a plurality of wave springs.

* * * * *